United States Patent
Omiya et al.

(10) Patent No.: US 8,636,382 B2
(45) Date of Patent: Jan. 28, 2014

(54) LIGHT SOURCE APPARATUS, IMAGE DISPLAY APPARATUS AND TELEVISION RECEIVING APPARATUS

(75) Inventors: Yuki Omiya, Osaka (JP); Yuuki Kawamura, Osaka (JP); Takefumi Watanabe, Osaka (JP); Hirokazu Ishiai, Osaka (JP); Hideto Takeuchi, Osaka (JP); Masaya Katsuki, Osaka (JP); Katsumi Shinohara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/380,365

(22) PCT Filed: Jun. 25, 2010

(86) PCT No.: PCT/JP2010/060885
§ 371 (c)(1),
(2), (4) Date: Dec. 22, 2011

(87) PCT Pub. No.: WO2010/150883
PCT Pub. Date: Dec. 29, 2010

(65) Prior Publication Data
US 2012/0092562 A1    Apr. 19, 2012

(30) Foreign Application Priority Data

Jun. 25, 2009  (JP) ................................. 2009-151443
Jul. 2, 2009    (JP) ................................. 2009-158165
Jul. 2, 2009    (JP) ................................. 2009-158167
Jul. 31, 2009   (JP) ................................. 2009-179777
Jun. 25, 2010   (JP) ................................. 2010-144958

(51) Int. Cl.
*F21V 21/00* (2006.01)

(52) U.S. Cl.
USPC ................... 362/249.07; 362/97.1; 362/218; 362/227; 362/249.03; 362/249.11

(58) Field of Classification Search
USPC ................... 362/97.1, 97.2, 227, 234, 249.01, 362/249.07, 249.08, 217.16, 218, 249.03, 362/249.11
See application file for complete search history.

(56) References Cited

U.S. PATENT DOCUMENTS

2004/0175250 A1   9/2004  Yoneoka
2007/0211205 A1   9/2007  Shibata
(Continued)

FOREIGN PATENT DOCUMENTS

JP    61-166327 U    10/1986
JP    7-018313 A     3/1995
(Continued)

OTHER PUBLICATIONS

Japanese Office Action issued in Japanese Patent Application No. 2010-144958 on Sep. 21, 2010.

(Continued)

*Primary Examiner* — Stephen F Husar
*Assistant Examiner* — Meghan Dunwiddie
(74) *Attorney, Agent, or Firm* — Birch, Stewart, Kolasch & Birch, LLP

(57) ABSTRACT

A light source apparatus, an image display apparatus and a television receiving apparatus are provided, which can electrically connect boards with each other even if the boards are separated from each other by more than or less than a predetermined distance. In a light source unit in which plural LEDs are aligned on one surface of a LED board 2, plural stoppers 20 are arranged at another surface 2b of LED board 2 to stop the stopper 20 at stop slits 63, 63, . . . 63 of a support member 6 which is to hold the light source unit, and to hold the light source unit to be slidable along one surface of the support member 6.

19 Claims, 46 Drawing Sheets

(56) References Cited

U.S. PATENT DOCUMENTS

2009/0109655 A1 4/2009 Shinozaki
2010/0097783 A1 4/2010 Gomi

FOREIGN PATENT DOCUMENTS

| | | |
|---|---|---|
| JP | 9-138408 A | 5/1997 |
| JP | 11-133394 A | 5/1999 |
| JP | 2004-263811 A | 9/2004 |
| JP | 2006-58487 A | 3/2006 |
| JP | 2007-066879 A | 3/2007 |
| JP | 2007-134294 A | 5/2007 |
| JP | 2007-157451 A | 6/2007 |
| JP | 2007-311561 A | 11/2007 |
| JP | 2008-166304 A | 7/2008 |
| WO | WO 2008/078587 A1 | 3/2008 |

OTHER PUBLICATIONS

A Screen-printable Paste with High Thermal Conductivity, by Unitika Ltd. published on Dec. 17, 2008.
High Thermal Conducive Graphite Sheet, from publication by Otsuka Electric Co., Ltd., published on Jul. 24, 2009.
High Thermal Conductive CEM-3 R-1787, by Panasonic Corporation, published in Jan. 2009.
International Search Report of PCT/2010/60885.

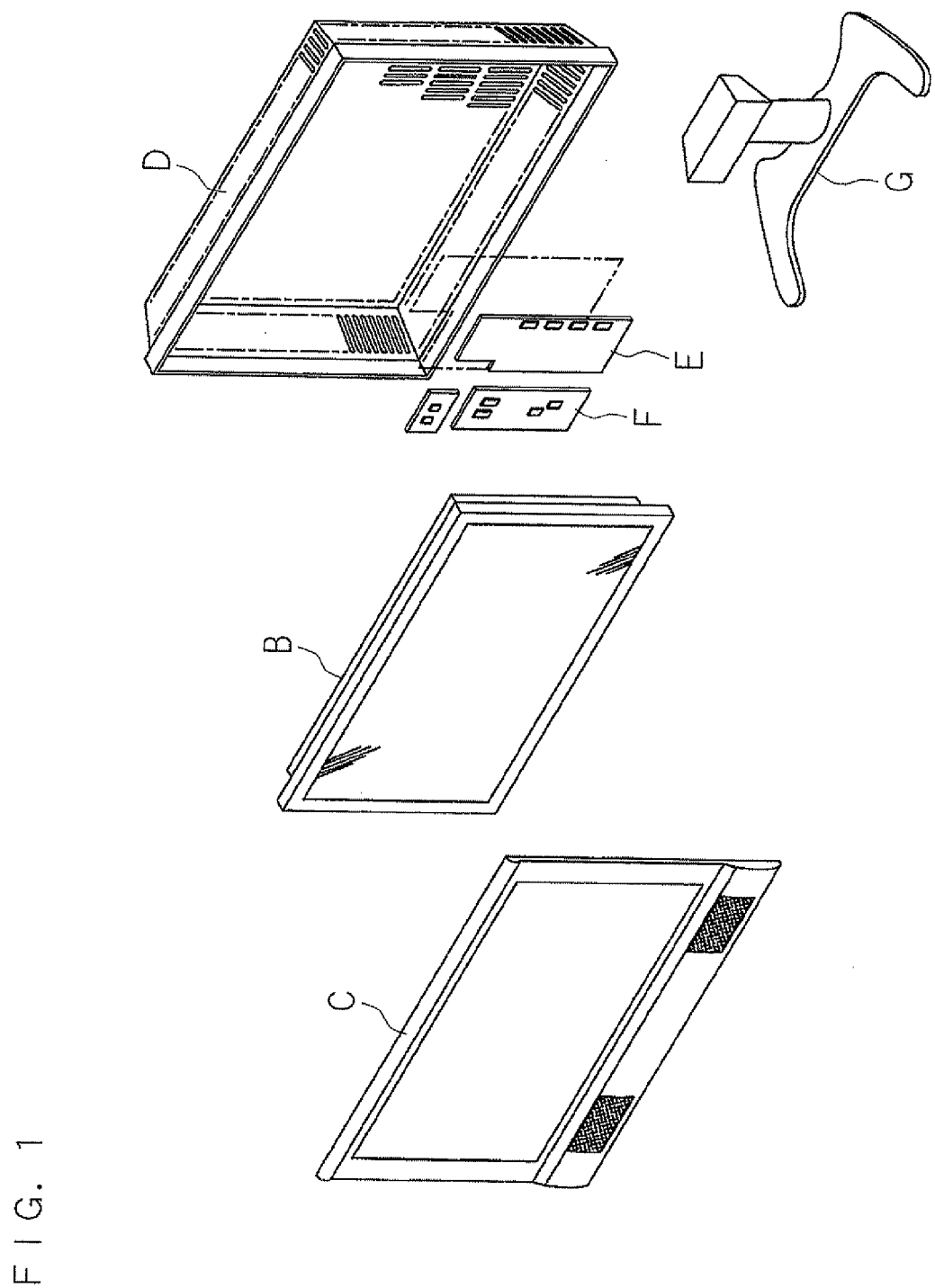

FIG. 4
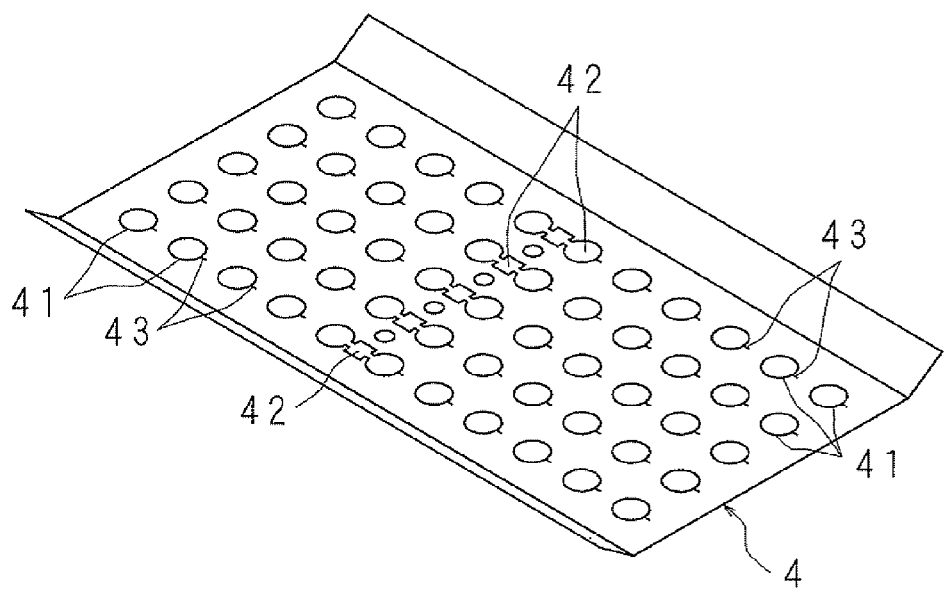
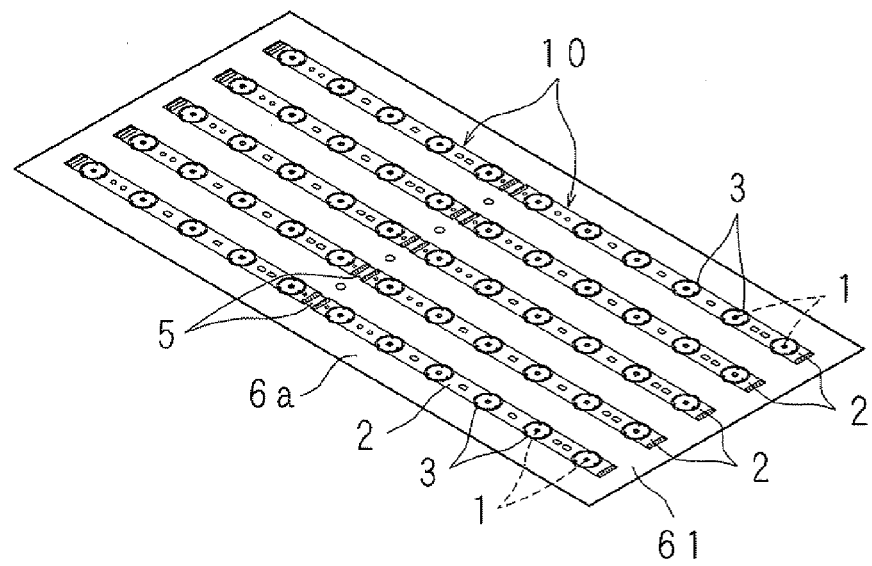

F I G. 7
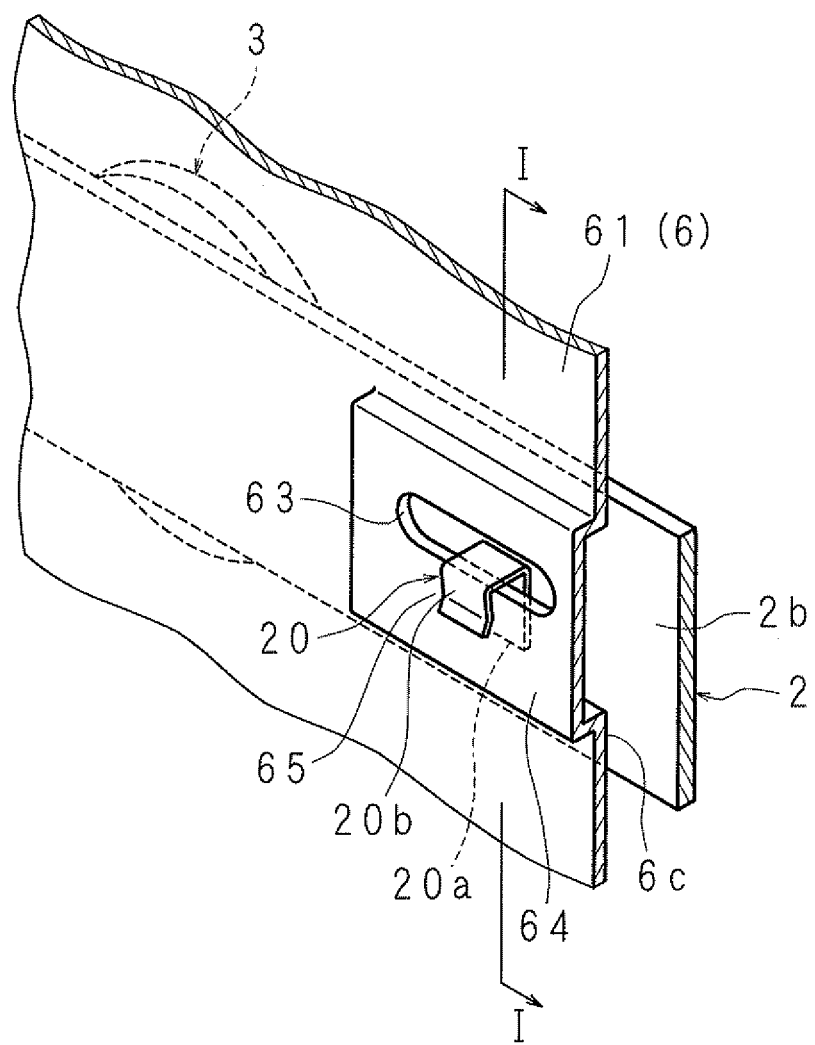

F I G. 1 5
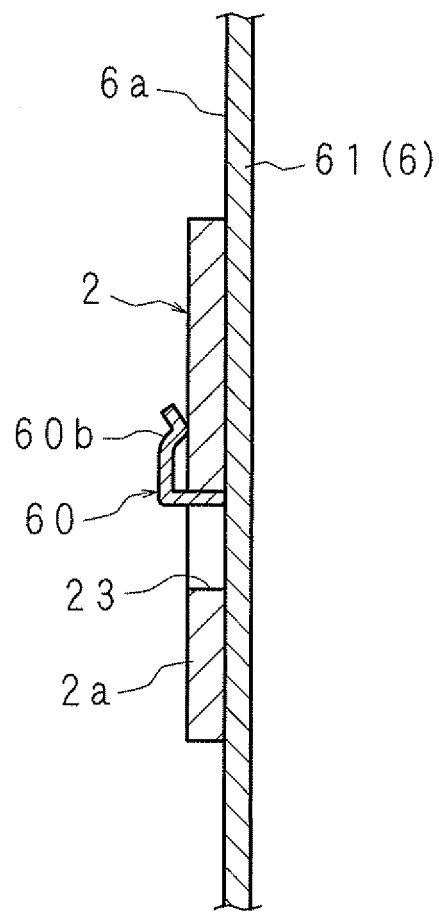

F I G. 2 3
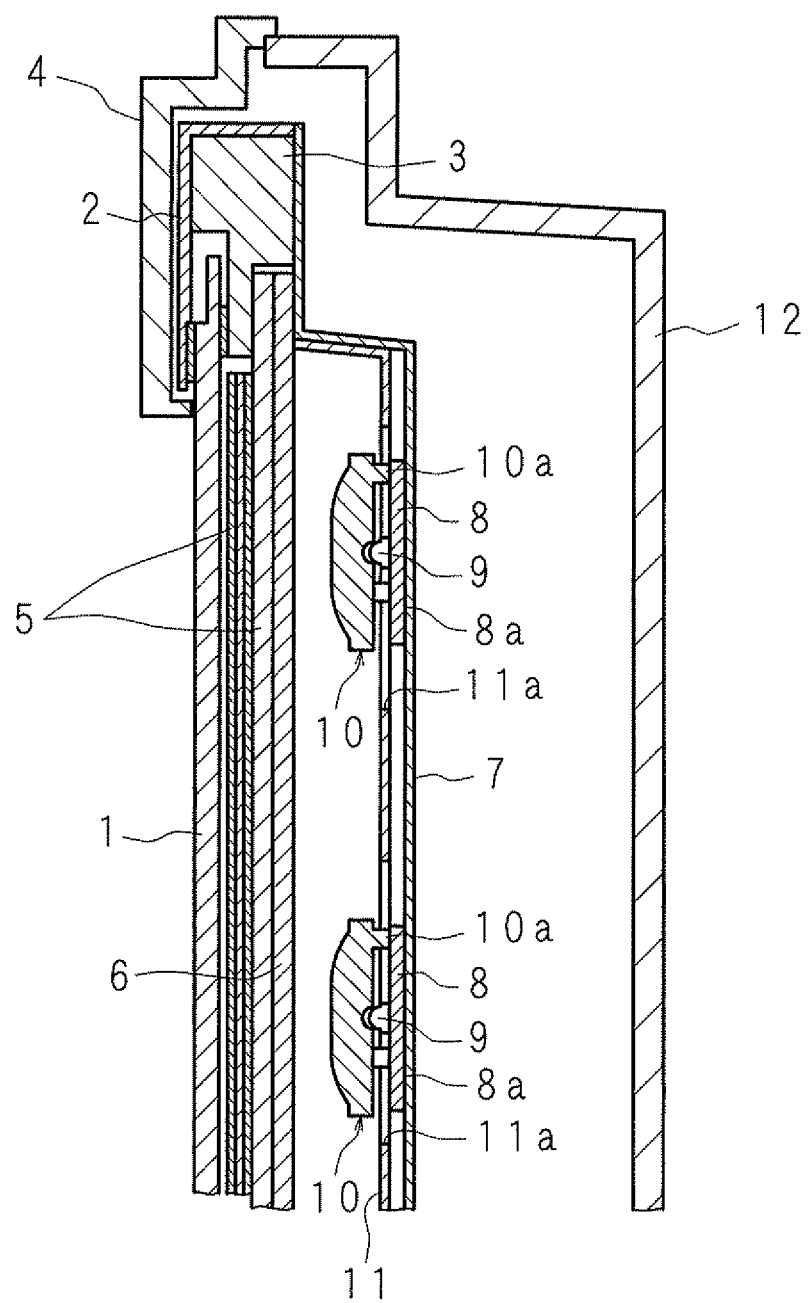

F I G. 3 2
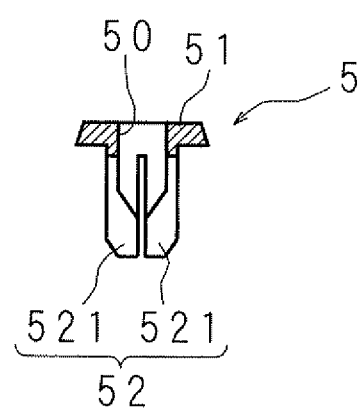

F I G. 3 5
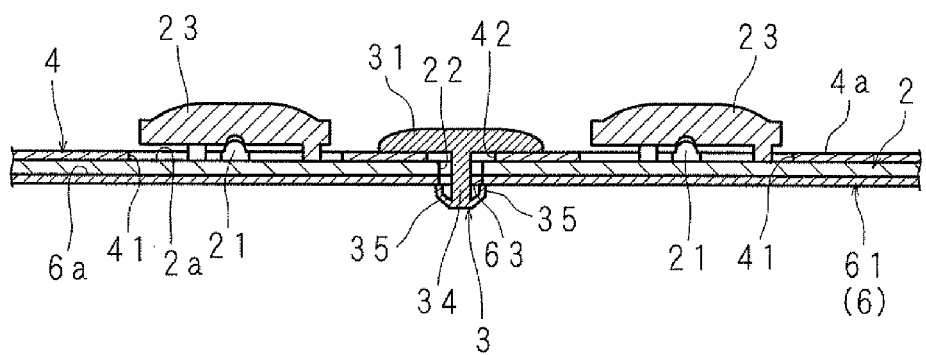

LIGHT SOURCE APPARATUS, IMAGE DISPLAY APPARATUS AND TELEVISION RECEIVING APPARATUS

CROSS-REFERENCE TO RELATED APPLICATION

This application is the national phase under 35 U.S.C.§371 of PCT International Application No. PCT/JP2010/060885 which has an International filing date of Jun. 25, 2010 and designated the United States of America.

BACKGROUND OF THE INVENTION

1. Field of the Invention

The present invention relates to a light source apparatus, and an image display apparatus and a television receiving apparatus comprising the light source apparatus.

2. Description of Related Art

As for an image display apparatus, for example, a liquid crystal television, there are two types: a behind type in which a fluorescent tube is arranged as a back light on a flat surface behind a liquid crystal display panel displaying an image; and an edge type in which a fluorescent tube is arranged at one side of a backlight plate or fluorescent tubes are arranged at two sides of the backlight plate and light coming to the backlight plate is emitted to a liquid crystal display panel. However, not only the behind type image display apparatus but also the edge type image display apparatus utilizes the fluorescent tube as described above, and has problems that rise in temperature is not uniform and that efficiency for light utilization is low.

In view of these problems, a light emitting diode (LED) is recently utilized as the back light, instead of the fluorescent tube. However, the LED cannot provide a large amount of luminescence with respect to an amount of supplied current. Thus, it causes a problem that an amount of heat becomes larger with respect to the amount of luminescence and the larger amount of heat shortens the life of the LED.

Patent Document 1 discloses a display apparatus that includes a mount board on which plural light emitting fixed elements, a circuit supplying drive current to them and a thermal conductive film conducting heat generated by the plural light emitting fixed elements are mounted, wherein the mount board is fixed by a screw to a frame on which the mount board should be arranged, and that can conduct heat coming from the thermal conductive film to the frame.

Since a liquid display apparatus does not have a larger space occupancy for a room with respect to the size of a display screen, it is possible to efficiently utilize the limited space of the room. Thus, the liquid display apparatus is widespread. The liquid crystal display apparatus is configured to emit light from a light source accommodated in a back cabinet toward a liquid crystal display panel arranged inside a front cabinet for displaying an image, in order to display the image. A cold cathode fluorescent tube is conventionally utilized as the light source. However, a LED is recently utilized as the light source, because the LED facilitates partial control of brightness on the screen, high speed flash control for preventing so-called a blur of moving image, and the like. Thus, the LED is well utilized in recent years.

Patent Document 2 discloses a display apparatus in which a radiator plate is arranged on a back cabinet and a LED board mounting a LED on one surface is fixed to the radiator plate by a screw. The display apparatus makes the radiator plate conduct heat generated by the LED board, to cool the LED board.

The display apparatus includes: a display panel (for example, a liquid crystal display panel) whose display surface displaying an image is arranged at the front side; a light source apparatus (a so-called back light) that is arranged behind the display panel and lights the display panel; and a cabinet accommodating the display panel and the light source apparatus. A heat exhaust hole is formed on the cabinet.

The light source apparatus includes plural circuit boards in matrix arrangement, which are assisted by assist members. A light emitter (for example, a LED) is mounted on each circuit board.

Each circuit board is fixed to the assist member by plural rivets. A push rivet is utilized as an example of the rivet (See Patent Document 3). Thus, threaded holes are formed on the circuit board and assist member at the corresponding positions, and the push rivet is inserted into the threaded holes.

Generally, the color of push rivet is white. The reason is that the light generated by the light emitter should be reflected toward the display panel side.

In addition, it is known that a circuit board mounting a LED is fixed to an assist board by adhesive (See Patent Document 4).

Patent Document 1: Japanese Patent Application Laid-Open No. 2007-311561
Patent Document 2: Japanese Patent Application Laid-Open No. 2006-58487
Patent Document 3: Japanese Patent Application Laid-Open No. H9-138408
Patent Document 4: Japanese Patent Application Laid-Open No. 2008-166304

SUMMARY OF THE INVENTION

In response to consumer's varied requests, image display apparatuses having various sizes of display units are manufactured and sold. In order to manufacture a large number of image display apparatuses in which the sizes of display units are diverse, a light source unit is prepared as a ready made unit in which, for example, a proper number of LEDs are mounted on a board. Then, such a light source unit is combined to another, in response to the size of required display unit.

In the case described above, a so-called connector is utilized for electrically connecting the light source units which can be easily connected and disconnected. Thus, it is expected to improve the efficiency for combining the light source units. For example, a female terminal is arranged on the board in the light source unit and a male terminal is arranged on the connector, to facilitate electrically connecting the light source units.

However, a distance of boards required for the connector is limited. For example, if the distance of arranged boards is more than a predetermined length or less than an estimated length by dimensional error, machining error or the like, a problem is caused that the light source units cannot be combined together. The display apparatus of Patent Document 1 cannot solve the problem.

In the case of an image display apparatus including a light source unit, a light source mounted on a board generates heat after the board is attached and held by a support plate. Thus, it may cause a problem that the generated heat expands the board having been fixed to the support plate supporting the board, the board is distorted and the like. Hence, it may cause a problem that the board tends to be bent. When the board is distorted or bent, the connection between the board and the support plate may be loosened and the heat of light source may be radiated insufficiently.

In the display apparatus of Patent Document 2, the LED board is fixed to the radiator plate by a screw. The tightening force of the screw may bend the LED board, the LED board and the radiator plate may be separated away from each other, and thus the LED board may not be cooled sufficiently.

The threaded hole of Patent Document 3 penetrates the circuit board and the assist member. Thus, when the light generated by the light emitter is coming into a gap between the push rivet and the circuit board and a gap between the push rivet and the assist member, undesired light coming to the back side of the assist member through the threaded hole may come to and be leaked to the outside from the heat exhaust hole of the cabinet.

Such a light leakage may degrade the quality of the light source apparatus and the quality of the display apparatus including such a light source apparatus.

It may be considered to make an inner diameter of the threaded hole match with an outer diameter of a part of the push rivet inserted into the threaded hole, in order to prevent the light leakage caused by the threaded hole. However, in the considered case, it is hard to insert the push rivet into the threaded hole. Thus, it may reduce the efficiency for fitting the circuit board.

In addition, it may be considered to seal the gap between the push rivet and the circuit board and the gap between the push rivet and the assist member, after the push rivet is fit. However, it increases the number of steps for the manufacturing process and it is hard to perfectly seal the gaps. Thus, such a consideration is impractical.

In a conventional light source apparatus including a LED mounted on a circuit board as shown in Patent Document 4, heat generated by the LED increases the temperature of the circuit board. When the circuit board is bent with respect to the assist member, the contact area of the circuit board with the assist member may be reduced. Thus, it may cause a problem that the radiation performance is degraded.

In the case of the circuit board fixed by adhesive as shown in Patent Document 4, the circuit board may be bent by the heat expansion and then the adhesive may be ablated. It is unclear whether the ablation is caused at the circuit board side or the assist member side. It has not been considered in Patent Document 4 that the circuit board is bent. When the circuit board is bent, the radiation performance may be reduced by half.

The present invention is made in view of such circumstances, and has an object to provide a light source device, an image display apparatus and a television receiving apparatus, in which a light source unit includes plural light sources aligned in parallel on one surface of a board, a support plate supports the light source unit, the light source unit is slidable along an one surface of the support plate, and boards can be electrically connected even when a distance of the boards is longer than a predetermined length or shorter than an estimated length.

Another object of the present invention is to provide a light source apparatus, an image display apparatus and a television receiving apparatus, in which a thermal conductor is fixed between a board and a support plate and the distortion and bending of the board can be reduced.

Another object of the present invention is to provide a display apparatus, in which a LED board can be fixed to a support plate without being separated away from a support plate and it is possible to improve the heat conductivity from the LED board to the support plate.

Another object of the present invention is to provide a rivet, a light source apparatus and a display apparatus, in which a head portion of a rivet has a color liable to reflect light, at least a part of the rivet except for the head portion has a color liable to absorb light, and the light leakage can be prevented.

Another object of the present invention is to provide a light source apparatus and a display apparatus including the light source apparatus, in which heat of a circuit board mounting a light emitting element (light source) can be sufficiently radiated even when the circuit board is bent by the rise in temperature.

A light source apparatus according to the present invention has a light source unit in which plural light sources are aligned on one surface of a board, and comprises: a support plate that supports the light source unit; and a support means for supporting the light source unit to be slidable along one surface of the support plate.

According to the present invention, the light source unit is supported by the support means but slidable along on the one surface of the support plate. For example, the light source unit can be appropriately slid to change the position when prepared for assembling. Therefore, it is possible to facilitate electrically connecting plural light source units aligned on the support plate, even when the distance of boards of light source units is longer than a predetermined length or shorter than a given length.

A light source apparatus according to the present invention includes: the support plate that comprises an opening; the light source unit that comprises a stopper that is stopped by the opening; and the light source unit that is slidable along an aligned direction of the light sources.

According to the present invention, for example, in the case that the opening is formed in a rectangle, the stopper is stopped by the opening and an aligned direction of the light source becomes a longitudinal direction of the opening. In that case, when the stopper is moved in the longitudinal direction of the opening, the light source unit also slides to the aligned direction of the light source.

A light source apparatus according to the present invention includes the support means comprising: an opening that is formed at either one of the board and the support plate; and a convex fall preventer that is formed at the other one of the board and the support plate, inserted into the opening, relatively movable in a direction along said one surface of the support plate and capable of preventing falling.

According to the present invention, when the convex fall preventer formed at the board or the support plate is inserted into the opening, it is configured to prevent the convex fall preventer from falling out. Therefore, it is possible to support the light source unit. In addition, while the convex fall preventer is prevented from falling out, the light source unit can be slid. Therefore, it is easy to support the light source unit and change the position of the light source unit.

A light source apparatus according to the present invention includes the support means comprising: openings that are formed at the board and the support plate, respectively; and an axial fall preventer that is inserted into the openings, relatively movable in a direction along said one surface of the support plate and capable of preventing falling.

According to the present invention, the axial fall preventer is formed independently from the light source unit and the support plate, and inserted into the openings of the board and the support plate. Thus, the axial fall preventer is prevented from falling out, and the light source unit can be supported. In addition, while the axial fall preventer is prevented from falling out, the light source unit can be slid. Therefore, it is easy to support the light source unit and change the position of the light source unit.

A light source apparatus according to the present invention includes the convex fall preventer that is flexible and comprises an engagement portion engaging to an edge of the opening.

According to the present invention, when the convex fall preventer formed at the board or the support plate is inserted into the opening, the convex fall preventer is distorted. Then, the convex fall preventer is elastically restored after having been inserted. The engagement portion is hooked at the edge of the opening and stopped. Thus, the light source unit can be pushed in an axial direction of the opening to support the light source unit. Therefore, it is easier to support the light source unit.

A light source apparatus according to the present invention is configured to make the convex fall preventer or the axial fall preventer have a low reflective color at a position opposed to an inner surface of the opening or at a position outside the opening of the support plate.

According to the present invention, the convex fall preventer or the axial fall preventer has a low reflective color at a position opposed to an inner surface of the opening or at a position outside the opening of the support plate, and the low reflective color well absorbs light and prevents the reflection and transmission of light. Thus, even when the light generated by the light source comes into the opening, the low reflective color portion can prevent the reflection of the coming light. Therefore, it is possible to prevent the light leakage from the opening.

A light source apparatus according to the present invention includes the axial fall preventer comprising: a flexible column that has a small diameter head portion at one side of the flexible column, and a flexible portion at other side of the flexible column which can be distorted in a radial direction; and a pin that has a large diameter head portion opposed in a longitudinal direction to the small diameter head portion at one end of the pin, and makes the flexible portion be distorted when inserted into the flexible column.

According to the present invention, when the flexible column is inserted into the openings of the board and the support plate and then the pin is inserted into the flexible column, the flexible portion is distorted in the radial direction and then the a part of the flexible portion is stopped at the end of the opening, to support the light source unit. At that time, the small diameter head portion of the flexible column and the large diameter head portion of the pin come into contact with the one surface of the board, the force acting on the board is distributed by the small diameter head portion and the large diameter head portion. Therefore, it is possible to reduce bending of the board, and make the contact area of the board with the support plate become larger than the case in which the screw is utilized to fix.

A light source apparatus according to the present invention includes a thermal conductor fixed between the board and the support plate.

According to the present invention, it is possible to efficiently conduct the heat generated by the light source from the board and the thermal conductor to the support plate. Therefore, it is possible to prevent the rise in temperature of the light source.

A light source apparatus according to the present invention includes the thermal conductor fixed to another surface of the board, and the light source unit supported at a position where the thermal conductor is in contact with the support plate.

According to the present invention, if the board is bent with respect to the support plate by the rise in temperature, the thermal conductor is also bent. Thus, it is possible to surely keep the heat conductive area from the board to the thermal conductor and the heat conductive path from the thermal conductor to the assist plate. Therefore, it is possible to sufficiently radiate the heat generated by the light source to the support plate, and to prevent the rise in temperature of the light source.

A light source apparatus according to the present invention includes the stopper that is arranged to protrude from another surface of the board of the light source unit, is formed in a hook shape and comprises a press contact piece that applies contact force, in a direction toward said another surface of the board, on a circumference of the opening of the support plate.

According to the present invention, the press contact piece of the stopper applies the contact force directed toward said another surface of the board onto the circumference of the opening of the support plate. Therefore, the light source unit can be supported statically on the support plate even before and after the light source unit is slid.

A light source apparatus according to the present invention comprises an antislip provided on the circumference of the opening, which prevents the press contact piece from being slipped.

According to the present invention, when the stopper is stopped at the opening, the antislip can avoid the possibility that the stopper slips at the circumference of the opening.

A light source apparatus according to the present invention includes the stopper comprising two press contact pieces that are arranged to protrude from said another surface of the board of the light source unit, opposed to each other, and apply contact force, in a direction leaving two press contact pieces away from each other, on the circumference of the opening of the support plate.

According to the present invention, the contact force in the direction leaving two press contact piece of the stopper away from each other is applied to the circumference of the opening of the support plate. Therefore, the light source unit can be supported statically on the support plate even before and after the light source unit is slid.

A light source apparatus according to the present invention includes the two press contact pieces, wherein one or both of the two press contact pieces comprises a fall preventer at its own end which prevents the contact pieces from falling out from the opening of the support plate.

According to the present invention, for example, even when the light source unit is slid, the fall preventer can prevent the light source unit from falling out from the opening of the support plate.

A light source apparatus according to the present invention includes the stopper that is capable of elastic deformation, and is configured to conduct heat generated by the light source unit to the support plate.

According to the present invention, the stopper is elastically deformable. Thus, the elastical restoration force caused by the deformation works as the contact force to make the support plate support the light source unit, and to conduct the heat generated by the light source unit to the support plate. Therefore, the heat generated by the light source unit can be radiated through the support plate.

A light source apparatus according to the present invention comprises a spring that is arranged between the press contact piece and the board and biases the press contact piece toward the board.

According to the present invention, when the stopper is stopped at the opening, the press contact piece is biased toward the board by the spring and the contact force acts on the circumference of the opening. Therefore, the light source unit rests on the support plate.

A light source apparatus according to the present invention comprises a concave portion having the opening that is provided on said one surface of the support plate.

According to the present invention, for example, when the stopper keeps the elastical restoration force caused by the deformation and the elastical restoration force is utilized as the contact force, the opening provided in the concave portion makes the stopper further deform in a direction opposite to the direction of the elastical restoration force (contact force). Therefore, it is possible to increase the elastical restoration force (contact force).

A light source apparatus according to the present invention includes the light source unit arranged to cover the opening of the support plate.

According to the present invention, the light source unit is arranged to cover the opening (or the concave portion) of the support plate. Therefore, it is possible to avoid the entrance of dust coming through the opening.

An image display apparatus according to the present invention comprises: the light source apparatus described above; and a display panel that utilizes light generated by the light source apparatus to display an image.

According to the present invention, for example, the light source unit is arranged on the back side of the display panel and the light generated by the light source unit is utilized for displaying an image on the display panel.

A television receiving apparatus according to the present invention comprises the image display apparatus described above, wherein a television broadcasting signal is received, and then an image is displayed on the display panel.

According to the present invention, it is possible to receive the television broadcasting signal and display the image on the display panel.

In accordance with the present invention, the light source unit is supported by the support plate to be slidable along the one surface of the support plate. Therefore, it is possible to electrically connect the light source units even when, for example, the distance of boards (light source units) is longer than a predetermined length or shorter than a given length by dimensional error, machining error or the like.

In accordance with the present invention, the rivet (axial fall preventer) is inserted into the board hole (opening) provided to the LED board and the through hole (opening) provided to the radiator plate (support plate), and the LED board is fixed to the radiator plate. Although tightening force may act on a local area of the LED board when a screw is utilized to fix, acting force on the LED board is distributed by the large diameter head portion of the rivet when the rivet is utilized to fix. Therefore, the LED board is unlikely warped, the contact area of the LED board with the radiator plate becomes larger than the case of fixation with the screw, and it is possible to enhance the cooling effect on the LED board.

In accordance with the present invention, the rivet (axial fall preventer) can prevent the light leakage caused by the threaded hole (opening). Therefore, it is possible to enhance the quality of light source unit and the display apparatus including the light source unit. Furthermore, it is not required for the prevention of the light leakage caused by the threaded hole (opening) to match the inner diameter of the threaded hole with the outer diameter of the rivet inserted into the threaded hole. Therefore, it is easy to insert the rivet into the threaded hole. In other words, the utilization of the rivet does not degrade the workability for fixing the circuit board to the assist member (support plate). Moreover, after the rivet is fixed, it is not required to seal a gap between the rivet and the circuit board and a gap between the rivet and the assist member. Therefore, it does not increase the number of steps for the manufacturing process and it can avoid the light leakage from an unsealed portion.

The present invention can provide a light source apparatus that can radiate the heat of a circuit board, even when the circuit board mounting a light emitting element is bent by the rise in its own temperature. In addition, the present invention can provide a light source apparatus that sufficiently radiate the heat of a rectangular circuit board that includes plural light emitting elements arranged in the longitudinal direction and is likely to be bent in the longitudinal direction. In addition, the present invention can provide a light source unit that can easily configure a thermal conductor having a high performance of the thermal conductivity by a carbon-containing sheet applied to another surface of a circuit board. In addition, the present invention can provide a light source apparatus that can easily configure a thermal conductor having a high performance in the thermal conductivity by a carbon-containing paint layer on another surface of a circuit board. In addition, the present invention can provide a display apparatus that includes a light emitting element arranged at a back side of a display unit, and a behind type light source apparatus having a high performance in the radiation.

The above and further objects and features of the invention will more fully be apparent from the following detailed description with accompanying drawings.

BRIEF DESCRIPTION OF THE DRAWINGS

FIG. 1 is a perspective exploded view schematically showing a configuration of a television receiving apparatus.

FIG. 4 is a schematical-perspective view showing an exploded part of the light source apparatus in the image display apparatus according to Embodiment 1-1 of the present invention.

FIG. 7 is a cross-sectional perspective view showing the condition in which the light source unit of the image display apparatus according to Embodiment 1-1 of the present invention is supported by the support member.

FIG. 15 is a cross-section view of a main part of an image display apparatus according to Embodiment 1-6 of the present invention, in which the light source unit is supported by the support member.

FIG. 23 is a vertical cross-section view schematically showing the display apparatus in Embodiment 2.

FIG. 32 is a horizontal cross-section view showing a configuration of a columnar member of the rivet included in the light source apparatus according to Embodiment 3-1 of the present invention.

FIG. 35 is a horizontal cross-section view showing a configuration of a portion in which the circuit board and the assist member of the light source apparatus according to Embodiment 3-3 of the present invention are fixed.

DETAILED DESCRIPTION OF THE INVENTION

Figure 2:
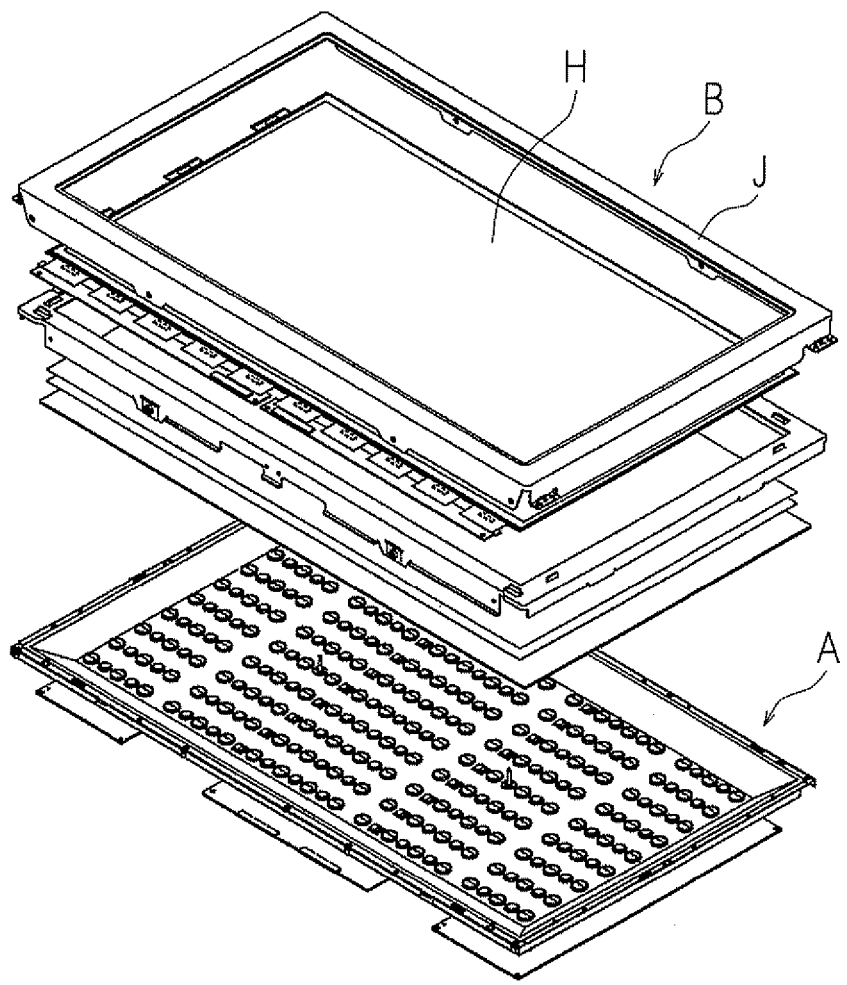
FIG. 2 is a perspective exploded view schematically showing a configuration of a liquid crystal display apparatus.

Hereinafter, the present invention is described in detail with reference to the figures illustrating embodiments. It should be noted that these embodiments are described in the context of a thin-type image display apparatus that includes a light source apparatus according to the present invention and a display unit having a display surface at the front side, and is formed in a substantially rectangular parallelepiped. The image display apparatus includes a liquid crystal display apparatus having a light source apparatus, and may be a television receiving apparatus that receives a television broadcasting signal and displays an image. FIG. 1 is a perspective exploded view schematically showing a configuration of a television receiving apparatus. FIG. 2 is a perspective exploded view schematically showing a configuration of a liquid crystal display apparatus.

The television receiving apparatus is configured to include: a liquid crystal display apparatus B; front and back cabinets C, D that sandwich the liquid crystal display apparatus B; a power source E; a tuner F; and a stand G. The liquid crystal display apparatus B is formed in a horizontally long rectangle (rectangular shape), as a whole, and accommodated in a vertical arrangement. As shown in FIG. 2, the liquid crystal display apparatus B includes: a liquid crystal panel H as a display panel; and a back light apparatus A (light source apparatus) as an external light source, in which the liquid crystal panel H, the back light apparatus A and the like are integrally supported by a frame-like bezel J and the like.
(Embodiment 1-1)

Figure 3:
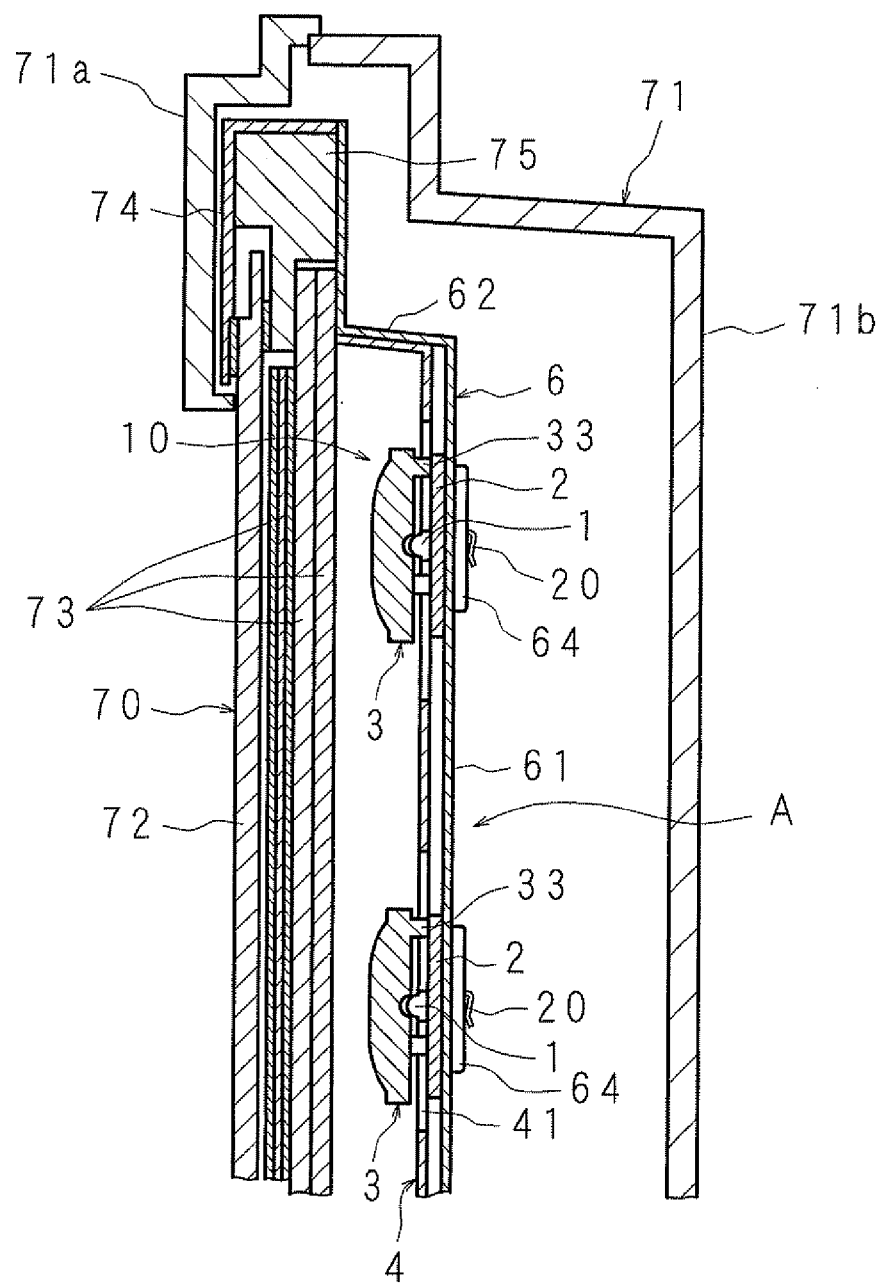
FIG. 3 is a cross-section view showing a configuration of an image display apparatus including a light source apparatus according to Embodiment 1-1 of the present invention.
Figure 5:
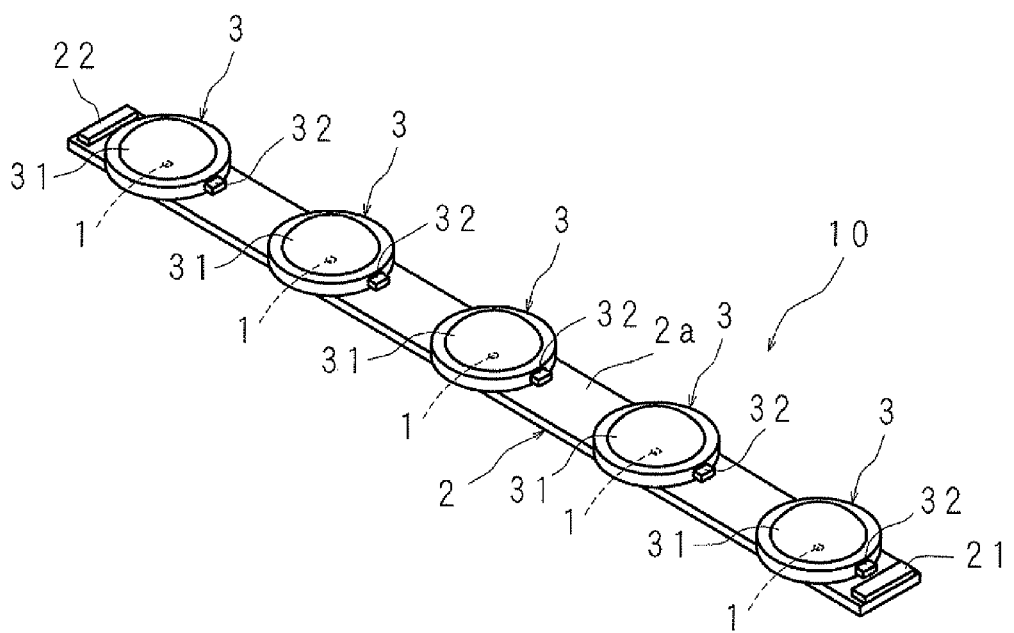
FIG. 5 is a perspective view showing a configuration of a light source unit of the light source apparatus in the image display apparatus according to Embodiment 1-1 of the present invention.

FIG. 3 is a cross-section view showing a configuration of the image display apparatus including the light source apparatus according to Embodiment 1-1 of the present invention. FIG. 4 is a schematical-perspective view showing an exploded part of the light source apparatus, and FIG. 5 is a perspective view showing a configuration of the light source unit of the light source apparatus in the image display apparatus according to Embodiment 1-1 of the present invention.

The image display apparatus 1 according to the present invention includes: a display unit 70 (liquid crystal panel H) that has a display surface at the front side to display an image; a light source apparatus A (back light apparatus) having a light source unit 10 arranged at a side back of the display unit 70; and a cabinet 71 (C, D) covers up the circumference of the display unit 70 and the back side of the light source apparatus A.

The display unit 70 includes a display panel 72 having the display surface and an optical sheet 73 arranged at a side back of the display panel 72. The circumference of the display panel 72 is supported back and forth by a front support frame 74 and a back support frame 75 to configure a panel module, and the back support frame 75 is fixed to the circumference of a support member 6 described later.

The optical sheet 73 is a laminated body with a diffuser panel that is relatively thick and a synthetic resin sheet that is relatively thin, as the diffuser panel diffuses light generated by the light source and the synthetic resin sheet is a polarized reflectance plate, a prism sheet, a diffuser sheet or the like.

The support member 6 includes a plate portion 61 and a frame portion 62 continuing to the periphery of the plate portion 61, and assists the circumference of the diffuser panel at the frame portion 62.

The cabinet 71 includes a cabinet front division 71a that covers up the front side of the circumference of the display unit 70 and a cabinet back division 71b that is formed in a basin shape and covers up the circumference and the back side of the light source unit 10. The cabinet 71 is fixed by a male screw applied to the frame portion 62 of the support member 6.

The light source apparatus A according to the present invention includes the light source unit 10 arranged at the side back the display unit 70. The light source unit 10 includes: plural LEDs 1 that are tessellatedly aligned; plural LED boards 2 that are tessellatedly aligned and mount the LEDs 1 aligned on one surface 2a; plural lenses 3 that are arranged on one surface 2a of the LED board 2, are opposed to tops of the LEDs 1 and diffuse the light generated by the LEDs 1; and connectors 21, 22 that are utilized for electrically connecting to another light source unit 10.

The light source apparatus A includes: a reflection sheet 4 that reflects light generated by the LED 1 and is provided with a through hole 41 in which the lens 3 is arranged; a connector 5 that electrically connects the light source unit 10 and another light source unit; and the support member 6 that supports the light source unit 10. The reflection sheet 4 is applied on one surface 2a of the LED board 2 of the light source unit 10.

Two types of light source unit 10 are prepared: a type in which five LEDs 1 are aligned in a line; and a type in which six LEDs 1 are aligned. They are aligned in a longitudinal direction on a line and connected by the connector 5. Plural light source units 10, 10, . . . 10 are fixed to the plate portion 61 of the support member 6 to be supported.

As shown in FIG. 4 and FIG. 5, the LED board 2 is formed in a strip shape, and aligned spaced apart from another LED board 2 in the longitudinal direction and the width direction on one surface 6a of the rectangular support member 6. Plural LEDs 1 are spaced apart by proper distances in the longitudinal direction on one surface 2a of the LED board 2. The connectors 21, 22 are arranged, respectively, at both end portions of one surface 2a in the longitudinal direction.

The two types of light source units 10, 10 are arranged, and respective connectors 21 are adjacent to each other. The adjacent connectors 21, 21 are connected by the connector 5. Among the two types, one type of the light source unit 10 is connected through a connector 22 of the LED board 2 to a power circuit board by a second connector described later, and the other type of the light source unit 10 is connected through the connector 22 of the LED board 2 to a control circuit board by a third connector described later.

Figure 6:
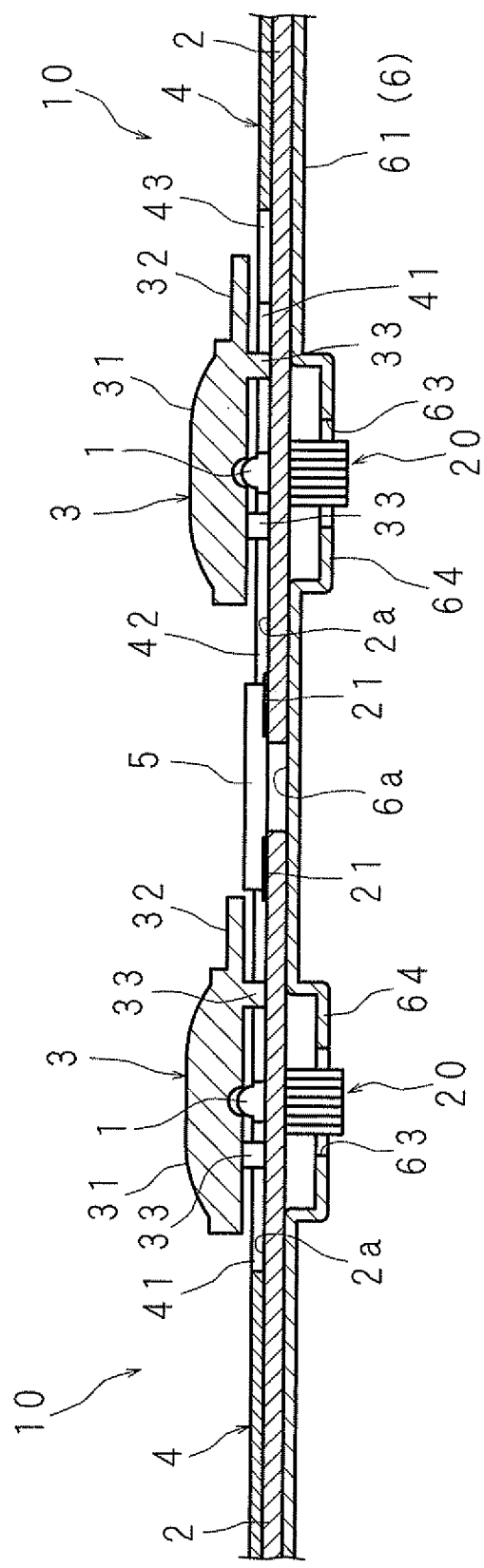
FIG. 6 is a partially-enlarged cross-section view showing a condition in which the light source unit of the image display apparatus according to Embodiment 1-1 of the present invention is supported by a support member.

FIG. 6 is a partially-enlarged cross-section view showing a condition in which the light source unit 10 of the image display apparatus according to Embodiment 1-1 of the present invention is supported by the support member 6. As described above, five or six LEDs 1 are arranged to be spaced apart in the longitudinal direction of the LED board 2, and five or six lenses 3 depending on the LEDs 1 are arranged on one surface 2a by adhesive.

The lens 3 is arranged opposed to and apart from the top of the LED 1, and includes: a transparent portion 31 that is formed in a hemisphere shape and diffuses the light generated by the LED 1 in all directions; a convex portion 32 that is arranged to protrude outwardly from a part of the circumferential surface of the transparent portion 31 and to be opposed to one circumferential surface of the through hole 41 of the reflection sheet 4, and prevents the reflection sheet 4 from being biased toward a direction leaving away from the one surface 2a; and three protrusions 33, each of which protrudes toward the LED board 2 from a surface opposed to one surface 2a of the transparent portion 31 and defines a position of the convex portion 32 with respect to the LED board 2. The tip of the positioning protrusion 33 is fixed on one surface 2a by adhesive.

The transparent portion 31 is configured to have a diameter a little smaller than the through hole 41. The convex portion 32 is configured to be beyond the edge of the through hole 41.

The circumference of the through hole 41 of the reflection sheet 4 is arranged between the convex portion 32 and one surface 2a, to prevent the reflection sheet 4 from leaving away from the LED board 2.

The positioning protrusion 33 is provided to make the distance between the convex portion 32 and the LED board 2 a little larger than the thickness of the reflection sheet 4, for absorbing the thermal expansion caused on the reflection sheet 4.

The reflection sheet 4 has a high reflective property, consists of a single sheet made of synthetic resin formed in a substantial rectangle corresponding to the support member 6, is provided with the through hole 41 at the position corresponding to the lens 3, and is provided with a second through hole 42 at a position corresponding to the connector 5. At the edge of the through hole 41, a slit 43 is provided which is an incision in the radial direction.

The through hole 41 is formed in a circle whose diameter is a little larger than the transparent portion 31, arranged tessellatedly, and keeps the transparent portion 31 inside the through hole 41. Plural through holes 41 are arranged in a grid-like manner. The slit 43 is arranged at a position corresponding to the center of the convex portion 32, and is longer than the length of the convex portion 32. The second through hole 42 is formed in a substantial rectangle, and the connector 5 is inserted into the second through hole 42.

The support member 6 is a metal plate, and includes a plate portion 61 formed in a substantially rectangular plate and a frame portion continuing to the periphery of the plate portion 61. LED boards 2 are aligned in the longitudinal direction and the width direction on one surface 6a of the plate portion 61. The support member 6 further works as a radiator plate that radiates the heat conducted from the light source unit 10 to the air. The plate portion 61 configures the support plate.

The plate portion 61 includes plural stop slits 63 at positions in contact with the LED board 2, each of which stops a stopper 20 of the LED board 2 described later. The stop slit 63 is formed in an long hole shape whose longitudinal diameter is directed in the longitudinal direction of the plate portion 61. It should be noted that the shape of the stop slit 63 is not limited to the long hole. Alternatively, the stop slit 63 may be formed in a slit shape extending in the longitudinal direction of the plate portion 61. The stop slit 63 configures an opening.

A concave portion 64 is provided on one surface 6a of the plate portion 61, which includes the stop slit 63. The concave portion 64 is hollowed in a direction from one surface 6a of the plate portion 61 to the other side, includes an opening at the one surface 6a side and includes the stop slit 63 at the bottom side. The opening and the stop slit 63 of the concave portion 63 are smaller than the area of another surface 2b of the LED board 2. The LED board 2 is configured to cover the opening and the stop slit 63 of the concave portion 64 when the LED board 2 is supported by the plate portion 61. Therefore, it is possible to avoid the entrance of dust coming through the stop slit 63.

The size of the opening of the concave portion 64 is determined to make the LED board 2 properly cover the opening of the concave portion 64 of the LED board 2 even after the LED board 2 (light source unit 10) is slid to change the position.

Although it is explained above about the example case in which the concave portion 64 having the stop slit 63 is provided, the present invention is not limited the explanation. It may be configured to include the stop slit 63 but to remove the concave portion 64. However, in that configuration, the size of the stop slit 63 should be smaller than the LED board 2 and should be determined to make the LED board 2 properly cover the stop slit 63 even after the LED board 2 (light source unit 10) is slid to change the position.

The power circuit board is arranged at one end portion of another surface in the longitudinal direction of the plate portion 61, which is connected to a driver of the LED board 2 by the second connector and supplies voltage to the driver. The control circuit board is arranged at the other end portion in the longitudinal direction, which is connected to the driver of the LED board 2 by the third connector and controls the driver. In addition, it is configured to arrange plural circuit boards at the middle part of another surface in the longitudinal direction of the plate portion 61: the power circuit board supplying voltage to the display unit; the terminal circuit board processing an image displayed on the display surface of the display unit; the control circuit board controlling the display unit and the like.

Figure 8:
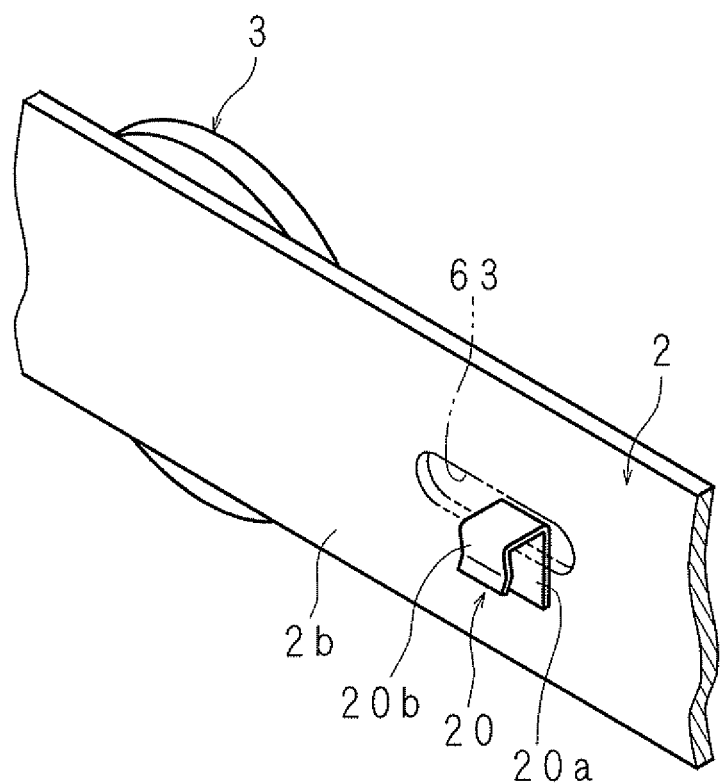
FIG. 8 is a cross-sectional perspective view showing FIG. 7 from which the support member is omitted.
Figure 9:
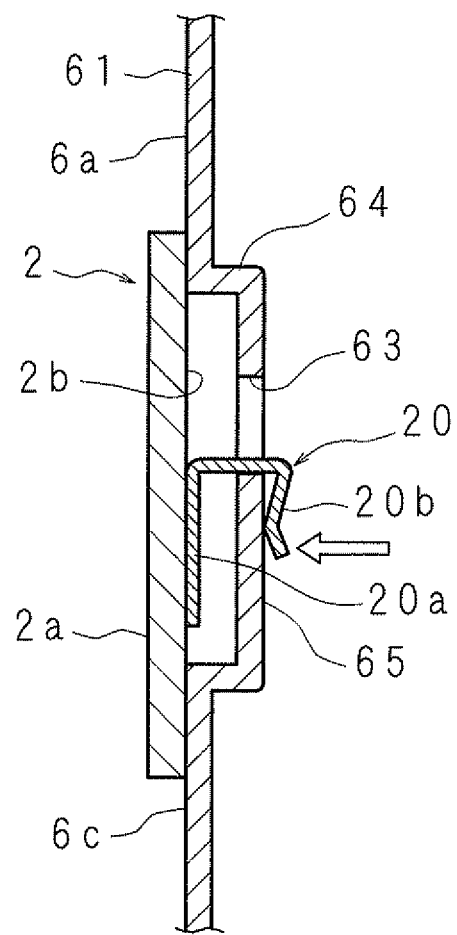
FIG. 9 is a cross-section view sectioned by a line I-I in FIG. 7.

FIG. 7 is a cross-sectional perspective view showing the condition in which the light source unit 10 of the image display apparatus according to Embodiment 1-1 of the present invention is supported by the support member 6. FIG. 8 is a cross-sectional perspective view showing FIG. 7 from which the support member 6 is omitted. FIG. 9 is a cross-section view sectioned by a line I-I in FIG. 7.

Plural stoppers 20, 20, . . . 20 are arranged on another surface 2b of the LED board 2, which makes the support member 6 support the light source unit 10. The stopper 20 is made of metal, and is elastically deformable. The stopper 20 includes: a base 20a that is formed in a rectangular plate shape and is fixed on another surface 2b of the LED board 2; and a press contact piece 20 that protrudes from one side edge of the base 20a in the width direction of the LED board 2, and whose end portion is hooked. The base 20a and the press contact piece 20b are formed integrally. In other words, it is configured that the elastical restoration force toward the base 20a (another surface 2b of the LED board 2) always acts on the end portion of the press contact piece 20b of the stopper 20.

It will be described below about the condition in which the light source unit 10 is supported by the support member 6.

In the assembly operation, the stopper 20 of the light source unit 10 is hooked on the stop slit 63 to be stopped. At that time, another surface 2b of the LED board 2 becomes in contact with the circumference 6c of the concave portion 64, and the end portion of the press contact piece 20b of the stopper 20 is supported in contact with the circumference 65 of the stop slit 63. In short, because the elastical restoration force toward another surface 2b of the LED board 2 always acts on the end portion of the press contact piece 20b of the stopper 20 as described above, the contact force illustrated by the arrow in FIG. 9 is applied to the circumference 65 of the stop slit 63 in contact with the press contact piece 20b in order to stop the light source unit 10 in contact with the support member 6.

Furthermore, when the stop silt 63 is arranged at the bottom of the concave portion 64 which is far from one surface 6a in a direction opposite to the direction of the elastical restoration force by the depth of the concave portion 64, it is possible to further deform the stopper 20 in the direction opposite to the direction of the elastical restoration force (contact force). Therefore, it is possible to apply larger contact force to the circumference 65 of the stop slit 63.

Because of such a configuration, the light source unit 10 of the image display apparatus according to Embodiment 1 not only can be slid along one surface 6a of the plate portion 61 in the longitudinal diameter direction of the stop slit 63, i.e., the aligned direction of the plural LEDs 1 while supported by the support member 6, but also can be rested on the support member 6 before and after sliding. Therefore, it is possible to electrically connect the adjacent LED boards 2 (light source units 10) with the connector 5 even when, for example, the distance of LED boards 2 (light source units 10) is longer than a predetermined length allowing the electrical connection or shorter than a given length by dimensional error, machining error or the like.

The heat generated by the LED 1 of the light source unit 10 is conducted directly to the support member 6 through the LED board 2, and conducted to the support member 6 through the plural stoppers 20, 20, ... 20. The heat conducted to the support member 6 is radiated to the air through the support member 6.

(Embodiment 1-2)

Figure 10:
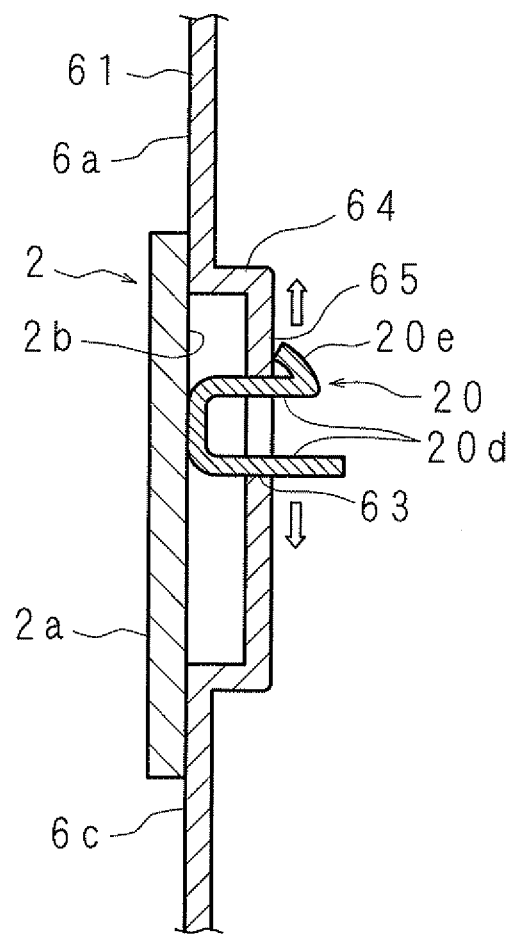
FIG. 10 is a cross-section view of a main part of an image display apparatus according to Embodiment 1-2 of the present invention, in which the light source unit is supported by the support member.

FIG. 10 is a cross-section view of a main part of an image display apparatus according to Embodiment 1-2 of the present invention, in which the light source unit 10 is supported by the support member 6.

Plural stoppers 20, 20, ... 20 making the support member 6 support the light source unit 10 are arranged at plural positions on another surface 2b of the LED board 2. The stopper 20 is made of metal, and is elastically deformable. A plate material is bent in order to obtain the stopper 20. For example, a strip plate material is bent to form symmetrical shape with respect to the center in the longitudinal direction, and the stopper 20 is fixed on another surface 2b to make the short direction become along the longitudinal direction of the LED board 2.

In short, the stopper 20 consists of a base 20c arranged at the center of the longitudinal direction and a pair of press contact pieces 20d, 20d arranged both edges of the base 20c and extending in the direction leaving from the LED board 2. The press contact pieces 20d, 20d are opposed to each other. The end portion of one press contact piece 20d is bent over in a direction opposite to the extending direction to form a fall preventer 20e. Because the stopper 20 is obtained from the bent strip plate material, the elastical restoration force acts in the anti-bending direction, i.e., the direction leaving the pair of press contact pieces 20d, 20d away from each other.

It will be described below about a condition of Embodiment 1-2 in which the light source unit 10 is supported by the support member 6.

In the assembly operation, the distance of the pair of press contact pieces 20d, 20d is kept shorter to hold the stopper 20 of the light source unit 10 and then the stopper 20 of the light source unit 10 is inserted into the stop slit 63. Then, when the holding is released, the elastical restoration force acts, the pair of press contact pieces 20d, 20d moves in the direction leaving them away from each other, becomes in contact with the edge of the stop slit 63, and applies the contact force in the direction illustrated by the arrow in FIG. 10 to the edge of stop slit 63, and light source unit 10 is rested in contact with the support member 6. At that time, the fall preventer 20e of one press contact piece 20d becomes in contact with the circumference 65 of the stop slit 63, to prevent the stopper 20 from falling out from the stop slit 63.

Because of the configuration described above, the light source unit 10 of the image display apparatus according to Embodiment 1-2 can be slid along one surface 6a of the plate portion 61 in the longitudinal diameter direction of the stop slit 63, i.e., the aligned direction of the plural LEDs 1 while supported by the support member 6. In addition, the light source unit 10 can be rested on the support member 6 before and after, and furthermore the falling of the stopper 20 from the stop slit 63 can be avoided. Therefore, it is possible to electrically connect the adjacent LED boards 2 (light source units 10) with the connector 5 by sliding one LED board 2 or both LED boards 2 even when, for example, the distance of LED boards 2 (light source units 10) is longer than a predetermined length allowing the electrical connection or shorter than a given length by dimensional error, machining error or the like.

The heat generated by the LED 1 of the light source unit 10 is conducted to the support member 6 through the LED board 2 and the plural stoppers 20, 20, ... 20. The heat conducted to the support member 6 is radiated to the air through the support member 6.

Although it is illustrated above as an example that the stopper 20 is made by bending the elastically deformable strip plate, the present invention is not limited to the illustration. For example, the pair of press contact pieces 20d, 20d may have different shapes and sizes from each other. In addition, the base 20c may be removed and only the two press contact pieces 20d, 20d arranged opposed to and apart from each other on another surface 2d of the LED board 2.

The other configurations of Embodiment 1-2 are similar to those of Embodiment 1-1. Thus, the same numbers are applied to the portions similar to Embodiment 1-1, and explanations about these portions are omitted.

(Embodiment 1-3)

Figure 11:
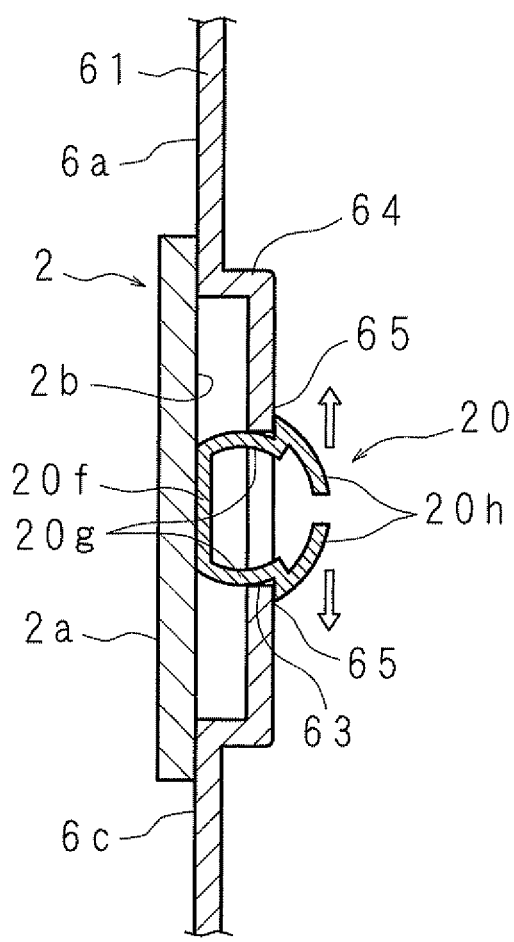
FIG. 11 is a cross-section view of a main part of an image display apparatus according to Embodiment 1-3 of the present invention, in which the light source unit is supported by the support member.

FIG. 11 is a cross-section view of a main part of the image display apparatus according to Embodiment 1-3 of the present invention, in which the light source unit 10 is supported by the support member 6.

Plural stoppers 20, 20, ... 20 making the support member 6 support the light source unit 10 are arranged at plural positions on another surface 2b of the LED board 2. The stopper 20 is made of metal, and is elastically deformable. A plate material is bent in order to obtain the stopper 20. For example, a strip plate material is bent to form symmetrical shape with respect to the center in the longitudinal direction, and the stopper 20 is fixed on another surface 2b to make the short direction become along the longitudinal direction of the LED board 2.

In detail, the stopper 20 consists of a flat base 20f arranged at the center of the longitudinal direction, a pair of press contact pieces 20g, 20g arranged both edges of the base 20f and extending in the direction leaving from the LED board 2, and fall preventers 20h, 20h respectively arranged at the end portions of the press contact pieces 20g, 20g. The pair of press contact pieces 20g, 20g are opposed to each other and curl opposite-inwardly. The fall preventers 20h, 20h are obtained by bending over the end portions of the press contact pieces 20g, 20g in a direction opposite to the extending direction and then further bending in the extending direction. Because the stopper 20 is obtained from the bent strip plate material, the elastical restoration force acts in the anti-bending direction, i.e., the direction leaving the pair of press contact pieces 20d, 20d away from each other.

It will be described below about a condition of Embodiment 1-3 in which the light source unit 10 is supported by the support member 6.

In the assembly operation, the distance of the pair of press contact pieces 20g, 20g is kept shorter to hold the stopper 20 of the light source unit 10 and then the stopper 20 of the light source unit 10 is inserted into the stop slit 63. Then, when the holding is released, the elastical restoration force acts, the pair of press contact pieces 20g, 20g moves in the direction leaving them away from each other, becomes in contact with the edge of the stop slit 63, and applies the contact force in the direction illustrated by the arrow in FIG. 11 to the edge of stop slit 63, and light source unit 10 is rested in contact with the support member 6. At that time, the fall preventers 20h, 20h become in contact with the circumference 65 of the stop slit 63, to prevent the stopper 20 from falling out from the stop slit 63.

Because of the configuration described above, the light source unit 10 of the image display apparatus according to Embodiment 1-3 can be slid along one surface 6a of the plate portion 61 in the longitudinal diameter direction of the stop slit 63, i.e., the aligned direction of the plural LEDs 1 while supported by the support member 6. In addition, the light source unit 10 can be rested on the support member 6 before and after sliding, and furthermore the falling of the stopper 20 from the stop slit 63 can be avoided. Therefore, it is possible to electrically connect the adjacent LED boards 2 (light source units 10) with the connector 5 by sliding one LED board 2 or both LED boards 2 even when, for example, the distance of LED boards 2 (light source units 10) is longer than a predetermined length allowing the electrical connection or shorter than a given length by dimensional error, machining error or the like.

The heat generated by the LED 1 is conducted to the support member 6 through the LED board 2 and the plural stoppers 20, 20, . . . 20. The heat conducted to the support member 6 is radiated to the air through the support member 6.

The other configurations of Embodiment 1-3 are similar to those of Embodiment 1-1. Thus, the same numbers are applied to the portions similar to Embodiment 1-1, and explanations about these portions are omitted.

(Embodiment 1-4)

Figure 12:
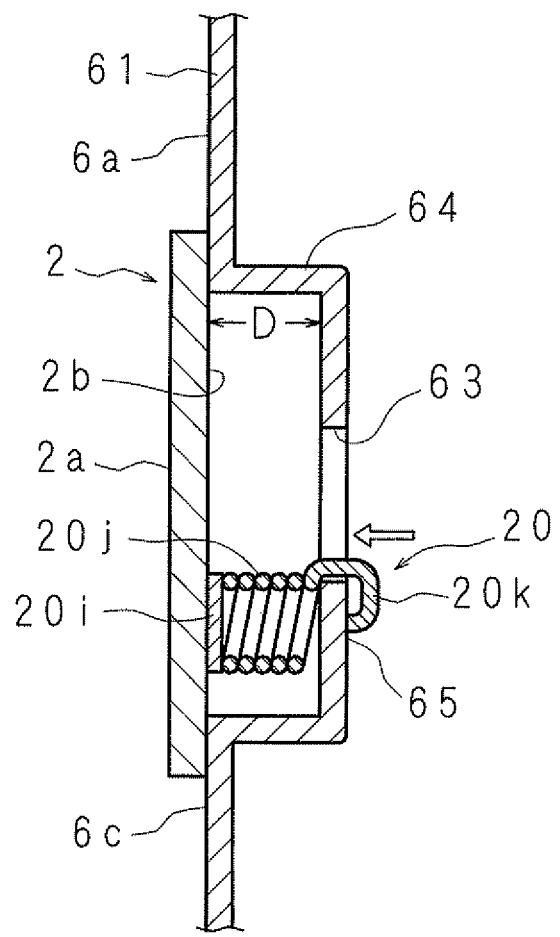
FIG. 12 is a cross-section view of a main part of an image display apparatus according to Embodiment 1-4 of the present invention, in which the light source unit is supported by the support member.

FIG. 12 is a cross-section view of a main part of an image display apparatus according to Embodiment 1-4 of the present invention, in which the light source unit 10 is supported by the support member 6.

Plural stoppers 20, 20, . . . 20 making the support member 6 support the light source unit 10 are arranged at plural positions on another surface 2b of the LED board 2.

In detail, the stopper 20 consists of a base 20i formed in a rectangular plate shape whose one surface is fixed on another surface 2b, a spring projection 20j arranged on another surface of the base 20i to protrude in the width direction of the base 20i, and a press contact piece 20k arranged next to the end portion of the spring portion 20j.

The press contact piece 20k is made of metal, is elastically deformable, and is formed in a rod shape. One end portion of the press contact piece 20k is hooked, and the other end portion continues to the end portion of the spring portion 20j. The spring portion 20j is a coil spring. The length in the protruding direction of the spring portion 20j is shorter than the depth D of the concave portion 64 of the support member 6.

Therefore, when the spring portion 20j is pulled in the protruding direction, the elastical restoration force acts on the press contact piece 20k to bias the press contact piece 20k toward the LED board 2. However, the present invention is not limited to that embodiment. The press contact piece 20k may be formed by bending the end portion of the coil spring portion 20j.

It will be described below about a condition of Embodiment 1-4 in which the light source unit 10 is supported by the support member 6. In the assembly operation, the stopper 20 of the light source unit 10 is inserted into the stop slit 63, the press contact piece 20k is hooked on the circumference 65 of the stop slit 63 to be stopped. At that time, the spring portion 20j is pulled in the protruding direction, and the elastical restoration force acts to bias toward the LED board 2 while one end portion of the press contact piece 20k becomes in contact with the circumference 65 of the stop slit 63. In short, the contact force illustrated by the arrow in FIG. 12 is applied to the circumference 65 of the stop slit 63 in contact with the press contact piece 20k in order to rest the light source unit 10 in contact with the support member 6. It is possible to prevent the stopper 20 from falling out from the stop slit 63, because the elastical restoration force always acts on the press contact piece 20k that is hooked on the circumference 65 of the stop slit 63.

Because of the configuration described above, the light source unit 10 of the image display apparatus according to Embodiment 1-4 can be slid along one surface 6a of the plate portion 61 in the longitudinal diameter direction of the stop slit 63, i.e., the aligned direction of the plural LEDs 1 while supported by the support member 6. In addition, the light source unit 10 can be rested on the support member 6 before and after sliding, and furthermore the falling of the stopper 20 from the stop slit 63 can be avoided. Therefore, it is possible to electrically connect the adjacent LED boards 2 (light source units 10) with the connector 5 by sliding one LED board 2 or both LED boards 2 even when, for example, the distance of LED boards 2 (light source units 10) is longer than a predetermined length allowing the electrical connection or shorter than a given length by dimensional error, machining error or the like.

The heat generated by the LED 1 of the light source unit 10 is conducted to the support member 6 through the LED board 2 and the plural stoppers 20, 20, . . . 20. The heat conducted to the support member 6 is radiated to the air through the support member 6.

The other configurations of Embodiment 1-4 are similar to those of Embodiment 1-1. Thus, the same numbers are applied to the portions similar to Embodiment 1-1, and explanations about these portions are omitted.

(Embodiment 1-5)

Figure 13:
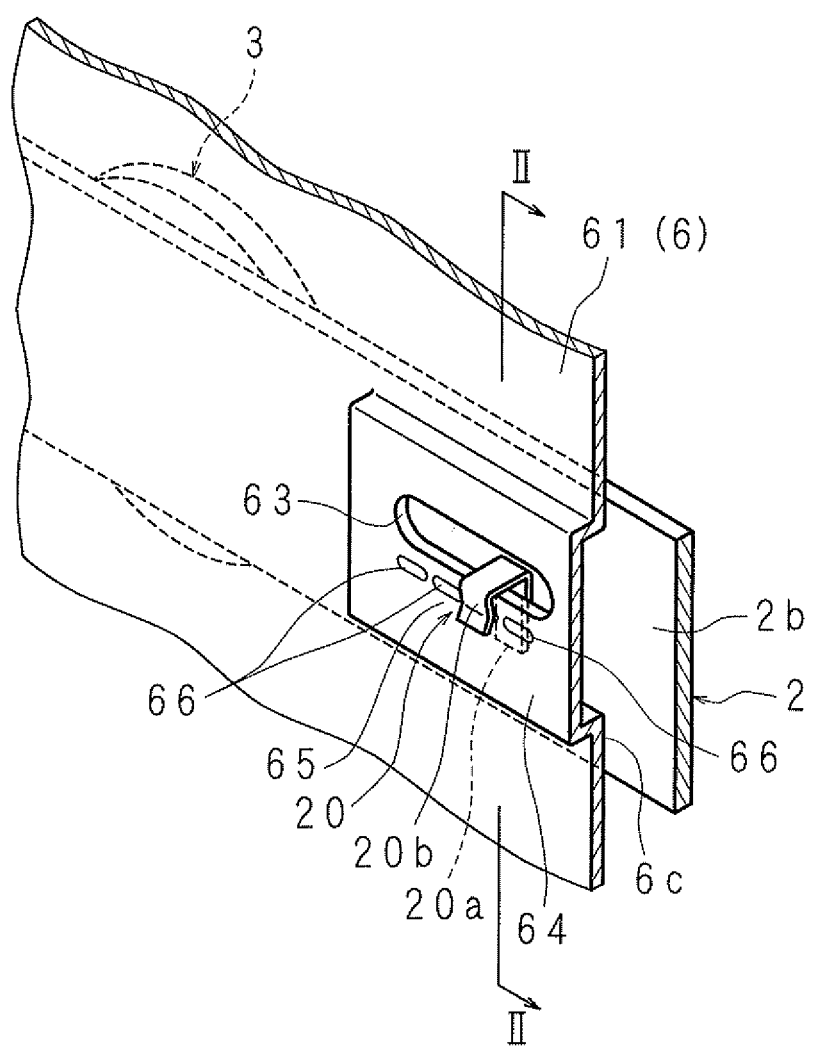
FIG. 13 is a cross-sectional perspective view for explaining a condition in which the light source unit of an image display apparatus according to Embodiment 1-5 of the present invention is supported by the support member.
Figure 14:
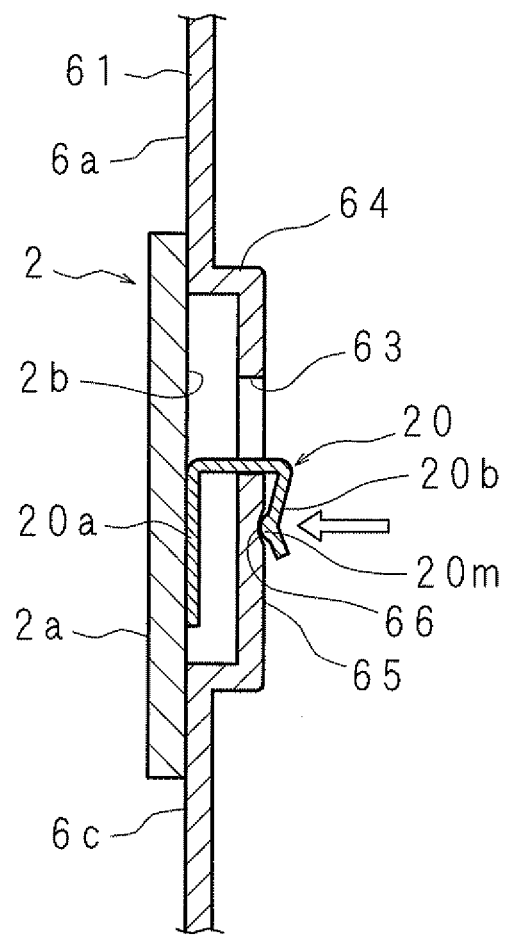
FIG. 14 is a cross-section view sectioned by a line II-II in FIG. 13.

FIG. 13 is a cross-sectional perspective view for explaining a condition in which the light source unit 10 of the image display apparatus according to Embodiment 1-5 of the present invention is supported by the support member 6. FIG. 14 is a cross-section view sectioned by a line II-II in FIG. 13.

Plural stoppers 20, 20, . . . 20 making the support member 6 support the light source unit 10 are arranged at plural positions on another surface 2b of the LED board 2. The stopper 20 is made of metal, and is elastically deformable. The stopper 20 consists of a base 20f formed in a rectangular plate shape and fixed on another surface 2b of the LED board 2, and a press contact piece 20b arranged to protrude from one side edge of the base 20a in the width direction of the LED board 2. The end portion of the press contact piece 20b is hooked, and opposed to the base 20a.

An antislip convex portion 20m is provided to prevent the slip of the stopper 20 (press contact piece 20b) on one surface of the end portion of the press contact piece 20b opposed to the base 20a. The antislip convex portion 20m is formed in a hemisphere shape, and becomes in contact with an antislip concave portion 66 described later, when the stopper 20 is stopped by the stop slit 63.

The base 20a, the antislip convex portion 20m and the press contact piece 20b are formed integrally. It is configured that the elastical restoration force toward the base 20a (another surface 2b of the LED board 2) always acts on the end portion of the press contact piece 20b of the stopper 20 including the antislip convex portion 20m. In other words, when the stopper 20 is stopped by the stop slit 63, the press contact piece 20b applies the contact force toward the direction represented by the arrow in FIG. 14 onto the circumference 65 of the stop slit 63 in contact with the press contact piece 20b to rest the light source unit 10 in contact with the support member 6.

In addition, antislip concave portions 66, 66, 66, 66 are provided at plural positions to prevent the slip of the stopper 20 (press contact piece 20b). Particularly, the antislip concave portion 66 having a shape corresponding to the antislip convex portion 20m is arranged at plural positions at which the antislip concave portion 66 becomes in contact with the antislip convex portion 20m when the stopper 20 is stopped by the stop slit 63.

Thus, when the stopper 20 is stopped by the stop slit 63, the antislip convex portion 20m of the stopper 20 fits to the antislip concave portion 66 of the circumference 65 of the stop slit 63 in order to prevent the stopper 20 from slipping upward, downward, in the left direction and in the right direction. When force more than a predetermined amount is applied to the stopper 20 (or the LED board 2) in such a condition, the antislip convex portion 20m is released from the antislip concave portion 66. Therefore, it is possible to slide the LED board 2 in the direction of said force.

Although it is illustrated about Embodiment 1-5 that the antislip concave portion 66 is a cavity, the present invention is not limited to the illustration. For example, the antislip concave portion 66 may be a hole penetrating the circumference 65 of the stop slit 63 in the width direction, or an antislip convex portion.

The other configurations of Embodiment 1-4 are similar to those of Embodiment 1-1. Thus, the same numbers are applied to the portions similar to Embodiment 1-1, and explanations about these portions are omitted.

(Embodiment 1-6)

FIG. 15 is a cross-section view of a main part of an image display apparatus according to Embodiment 1-6 of the present invention, in which the light source unit 10 is supported by the support member 6. In this embodiment, a stop slit 23 is provided on the LED board 2 and a stopper 60 is fixed on the plate portion 61, instead of the stop slit 63 provided on the plate portion 61 and the stopper 20 fixed on the LED board 2.

The LED board 2 is formed in a strip shape, and the stop slit 23 formed in the shape of a long hole is arranged at both sides in the longitudinal direction of the LED board 2. The stop slit 23 configures an opening.

The stopper 60 to be inserted into the stop slit 23 is fixed at a position of the plate portion 61 opposed to the LED board 2.

The stopper 60 is formed in a substantial "L" shape, made from a metal plate elastically deformable. One end of the stopper 60 is fixed to the plate portion 61 and a contact portion 60b at the other end is opposed to one surface 2a of the LED board 2, and the LED board 2 is configured to press the plate portion 61. High reflective material is applied on the surface not opposed to one surface 2a and on the edge of the stop slit 23, to avoid variations in brightness caused by the stopper 60. The contact portion (press contact piece) configures the engagement portion.

In this embodiment, when the LED board 2 is put on the plate portion 61, the stopper 60 is inserted into the stop slit 23 of the LED board 2. Thus, when the LED board 2 is moved a little in the width direction, the contact portion is distorted and pushed onto one surface 2a of the LED board 2 and the elastical restoration force of the contact portion applies the slide resistance force to the LED board 2. When force for sliding the LED board 2 is applied beyond the slide resistance force, it is possible to slide the LED board 2 with respect to the stopper 60 in the longitudinal direction of the stop slit 23. In the case that the support member 6 is arranged vertically, it is preferable that the contact portion 60b of each stopper 60 is arranged upwardly. In these arrangements, the weight of the LED board 2 can prevent the support member 6 from falling out.

The stopper 60 fixed to the plate portion 61 may be any one of the stoppers of Embodiment 1-1 to Embodiment 1-5.

The other configurations of Embodiment 1-6 are similar to those of Embodiment 1-1 to Embodiment 1-5. Thus, the same numbers are applied to the portions similar to Embodiment 1-1 to Embodiment 1-5, and explanations about these portions are omitted.

(Embodiment 1-7)

Figure 16:
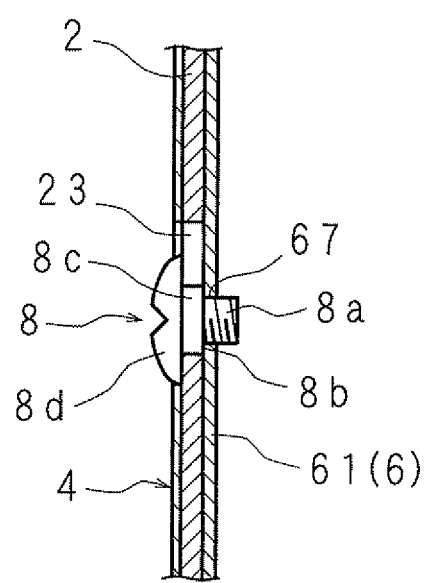
FIG. 16 is a cross-section view of a main part of an image display apparatus according to Embodiment 1-7 of the present invention, in which the light source unit is supported by the support member.

FIG. 16 is a cross-section view of a main part of an image display apparatus according to Embodiment 1-7 of the Present Invention, in which the light source unit 10 is supported by the support member 6. In this embodiment, it is configured to include an inflexible convex fall preventer 8, instead of the stopper 20 elastically deformable.

The LED board 2 is formed in a strip shape, and the stop slit 23 formed in a long hole is arranged at both sides in the longitudinal direction of the LED board 2. The stop slit 23 configures an opening.

Plural fixing holes 67 are arranged at positions opposed to the LED board 2 of the plate portion 61, and the convex fall preventer 8 inserted into the stop slit 23 is fixed to the fixing hole 67.

The convex fall preventer 8 is a stepped male screw that consists of a small diameter axial portion 8a screwed into the fixing hole 67, a large diameter axial portion 8c continuing to the small diameter axial portion 8a through a step portion 8b and inserted into the stop slit 23 with the relatively movable property, and a fall preventer portion 8d engaged with the edge of the stop slit 23 and applying the slide resistance to the LED board 2.

In this embodiment, while the LED board 2 is put on the plate portion 61, the convex fall preventer 8 is inserted from one surface 2a side of the LED board 2 into the stop slit 23 and the small diameter axial portion 8a is screwed into the fixing hole 67. Thus, the convex fall preventer 8 is fixed to the plate portion 61, the fall preventer portion 8d is engaged with the edge of the stop slit 23, and the LED board 2 is prevented from moving in the direction leaving away from the plate portion 61, i.e., the falling is prevented. The large diameter axial portion 8c is arranged inside the stop slit 23, and the LED board 2 becomes to be slidable with respect to the large diameter axial portion. The slide resistance force generated by the fall preventer portion 8d is within a proper amount that implements sliding the LED board 2 when the slide operation is performed on the LED board 2, and implements resting the LED board 2 when the slide operation is ended.

Because the convex fall preventer 8 is fixed to the plate portion 61 as described above, it is possible to more efficiently radiate the heat of the LED board 2 when the convex fall preventer 8 is made of material having a high performance of the thermal conductivity. Therefore, it is possible further prevent the expansion of the LED board 2. In addition, when a sheet type thermal conductor is arranged between the LED board 2 and the support member 6, it is possible to more efficiently radiate the heat of the LED board 2.

Although illustrated to be fixed to the plate portion 61, the stepped male screw utilized as the convex fall preventer 8 may be alternatively fixed to the LED board 2. In that alternative case, the LED board 2 is provided with the fixing hole into which the small diameter axial portion 8a is screwed, and the plate portion 61 is provided with a stop slit. Moreover, when the convex fall preventer 8 is fixed to the LED board 2, the large diameter portion 8c arranged within the stop slit 23 is made of low reflective material or has a low reflective color to avoid the case that the light generated by the LED reaches to another surface side of the assist member 6 from the stop slit at the time when the LED board 2 is being slid. The convex fall preventer 8 may also be a stepped pin having a shape similar to the stepped male screw, instead of the stepped made screw.

The other configurations of Embodiment 1-7 are similar to those of Embodiment 1-1. Thus, the same numbers are applied to the portions similar to Embodiment 1-1, and explanations about these portions are omitted.

(Embodiment 1-8)

Figure 17:
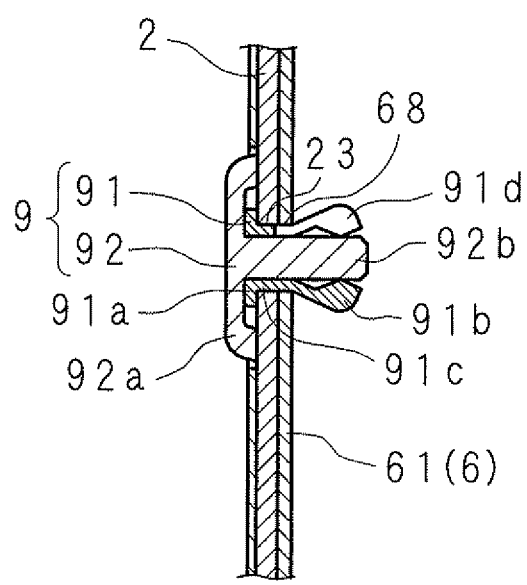
FIG. 17 is a cross-section view of a main part of an image display apparatus according to Embodiment 1-8 of the present invention, in which the light source unit is supported by the support member.

FIG. 17 is a cross-section view of a main part of an image display apparatus according to Embodiment 1-8 of the Present Invention, in which the light source unit 10 is supported by the support member 6. In this embodiment, the light source unit 10 is slidably supported by an axial fall preventer 9 that is formed independently from the LED board 2 and the support member 6, instead of the stopper 20 and the convex fall preventer 8 fixed to the LED board 2 or the support member 6 for slidably supporting the light source unit 10.

The LED board 2 is formed in a strip shape, and the stop slit 23 formed in a long hole is arranged at both sides in the longitudinal direction of the LED board 2. The stop slit 23 configures an opening.

Plural insertion holes 68 are arranged at positions opposed to the LED board 2 of the plate portion 61, and the axial fall preventer 9 inserted into the stop slit 23 is inserted into the insertion hole 68.

The axial fall preventer 9 includes: a flexible column 91 that has a small diameter head portion 91a at the one end and a flexible portion 91b distortable in the radial direction at the other end; and a pin 92 that has a large diameter head portion 92a opposite in the longitudinal direction to the small diameter head portion 91b at the one end and makes the flexible portion 91b be distorted in response to the insertion into the flexible column 91.

The flexible column 91 includes: a columnar portion 91c having a diameter a little larger than the insertion hole 68; and a small diameter head portion 91a having a diameter larger than the width of the stop slit 23 and continuing to one end of the columnar portion 91c. Plural slits 91d are arranged at plural positions in the circumferential direction of the columnar portion 91c. A portion between the slits 91d is configured to be a flexible portion 91b. The inside of the flexible portion 91b is configured to have a little smaller diameter, the peripheral portion of the pin 92 inserted into the flexible column 91 is configured to come in contact with the inside of the flexible portion 91b, and the flexible portion 91b is configured to be distorted outwardly in the radial direction.

At one end of a pillar portion 92b, the pin 92 includes the large diameter head portion 92a having a diameter larger than the small diameter head portion 91a.

In this embodiment, the flexible column 91 is inserted from the one surface 2a side of the LED board 2 into the stop slit 23 and the insertion hole 68 while the LED board 2 is put on the plate portion 61. Then, after the small diameter head portion 91a of the flexible column 91 comes in contact with the one surface 2a of the LED board 2, the pin 92 is inserted from the one surface 2a side of the LED board 2 into the flexible column 91. At that time, the tip of the pin 92 comes in contact with the inside of the flexible portion 91b, the flexible portion 91b is distorted outwardly in the radial direction and stopped at the edge of the insertion hole 68, the falling of the flexible column 91 is prevented, the falling of the pin 92 is prevented by the contact of the pin 92 with the inner surface of the flexible portion 91, and the large diameter head portion 92a of the pin 92 comes in contact with the one surface 2a of the LED board 2.

Because the small diameter head portion 91a of the flexible column 91 and the large diameter head portion 92a of the pin 92 come in contact with the one surface 2a of the LED board 2 as described above, the small diameter head portion 91a and the large diameter head portion 92a can distribute the force acting on the LED board 2 from the axial fall preventer 9. Thus, the whole of the LED board 2 in the width direction can be pushed, in comparison with the case that the head portions have smaller diameters. Therefore, it is possible to slide the LED board 2 while avoiding the distortion and the bending of the LED board 2.

In addition, because the flexible column 91 of the axial fall preventer 9 is made of low reflective material or has a low reflective color, it is possible to avoid the case that the light generated by the LED reaches from the stop slit 23 and the insertion hole 68 to another surface side of the assist member 6 in response to the slide of the LED board 2.

As described above, the small diameter head portion 91a and the large diameter head portion 92a of the axial fall preventer 9 come in contact with the one surface 2a of the LED board 2. Thus, it is possible to more efficiently radiate the heat of the LED board 2 when the axial fall preventer 9 is made of material having a high performance in the thermal conductivity. Therefore, it is possible to further prevent the expansion of the LED board 2. Furthermore, when the sheet type thermal conductor is arranged between the LED board 2 and the support member 6, it is possible to more efficiently radiate the heat of the LED board 2.

The axial fall preventer 9 may be configured with two members containing the flexible column 91 and the pin 92, or may be configured with a single member having a flexible property. In the latter case, the head portion may be arranged at one end of the axial portion inserted into the stop slit 23 and the insertion hole 68, a flexible fall preventer portion may be arranged at the other end, the fall preventer portion may be distorted at the time of inserting from the insertion hole 68 to the fall preventer portion side, and the fall preventer portion may be elastically restored and stopped at the edge of the insertion hole 68 to be stopped after the insertion.

Although illustrated to be inserted from the one surface 2a side of the LED board 2, the axial fall preventer 9 may be alternatively inserted from another surface side of the plate portion 61. In the alternative case, the flexible fall preventer portion is stopped at the edge of the stop slit 23 opened on the LED board 2. The other configurations of Embodiment 1-8 are similar to those of Embodiment 1-1. Thus, the same numbers are applied to the portions similar to Embodiment 1-1, and explanations about these portions are omitted.

(Embodiment 1-9)

Figure 18:
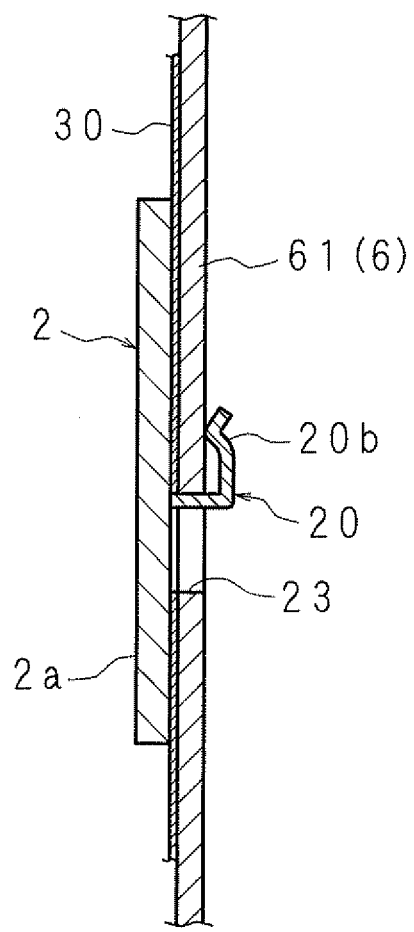
FIG. 18 is a cross-section view of a main part of an image display apparatus according to Embodiment 1-9 of the present invention, in which the light source unit is supported by the support member.

FIG. 18 is a cross-section view of a main part of the image display apparatus according to Embodiment 1-9 of the present invention, in which the light source unit 10 is supported by the support member 6. In this embodiment, a thermal conductor 30 is fixed between the LED board 2 and the support member 6.

The thermal conductor 30 is made from a carbon-containing sheet, and is applied on the whole of another surface 2b of the LED board 2 formed in a strip shape. The carbon-containing sheet 9 has a thermal conductivity better than the LED board 2, and the thermal conductivity of the carbon-containing sheet 9 is larger than the thermal conductivity of the LED board 2.

In this embodiment, the heat generated by the LED 1 can be radiated efficiently from the LED board 2 to the thermal conductor 30 and from the thermal conductor 30 to the support member 6. Therefore, it is possible to further prevent the expansion of the LED board 2, and further prevent the expansion from sliding the LED board 2.

The thermal conductor 30 is fixed on another surface 2b of the LED board 2 or the one surface 6a of the assist member 6, by a proper fixing means. In the configuration that the thermal conductor 30 is fixed on another surface 2b of the LED board 2, the size of the thermal conductor 30 is determined to make the thermal conductor 30 come in contact with the entire of another surface 2b of the LED board 2 formed in a strip shape, the both end portions of the LED board 2 in the longitudinal direction are supported to the plate portion 61 by any of the stopper 20, the convex fall preventer 8, and the axial fall preventer 9, and a part of the LED board 2 is fixed by a male screw or the like. It may be considered that the slidable LED board 2 does not cause the bending of the LED board 2. However, in fact, the LED board 2 is partially distorted when slid. Thus, it causes the problem same as the bending of the LED board 2. Hence, the LED board 2 may be partially fixed to prevent the distortion of the LED board 2.

(Embodiment 1-10)

Figure 19:
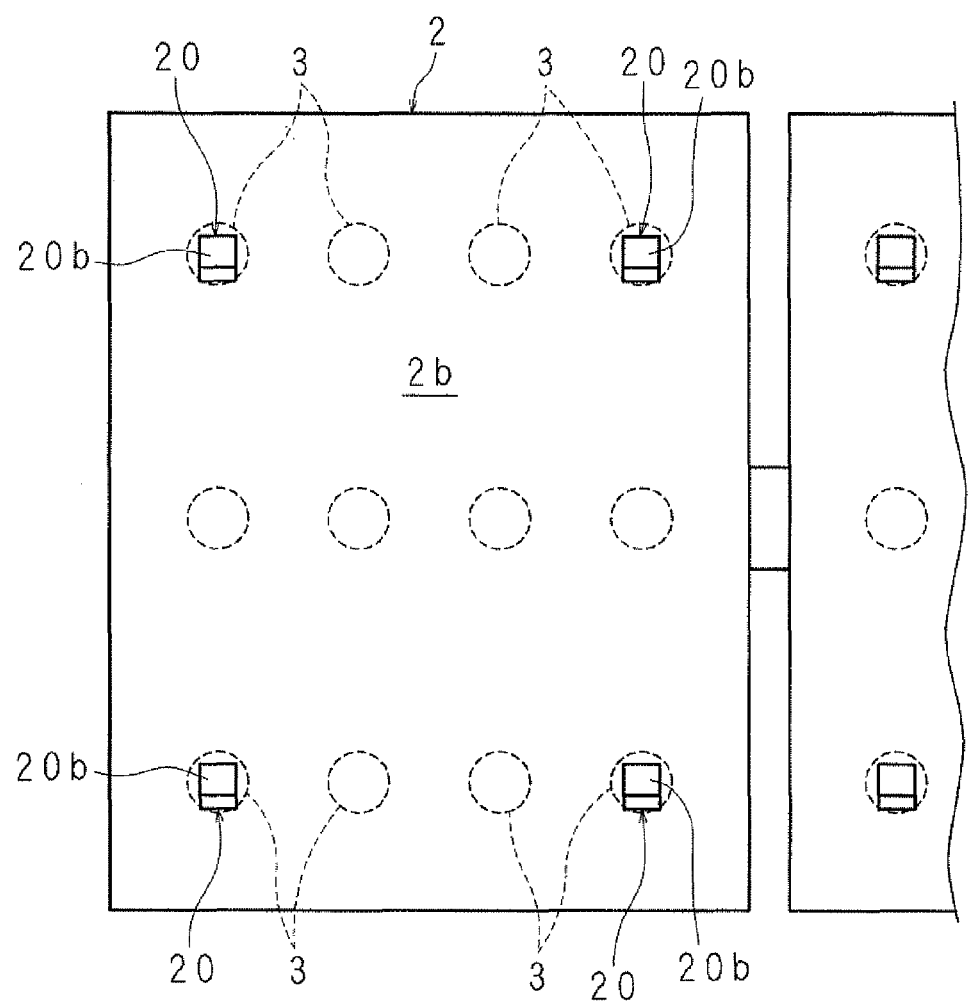
FIG. 19 is a back view showing another configuration of the light source unit.
Figure 20:
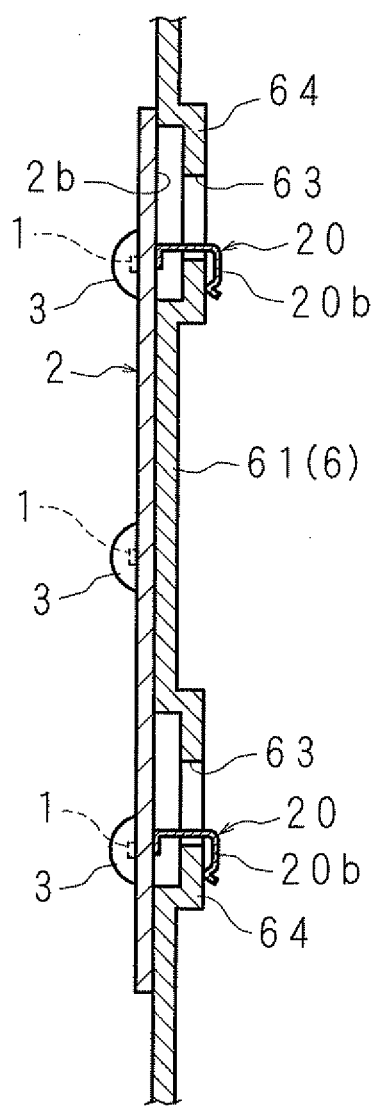
FIG. 20 is a cross-section view showing another configuration of the light source unit portion.
Figure 21:
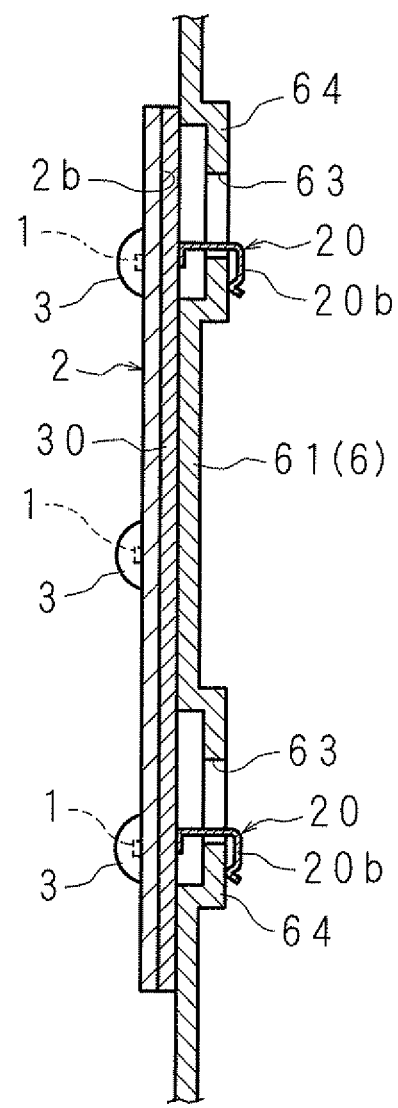
FIG. 21 is a cross section view showing another configuration of the light source unit portion including a thermal conductor.
Figure 22:
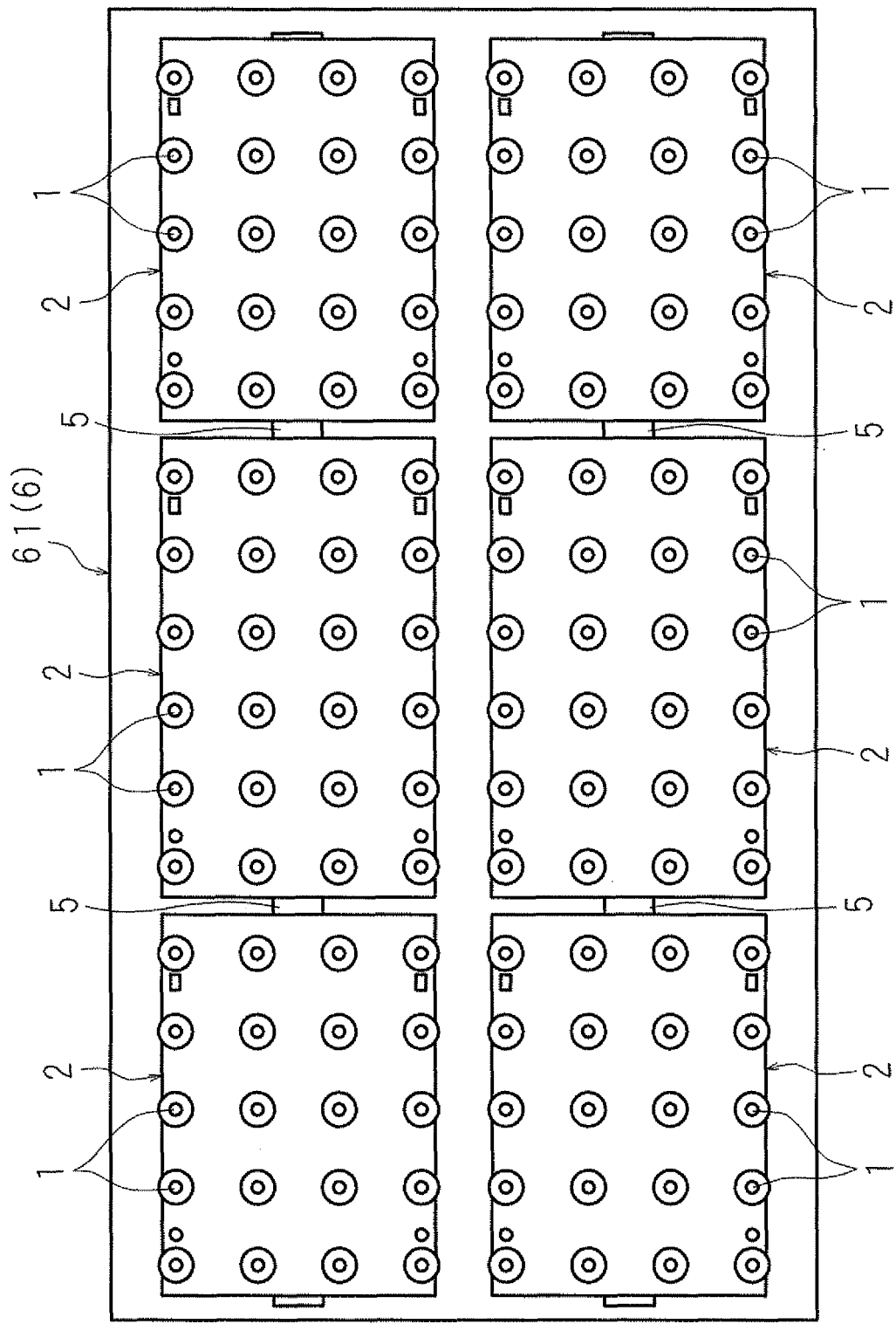
FIG. 22 is a schematical front view showing a configuration in which plural light source units are aligned in parallel with each other.

FIG. 19 is a back view showing another configuration of the light source unit. FIG. 20 is a cross-section view showing another configuration of the light source unit portion. FIG. 21 is a cross section view showing another configuration of the light source unit portion including a thermal conductor. FIG. 22 is a schematically front view showing a configuration in which plural light source units 10 are aligned in parallel.

The embodiment described above is illustrated to include the LED board 2 formed in a strip shape, in which plural LEDs 1 are aligned in a line. However, the LED board 2 may be alternatively formed in a rectangle shape as shown in FIG. 19 and FIG. 22, and include plural LEDs 1 aligned in a plural lines. In short, the present invention is not limited to the shape of the LED board 2.

In this embodiment, the stopper 20 is arranged on another square surface of the LED board 2 whose one surface is provided with plural LEDs 1 aligned in plural lines, and the stop slit 63 is opened at the position corresponding to the square portion of the LED board 2. Press contact pieces 20b of the stopper 20 are arranged to face in the same direction. When the LED board 2 is tried to be slid in one direction, the stopper 20 is stopped by the stop slit 63. LED boards 2 are arranged in plural lines to be spaced apart from each other in two directions, and LED boards 2 adjacent to each other on a line are connected by the connector 5.

The sheet type thermal conductor 30 may be applied between the LED board 2 and the support member 6. In that case, the thermal conductor 30 having a shape similar to the LED board 2 of FIG. 19 is fixed on another surface 2b of the LED board 2, and the stopper 20 is arranged at a position corresponding to the stop slit 63 of the thermal conductor 30. The stopper 20 may penetrate through the thermal conductor 30 to be fixed to the LED board 2. Alternatively, the convex fall preventer 8 and the axial fall preventer 9 may be utilized, instead of the stopper 20.

Embodiments 1-6 to 1-9 may be combined with any of Embodiments 1-1 to 1-10.

Although described above in the context of an image display apparatus as an example, the present invention is not limited to the example. It should be noted that the present invention can be applied to, for example, a cell phone, a projector, a PDA and the like.

In addition, described above in the context of the LED board 2 supported on the support member 6 by any of plural stoppers 20, 20, . . . 20, the stepped male screw, and the axial fall preventer as an example, the present invention is not limited to the example. It may be configured to utilize the stopper 20, the convex fall preventer 8 and the axial fall preventer 9, together.

(Embodiment 2)

FIG. 23 is a vertical cross-section view schematically showing the display apparatus in Embodiment 2. In the figure, the numeral "1" indicates a rectangle display panel including liquid crystal. The display panel 1 is configured to control the voltage applied to the liquid crystal, adjust the light transmission and thus display an image. The display panel 1 is sandwiched by the front support frame 2 and the back support frame 3 to hold the circumference, and is accommodated in the front cabinet 4 formed in a rectangular frame-like shape. The front cabinet 4 is arranged around the front support frame 2 and the back support frame 3. The front cabinet 4 is provided with a rectangular opening. The size of the opening corresponds to the display panel 1. At the back side of the display panel 1, plural optical sheets 5 are arranged which focus the light of the LED 9 described later into the display panel 1.

A diffuser panel 6 is arranged at the back side of the optical sheet 5, which equally diffuses the light of the LED 9. The diffuser panel 6 is assisted by the edge portion of the radiator plate 7 formed in a basin shape. Plural LED boards 8 are aligned in the front surface of the radiator plate 7, and a radiate pattern 8a is arranged at the back surface of the LED board 8. The radiation pattern 8a is a membrane made of thermally conductive material, for example, metal.

Plural LEDs 9, 9, . . . , 9 are arranged on the front surface of the LED board 8, and lenses 10, 10, . . . , 10 for diffusing light are arranged at the front sides of the LEDs 9, 9, 9, respectively. Three protrusions 10a, 10a, 10a are aligned on the circumference of the lens 10 in the circumferential direction. The protrusion 10a is arranged to protrude toward the LED board 8 side, and the tip of the protrusion 10a is fixed on the front surface of the LED board 8 by adhesive.

Assist bases (not shown) are arranged at the left and right of the radiator plate 7, respectively. The assist base is configured to assist a reflection sheet 11 formed in a basin shape. Plural holes 11a are opened on the bottom surface of the reflection sheet 11. The lens 10 is inserted into the hole 11a, and extends through the hole 11a to the front side.

The back cabinet 12 formed in a basin shape is arranged at the back side of the radiator plate 7. The horizontal and vertical sizes of the back cabinet 12 are similar to those of the front cabinet 4. The edge portion of the back cabinet 12 is opposed to the edge portion of the front cabinet 4. An engagement convex portion and an engagement concave portion (not shown in figures) are provided at each edge portion of the front cabinet 4 and the back cabinet 12. The front cabinet 4 is fixed with the back cabinet 12 by engaging the engagement convex portion to the engagement concave portion. A control board (not shown in figures) is accommodated in the back cabinet 12, and the LED 9 and the display panel 1 are driven in accordance with the output signal coming from the control board.

Figure 24:
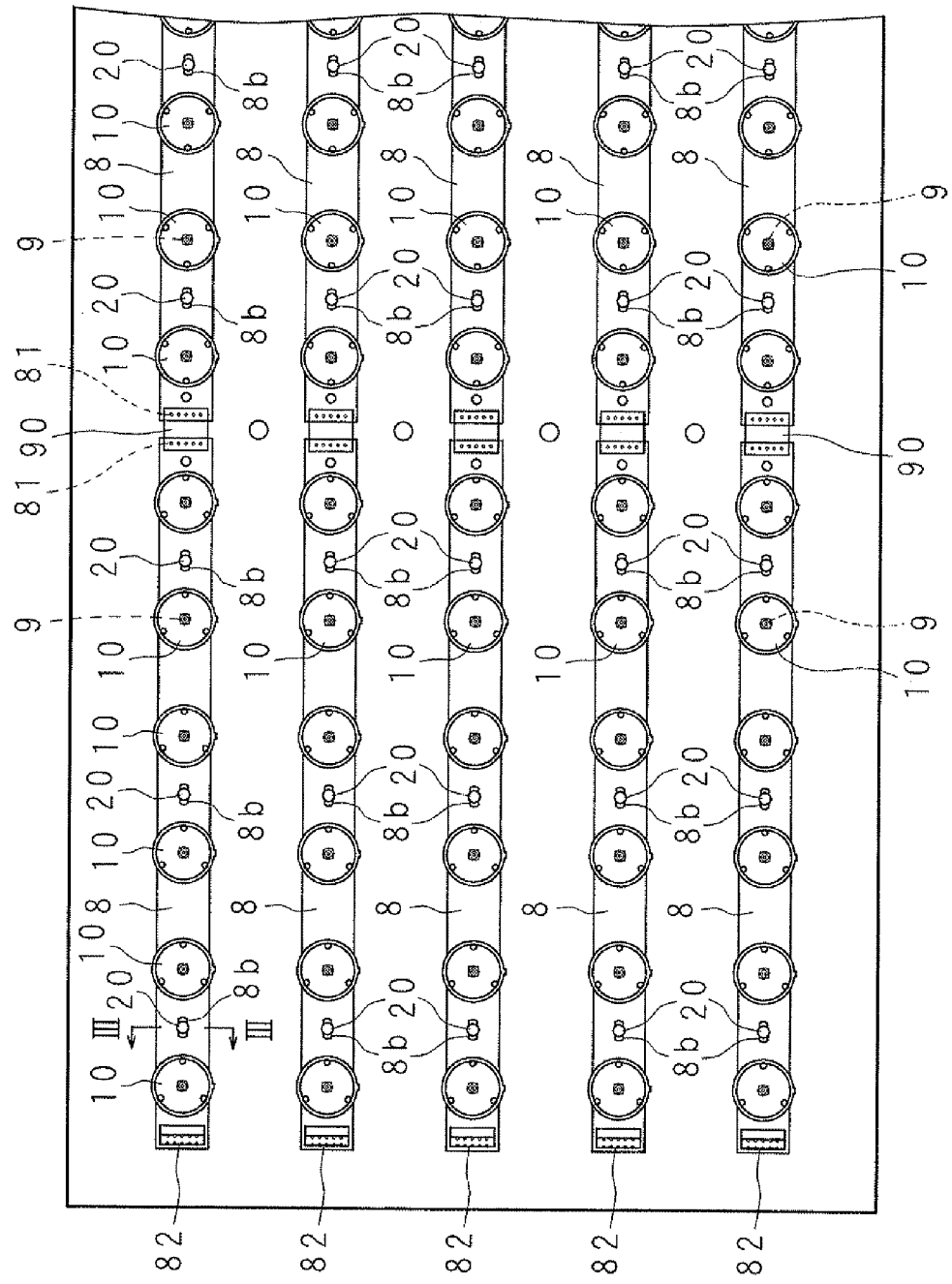
FIG. 24 is a front view schematically showing a LED board fixed to a radiator plate of the display apparatus in Embodiment 2.
Figure 25:
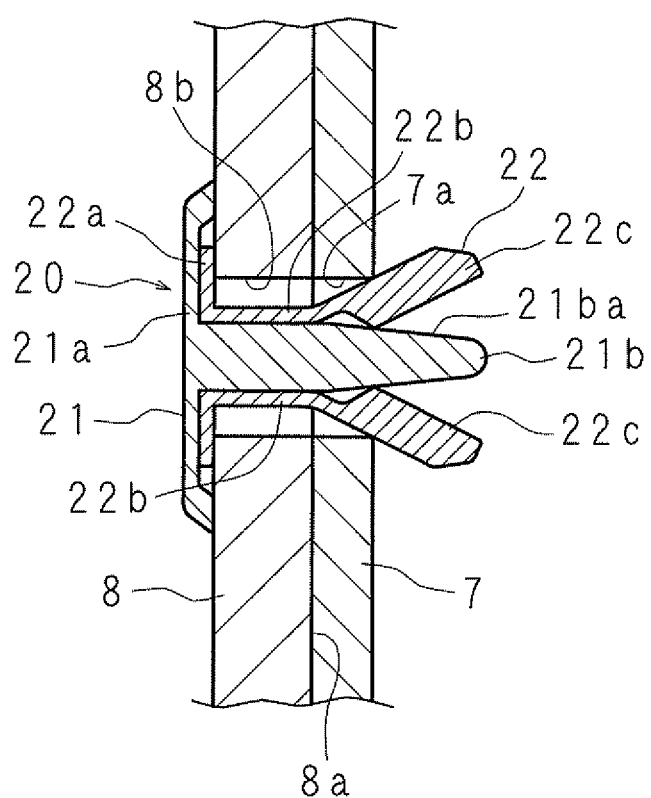
FIG. 25 is an enlarged vertical cross-section view schematically showing the LED board fixed to the radiator plate by the rivet of the display apparatus in Embodiment 2.

FIG. 24 is a front view schematically showing the LED board 8 fixed to the radiator plate 7 of the display apparatus in Embodiment 2. FIG. 25 is an enlarged vertical cross-section view schematically showing the LED board 8 fixed to the radiator plate 7 by the rivet (support means) of the display apparatus in Embodiment 2.

The radiator plate 7 is formed in a rectangle shape, and the strip shaped LED boards 8 are aligned apart from each other in the longitudinal direction and the width direction of the radiator plate 7 on the front surface of the radiator plate 7. Connectors 81, 82 are arranged on both end portions in the longitudinal direction on the front surface of the LED board 8, respectively. The connectors 81, 81 are opposed to each other in the longitudinal direction, and are connected by the connector 90. A connector 82 positioned at the end portion of the radiator plate 7 in the longitudinal direction is connected through a wire (not shown in figures) to a drive board (not shown).

Plural board holes 8b, 8b, ... 8b are aligned away from each other by equal distances in the longitudinal direction of the LED board 8. The board hole 8b is formed in an oval shape longer in said longitudinal direction. As shown in FIG. 25, plural holes 7a are opened on the radiator plate 7 at positions corresponding to the board holes 8b. The diameter of the through hole 7a is similar to the small diameter of the oval board hole 8b.

For example, a metal or carbon rivet 20 is inserted into the board hole 8b and the through hole 7a. The LED board 8 is fixed on the radiator plate 7 by the rivet 20. The rivet 20 is configured with a support rivet (flexible column) 22 and an insertion rivet (pin) 21.

The support rivet 22 contains a stopper 22a (small diameter head portion) having a diameter larger than the small diameter of the board hole 8b, and the peripheral portion of the stopper 22a is stopped at the edge portion of the board hole 8b. Plural elastic portions 22b are aligned in the circumferential direction on the inner peripheral portion of the stopper 22a. The elastic portion 22b protrudes along the axial direction of the stopper 22a, and inserted into the board hole 8b and the through hole 7a. The size of the elastic portion 22b in the axial direction is larger than the sizes of the board hole 8b and the through hole 7a in the axial direction, and the protruding end portion of the elastic portion 22b is extending from the through hole 7a in the axial direction.

A contact portion 22c is integrally formed with the elastic portion 22b at the protruding end portion of the elastic portion 22b. The contact portion 22c extends inwardly in the radial direction of the stopper 22a. A gap exists between the contact portions 22c, 22c.

An insert shaft 21b described later is in contact with the inside of the contact portion 22c. The contact of the insert shaft 21b bends the elastic portion 22b outward, touching the edge portion of the through hole 7a. Thus, the LED board 8 and radiation plate 7 are held between the stopper 22a and the elastic portion 22b.

The insert rivet 21 is provided with a head (large-diameter head) 21a having a diameter larger than that of the stopper 22a, the head having a center portion provided with the insert shaft 21b perpendicular to the head 21a. The tip portion of the insert shaft 21b is provided with a taper 21ba so that the diameter of the insert shaft 21b becomes smaller toward the tip end thereof. The size of the diameter of the insert shaft 21b around the head 21a is approximately the same as that of the inner diameter of the stopper 22a, which is larger than the distance between the contact portions 22c in the case where the insert shaft 21b is not inserted.

Figure 26A:
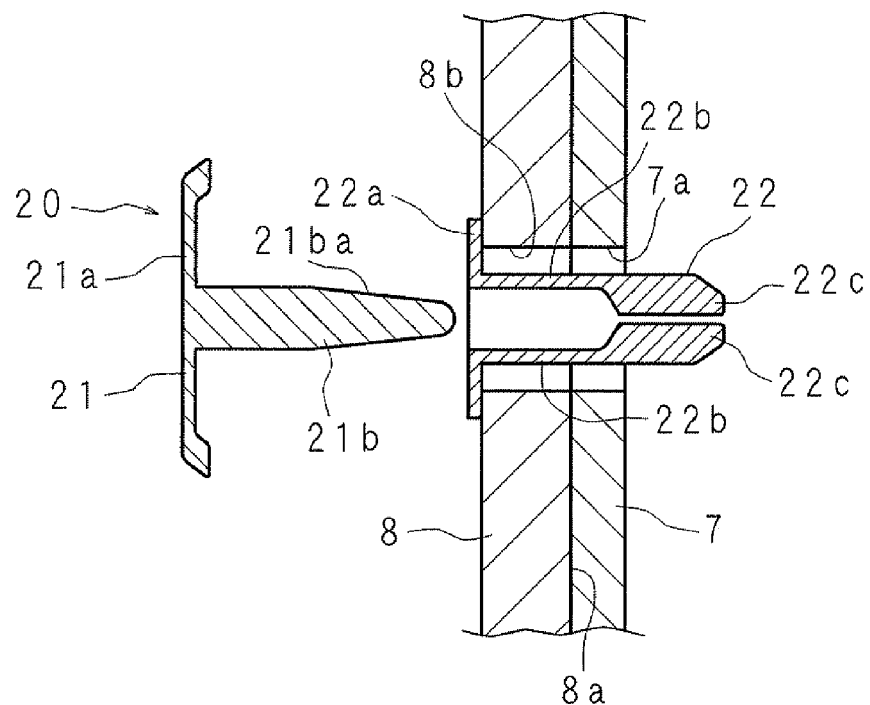
FIG. 26A is a view for explaining the LED board fixed to the radiator plate by the rivet.
Figure 26B:
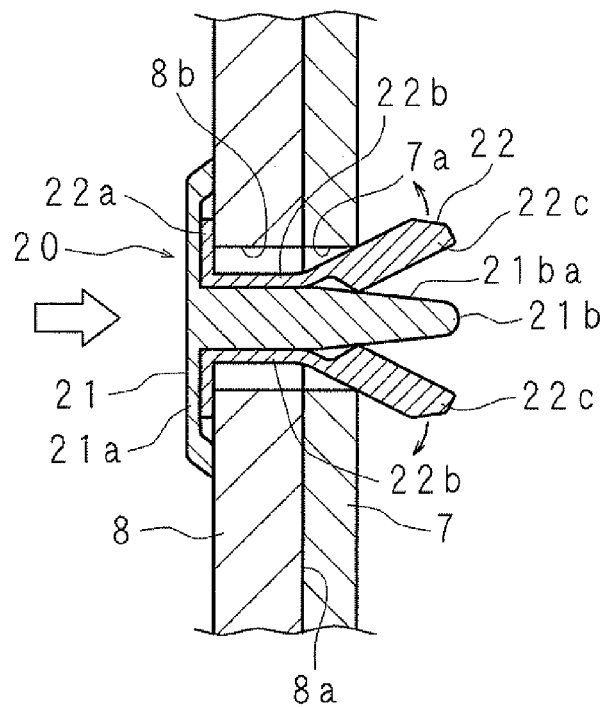
FIG. 26B is another view for explaining the LED board fixed to the radiator plate by the rivet.

Next, fixing of the LED board 8 to the radiation plate 7 with the rivet 20 will be described. FIGS. 26A and 26B are views for explaining the LED board 8 fixed to the radiator plate 7 by the rivet 20.

When the LED board 8 is fixed to the radiation plate 7, first, the LED board 8 is arranged on the radiation plate 7 such that a board hole 8b is positioned on a through hole 7a to mutually connect the connectors 81, 81. As described above, the board hole 8a is formed in an oval shape extending in the longitudinal direction (lateral direction) and can easily be adjusted in the lateral direction to connect the connectors 81, 81.

Next, a receiving rivet 22 is inserted into the board hole 8b and through hole 7a from the side of the LED board 8, and the stopper 22a is hooked to be stopped at the edge portion of the board hole 8b as shown in FIG. 26A. Here, since the insert rivet 21 is not inserted into the receiving rivet 22, the elastic portion 22b extends along the axial direction and is arranged inside the board hole 8b and through hole 7a.

Next, as indicated by the outline arrow in FIG. 26B, the insert shaft 21b of the insert rivet 21 is inserted into the stopper 22a, while the tip end of the insert shaft 21b is put into a gap between contact portions 22c. Since the taper 21ba is formed at the tip end of the insert shaft 21b, the gap is gradually expanded and the elastic portion 22b is bent outward to be in contact with the edge portion of the through hole 7a. Then, the insert rivet 21 is inserted into the receiving rivet 22 until the head 21a touches the stopper 22a, and an appropriate pressure is applied between the elastic portion 22b and stopper 22a to be in tight contact with the LED board 8 and radiation plate 7.

In the display apparatus according to the present invention, the rivet 20 is inserted into the board hole 8b arranged at the LED board 8 and the through hole 7a arranged at the radiation plate 7 to fix the LED substrate 8 to the radiation plate 7. When a screw is used, local tightening force acts on the LED board 8. When the rivet 20 is used, on the other hand, the force acting on the LED board 8 is distributed at the large-diameter head 21a of the rivet 20. Thus, the LED board 8 will not be warped, allowing the contact area between the LED board 8 and the radiation plate 7 to be larger than the case with a screw. It is thus possible to surely cool the LED board 8. Moreover, the heat generated at the LED board 8 through the pattern for heat radiation is efficiently transferred to the radiation plate 7.

Furthermore, the rivet 20 is inserted into the plurality of through holes 7a and board holes 8b arranged at equal intervals, allowing the LED board 8 to be in contact with the radiation plate 7 without unevenness. In addition, the rivet 20 is pressed toward one direction to fix the LED board, so that assembling workability can be enhanced compared to the case with screw that requires screwing operation. Moreover, at maintenance, the rivet 20 can be pulled out of the side into which the rivet 20 is inserted, improving workability in maintenance. Furthermore, the LED board may be at a low price compared to the case as disclosed in Japanese Patent Application Laid-Open No. 2008-26949, in which the LED board is fixed with a pressure pin.

The LED substrate 8 can be fixed to the radiation plate 7 while performing positioning of the LED board 8 in view of the connection between the LED boards 8 the dimensional error in the LED board 8.

While the stopper 22a is stopped at the edge of the board hole 8b, the elastic portion 22b is inserted into the board hole 8b and through hole 7b, and the insert shaft 21b is inserted into the stopper 22a to be in contact with the contact portion 22c. At that time, the elastic portion 22b is bent outward in the radial direction due to elastic deformation. The bent elastic portion 22b comes in contact with the edge of the through hole 7a, so that the LED board 8 and radiation plate 7 are held between the stopper 22a and the elastic portion 22b with an appropriate pressure.

In addition, by forming the rivet 20 with carbon or metal, the heat generated at the LED board 8 can efficiently be transferred to the radiation plate 7 through the rivet 20.

Figure 27A:
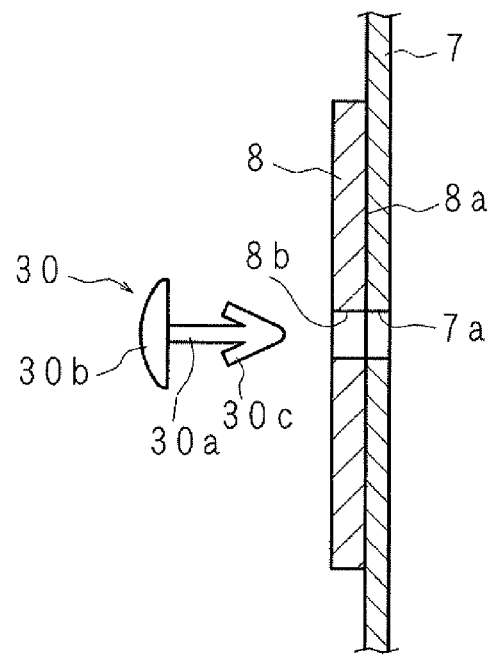
FIG. 27A is an enlarged cross-section view showing an example in which another rivet is utilized to fix.
Figure 27B:
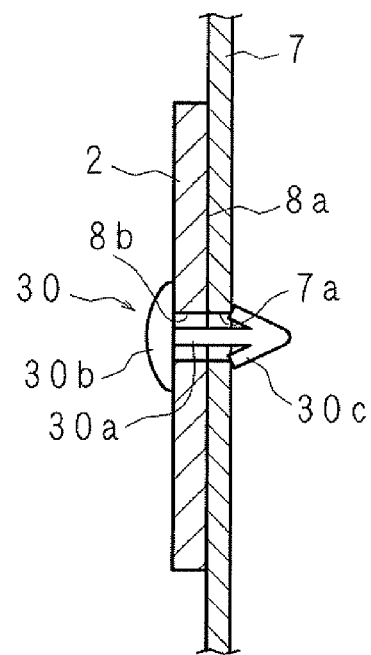
FIG. 27B is an enlarged cross-section view showing a condition in which another rivet has been utilized to fix.
Figure 28A:
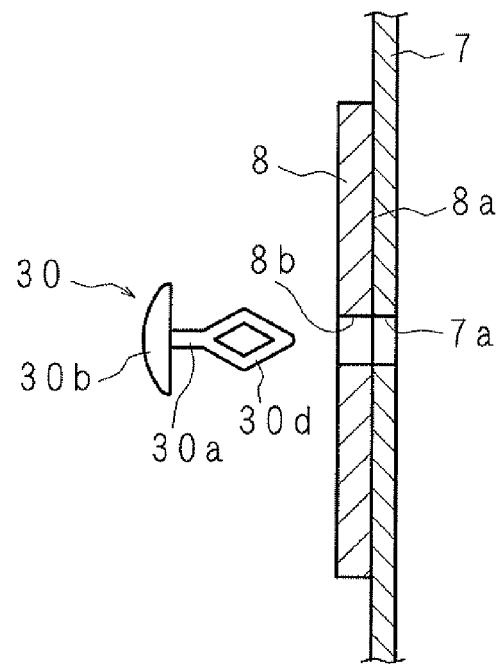
FIG. 28A is an enlarged cross-section view showing an example in which another rivet is utilized to fix.
Figure 28B:
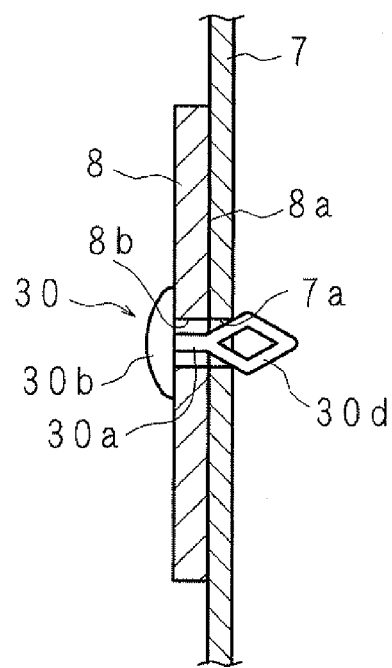
FIG. 28B is an enlarged cross-section view showing a condition in which another rivet has been utilized to fix.

Though, in Embodiment 2 described above, the LED board 8 is fixed with the rivet 20 having the insertion rivet 21 and receiving rivet 22, the LED board 8 may alternatively be fixed with a rivet 30 of an insert rivet type. FIGS. 27A and 28A are enlarged cross-section views illustrating an example for fixing with another rivet 30. FIGS. 27B and 28B are enlarged cross-section views showing a condition in which another rivet 30 has been utilized for fixing. The rivet 30 in FIG. 27A includes a head 30b continuing to one end of a shaft portion 30a and a fall preventer (engagement portion) 30c extending from the other end of shaft portion 30a to the head 30b side and having flexibility, the rivet 30 being integrally formed with synthetic resin.

When the rivet 30 is inserted into the board hole 8b and through hole 7a, the fall preventer 30c warps toward the circumferential side of the shaft portion 30a. When the fall preventer 30c comes out through the board hole 8b and through hole 7a, the fall preventer 30c is restored due to elastic force of restoration and is hooked at the edge of the through hole 7a.

The rivet 30 in FIG. 28A extends, widening toward the end, from the head 30b continuing to one end of the shaft portion 30a and the other end of the shaft portion 30a. The rivet 30 includes a flexible fall preventer (engagement portion) 30d having a substantially diamond shape narrowing toward the end, and is integrally formed with synthetic resin material.

When the rivet 30 is inserted into the board hole 8b and through hole 7a, the fall preventer 30d is warped. When the fall preventer 30d comes out of the board hole 8b and through hole 7a, the fall preventer 30d is restored by the elastic force of restoration and is hooked and stopped at the edge of the through hole 7a.

The rivet 30 can improve assembling workability as with the rivet 20, and can also be made at lower cost compared to the rivet 20.

Though Embodiment 2 above illustrated that the rivet 20 and rivet 30 are used to fix the LED board 8, the LED board 8 can alternatively be fixed with a screw. In such a case, a stepped screw is employed, which has a small-diameter shaft screwed into the through hole 7a, a large-diameter shaft continuing to the small diameter shaft through a step and inserted into the board hole 8, and a head engaged with the edge of the LED board 8 to apply resistance to the LED board 8. In such a configuration, the stress caused by a screw acting on the LED board 8 can be limited, preventing the LED board 8 from being distorted or warped. If the head of screw is formed large as in the head 21a of the insertion rivet 21 and the screw is formed with a material having high thermal conductivity, the heat from the LED board 8 can more efficiently be radiated, further preventing the LED board 8 from expanding.

Though the display apparatus according to Embodiment 2 has the insertion shaft 21b inserted from the LED board 8 side, the insertion shaft 21b may also be inserted from the radiation plate 7 side. Moreover, the rivet 20 may also be formed with synthetic resin.

(Embodiment 3-1)

Figure 29:
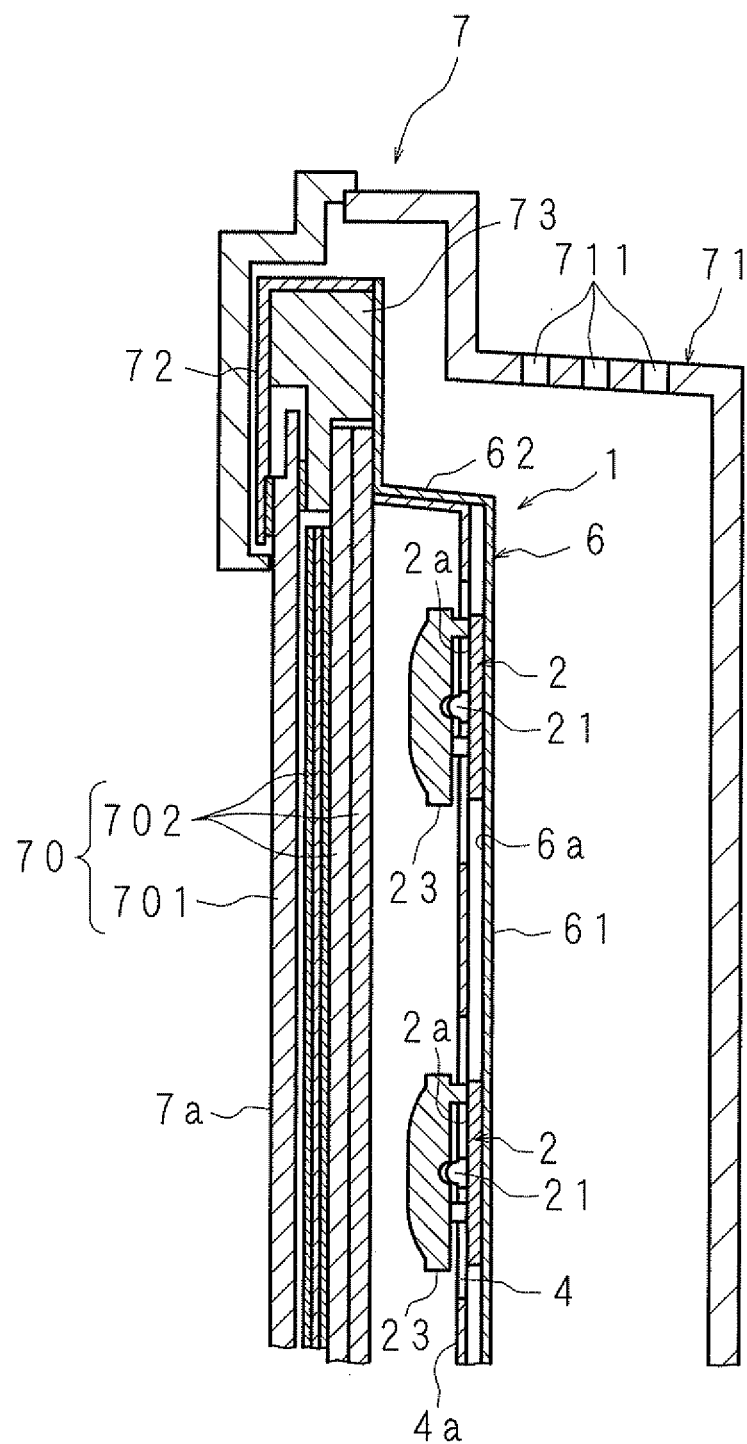
FIG. 29 is a vertical cross-section view showing a partial configuration of a display apparatus including a light source apparatus according to Embodiment 3-1 of the present invention.

FIG. 29 is a vertical cross-section view showing a partial configuration of the display apparatus 7 including a light source apparatus 1 according to Embodiment 3-1 of the Present Invention. The left-to-right direction in FIG. 29 corresponds to the front-to-back direction of the display apparatus 7 and also of the light source apparatus 1.

Figure 30:
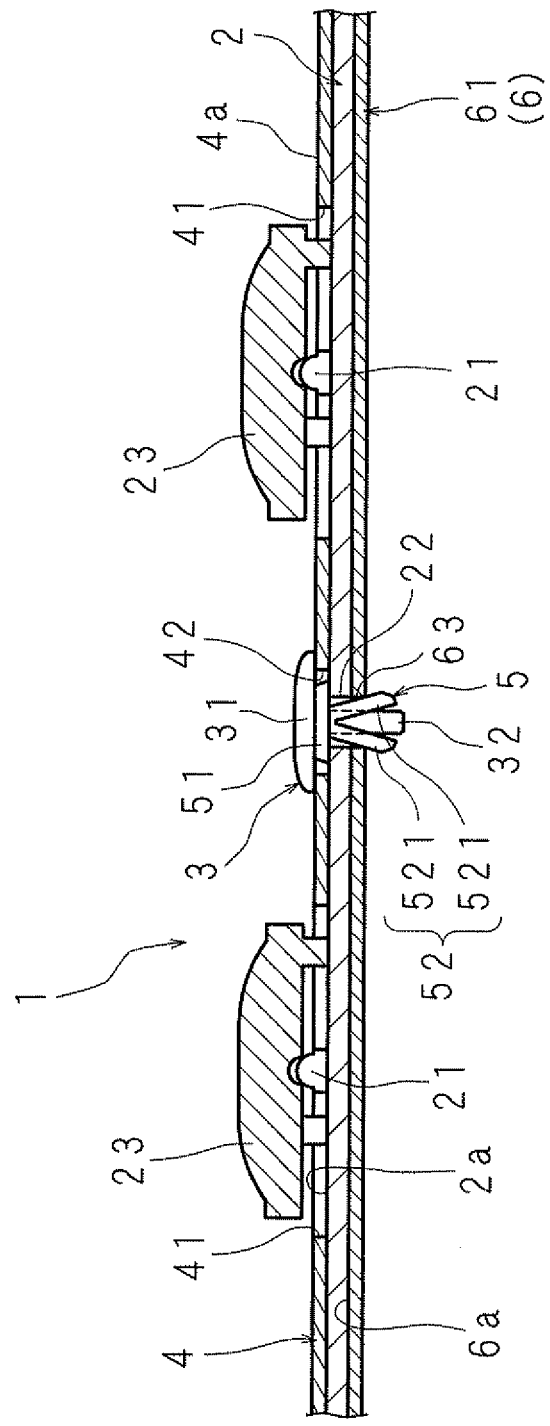
FIG. 30 is a horizontal cross-section view showing a configuration of a portion in which the circuit board and the assist member of the light source apparatus according to Embodiment 3-1 of the present invention are fixed.

FIG. 30 is a horizontal cross-section view showing a configuration of a portion in which the circuit board 2 and the assist member 6 of the light source apparatus 1 are fixed. The top-to-bottom direction in FIG. 30 corresponds to the front-to-back direction of the display apparatus 7 and also of the light source apparatus 1.

As shown in FIG. 29, the display apparatus 7 includes a display unit 70, a cabinet 71, a front side frame 72, a back side frame 73 and the light source apparatus 1.

First, configuration of the light source apparatus 1 will be described below.

As shown in FIGS. 29 and 30, the light source apparatus 1 includes plural circuit boards 2, 2, . . . , rivets (holding means) 3, 3, . . . , reflection sheet 4 and a support member 6.

Each circuit board 2 is formed in a rectangular shape elongated in the left-to-right direction, and at least a front face 2a thereof has a white color which is a color with high reflectance.

Plural light-emitters are mounted on the front surface 2a of circuit board 2 separated from each other by appropriate distances in the longitudinal direction. Each light emitter 21 is formed by a LED. A driver (not shown) for driving light emitting portions 21, 21, . . . is mounted on the circuit board 2.

On the front face 2a of the circuit board 2, plural lenses 23, 23, . . . are arranged to be corresponding to plural light-emitters 21, 21, . . . , respectively. Each of the lenses 23 is formed in a circular shape and arranged opposite to the top part of the light emitter 21. The lens 23 radiates light generated by the light emitter 21.

To the right end and left end of the circuit board 2, the first and second connectors (not shown) are mounted, respectively.

The support member 6 has a shape of a rectangular plate formed of a metal plate, and includes a flat plate portion 61 having a rectangular flat plate and a frame portion 62 continuing to the periphery of the flat plate portion 61.

The support member 6 supports circuit boards 2, 2, . . . . Thus, the circuit boards 2, 2, . . . are arranged in matrix and fixed to the front face 6a of the flat plate portion 61. As a result, the light-emitters 21, 21 are also arranged in matrix.

At the right end of the support member 6, a power circuit board (not shown) that supplies power to a driver for each of the circuit boards 2, 2, . . . is attached. At the left end of the support member 6, a control circuit board that controls the operation of the driver for each of the circuit boards 2, 2, . . . is attached.

On the circuit boards 2, 2 adjacent to each other in the left-to-right direction, the first connecting portion for the circuit board 2 arranged at the left side is electrically connected to the second connecting portion for the circuit board 2 arranged at the right side through the first connector bridging the first and second connecting portions.

Moreover, each of the first connecting portions mounted on the circuit boards 2, 2, . . . at the rightmost end of the flat plate portion 61 is electrically connected to the power circuit board through the second connector (not shown).

Furthermore, each of the second connecting portions mounted on the circuit boards 2, 2, . . . , at the leftmost end of the flat plate portion 61 is electrically connected to the control circuit board through the third connector (not shown).

Each connector has a cream color which has high reflectance.

The reflection sheet 4 is formed of a synthetic resin sheet, at least the front face 4a of the reflection sheet 4 having a white color which has high reflectance. Moreover, the reflection sheet 4 is formed in a rectangular shape corresponding to the shape of the support member 6. At positions corresponding to the lens 23, 23, . . . , circular through holes 41, 41, . . . are formed.

The reflection sheet 4 comes in contact with the front faces 2a, 2a, . . . of the circuit boards 2, 2, . . . and is fixed to the support member 6 while the lens 23, 23, . . . are arranged inside the through holes 41, 41, . . . .

The configuration of the display apparatus 7 illustrated in FIG. 29 will now be described.

The light source apparatus 1 is arranged on the back side of the display portion 70 so as to illuminate the display portion 70.

The display portion 70 is formed in a rectangular shape and includes a display panel 701 and an optical sheet 701.

The display panel 701 is, for example, a liquid-crystal display panel and has a front surface configuring the display surface 7a on which an image is displayed.

The optical sheet 702 is arranged, opposing to the back surface of the display panel 701, between the display panel 701 and the lens 23, 23, . . . , and serves to radiate the light emitted by the light emitters 21, 21, . . . . The optical sheet 702 is a laminated body in which a relatively thick diffusion plate and a relatively thin synthetic resin sheet made of a reflecting-polarized plate, a prism sheet, a diffusion sheet or the like are laminated.

The display panel 701 is sandwiched, at its periphery portion, between the front frame 72 and the back side frame 73, to configure a panel module.

The back side frame 73 is attached to the frame portion 62 of the support member 6, while the optical sheet 702 is sandwiched, from front and back thereof, between back side frame 73 and the frame portion 62.

The cabinet 71 houses the panel module, the optical sheet 702 and the light source apparatus 1 while the display surface 7a is exposed from the front opening and components other than the display surface 7a are covered. At the cabinet 71, heat exhaust openings 711, 711, . . . are formed so that the heat generated inside the cabinet 71 can easily be discharged to the outside.

At the central portion in the left-to-right direction on the back surface of the flat plate portion 61 of the support member 6, plural circuit boards are attached. These circuit boards may include a power circuit board that supplies power to the display panel 701, an image processing circuit board that performs image processing on an image to be displayed on the display surface 7a, and a control circuit board that controls operation of the display panel 701.

Next, fixing for the reflection sheet 4, circuit boards 2, 2, . . . and support member 6 will be described in detail.

First, the rivet 3 will be described.

Figure 31A:
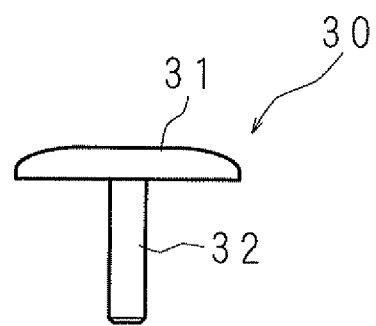
FIG. 31A is a plan view showing an appearance of the rivet included in the light source apparatus according to Embodiment 3-1 of the present invention.
Figure 31B:
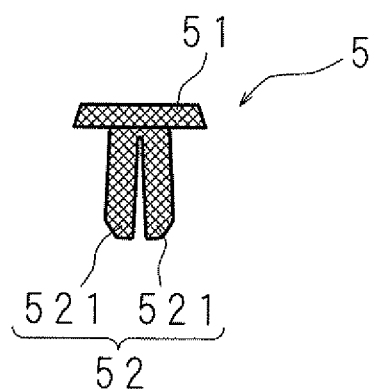
FIG. 31B is a plan view showing an appearance of the rivet included in the light source apparatus according to Embodiment 3-1 of the present invention.

FIGS. 31A and 31B are plan views showing an appearance of the rivet 3. The direction of the rivet 3 shown in FIGS. 31A and 31B correspond to the direction of the rivet 3 shown in FIG. 30.

The rivet 3 is formed as a push rivet, and includes a pin body 30 as shown in FIG. 31A and a tubular member 5 as shown in FIG. 31B. The pin body 30 has a white color which has high reflectance. The tubular member 5 has a black color which has high absorbance. In FIGS. 31A and 31B, a portion with a black color is indicated by a hatched area.

FIG. 32 is a horizontal section view illustrating the configuration of the tubular member 5 and corresponds to FIG. 31B.

The pin body 30 consists of a disk-shaped head 31 and a columnar shaft portion 32. The shaft portion 32 protrudes from the center of the back surface of the head 31 while aligned concentrically with the head 31. Moreover, the back surface of the head 31 is provided with a hole (not shown) to which a flange 51, which will be described later, is fit. Such a pin body 30 is integrally formed using white synthetic resin.

The tubular member 5 is formed by the disk-shaped flange 51 and an open-close portion 52 having four open-close legs 521, 521. The flange 51 (or open-close portion 52) is arranged at one end (or the other end) of the tubular member 5. The outer diameter of the flange 51 is sufficiently shorter than the outer diameter of the head 31. The length of the open-close portion 52, i.e. the amount of protrusion from the flange 51) is sufficiently larger than the total thickness of the circuit board 2 and flat plate portion 61. Such a tubular member 5 may be integrally formed with black synthetic resin.

The open-close portion 52 opens and closes in the radial direction along with the relative movement in the axial direction of the shaft portion 32 inserted from one end of the tubular member 5. For this purpose, the open-close legs 521, 521, . . . are formed to be symmetrical with respect to the central axis of the tubular member 5, and formed with the respective base ends having flexibility. In other words, the open-close legs 521, 521, . . . are so formed as to be able to be opened and closed in the radial direction in a front view.

A shaft fitting hole 50 is formed at the central part of the flange 51 in the radial direction. The base end of each open-close leg 521 is arranged at the periphery of the shaft fitting hole 50 at the back of the flange 51.

The inner diameter of the shaft fitting hole 50 is approximately equal to the outer diameter of the shaft portion 32.

When the shaft portion 32 is not inserted into the tubular member 5, the distance in the radial direction between the inner surfaces of the tip portions of the open-close legs 521, 521, . . . is much shorter than the outer diameter of the shaft portion 32. This can prevent inconvenience such that the shaft portion 32 is inserted into the tubular member 5 from the side of the open-close portion 52 by mistake.

The shaft portion 32 is inserted from the side of the flange 52 into the tubular member 5. The tip end of the inserted shaft portion 32 passes through the shaft fitting hole 50 and through the base ends of the open-close legs 521, 521 to be pushed into the tip ends of the open-close legs 521, 521, . . . . The shaft portion 32 then expands the open-close legs 521, 521, . . . outward in the radial direction. As a result, the open-close portion 52 is made open.

When, on the other hand, the shaft portion 32 is pulled out from the tip ends of the open-close legs 521, 521, . . . , the open-close portion 52 is closed due to the elastic force of restoration of the open-close legs 521, 521, . . . .

The boundary portion between the base end and the tip end of the inner surface of each of the open-close legs 521, 521, . . . are formed in a tapered shape so as to make the open-close portion 52 smoothly opened and closed.

Here, the maximal size of the open-close portion 52 in the radial direction when closed is at least not more than the outer diameter of the head 31. Furthermore, the maximal size of the open-close portion 52 in the radial direction when opened is sufficiently longer than the inner diameter of a threaded hole 63 which will be described later. It should be noted that no serious problem is caused even if the maximal size of the open-close portion 52 in the radial direction in the opened state exceeds the outer diameter of the head 31.

As shown in FIG. 30, at the support member 61, plural threaded holes 63, 63, . . . are formed penetrating through the flat plate portion 61. The inner diameter of the threaded hole 63 is appropriately longer than the maximal size of the open-close portion 52 in the radial direction in the closed state, and is sufficiently shorter than the maximal size of the open-close portion 52 in the radial direction in the opened state.

Moreover, on the circuit board 2, threaded holes 22, 22 that penetrate the front surface 2a and back surface are arranged at positions corresponding to the threaded holes 63, 63, . . . formed at fixed positions on the circuit board 2. The inner diameter of each threaded hole 22 is equal to or longer than the inner diameter of the threaded hole 63 and shorter than the outer diameter of the flange 51.

Furthermore, the reflection sheet 4 is provided with threaded holes 42, 42, . . . , which penetrate through the front surface 4a and back surface, formed at positions corresponding to the threaded holes 22, 22, . . . . The inner diameter of the threaded hole 42 is equal to or longer than the outer diameter of the flange 51. Some threaded holes 42 may have inner diameters shorter than the outer diameter of the head 31, while the other threaded holes 42 may have inner diameters equal to or longer than the outer diameter of the head 31, though not illustrated.

When the rivet 3 is attached into the threaded hole 42 having an inner diameter shorter than the outer diameter of the head 31, the rivet 3 fixes the reflection sheet 4, circuit board 2 and support member 6 (see FIG. 30). When, on the other hand, the rivet 3 is attached into the penetration hole 42 having an inner diameter equal to or longer than the outer diameter of the head 31, the rivet 3 fixes the circuit board 2 and the support member 6.

Figure 33:
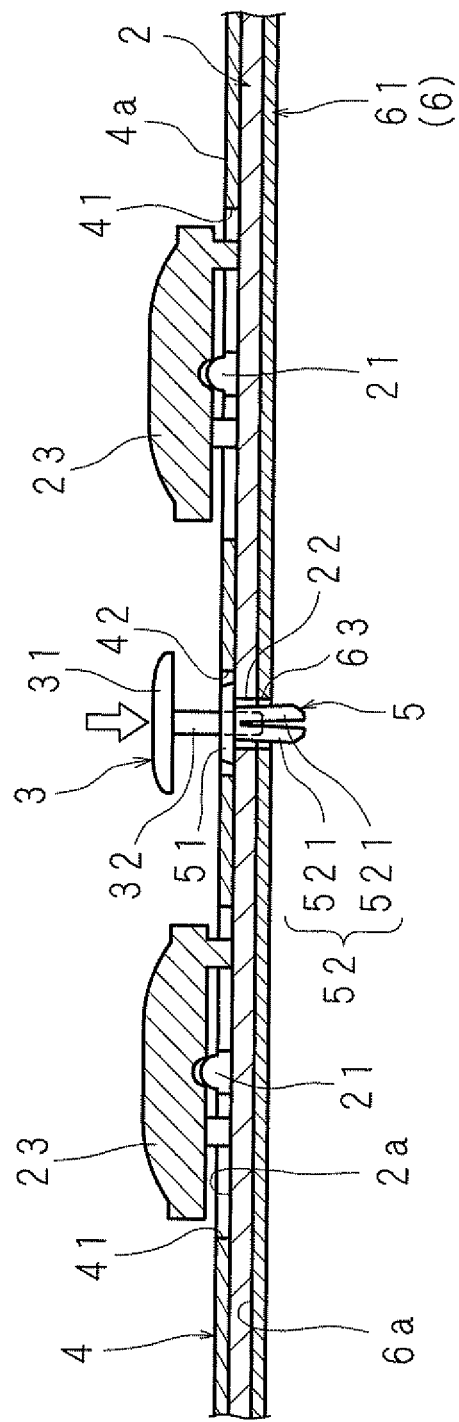
FIG. 33 is a horizontal cross-section view for explaining a procedure to fix the circuit board and the assist member included in the light source apparatus according to Embodiment 3-1 of the present invention.

FIG. 33 is a horizontal cross-section view for explaining a procedure for fixing the circuit board to the assist member, and corresponds to FIG. 30.

When the light source apparatus 1 in the display apparatus 7 is manufactured, the manufacturer arranges each circuit board 2 at a fixed position to align the threaded holes 22, 22, . . . formed at the circuit board 2 with the threaded holes 63, 63, . . . formed at the support member 6.

The rivet 3 has the shaft portion 32 inserted into the tubular member 5 and is prepared while the open-close portion 52 of the tubular member 5 is closed.

Subsequently, the manufacturer holds the head 31 of rivet 3 and puts the shaft portion 32 into the threaded holes 22 and 63 in this order (see FIG. 33). The threaded holes 22, 63 through which the shaft portion 32 is to be put at this time point, however, should correspond to the threaded hole 42 having an inner diameter equal to or larger than the outer diameter of head 31.

Since the shaft portion 32 is inserted into the tubular member 5, the open-close portion 52 is also inserted through the threaded holes 22, 63. Here, the flange 51 is in contact with the front surface 2a of the circuit board 2 to be stopped at the circuit board 2. The tubular member 5 can easily be positioned by the contact of the flange 51 and circuit board 2.

The manufacturer than pushes the head 31 toward the circuit board 2 side until the head 31 touches the front surface 2a of the circuit substrate 2 (see the outlined arrow indicated in FIG. 33). This allows the open-close portion 52 to be opened. Thus, the opened open-close portion 52 is in contact with the back surface of the flat plate portion 61 to be stopped at the support member 6.

In other words, the tubular member 5 serves as a stopper in the embodiment of the present invention. The flange 51 fits into the hole formed at the back surface of the head 31, so that the tubular member 5 is completely covered at the front surface 2a side of the circuit board 2.

The circuit board 2 and flat plate portion 61 is held between the head 31 and the opened open-close portion 52. As a result, the circuit board 2 is fixed to the support member 6. Furthermore, the open-close portion 52 holds the shaft portion 32 in the radial direction by the elastic restoration force of the open-close portions 521, 521, . . . . Hence, unnecessary movement of the pin body 30 away from the tubular member 5 can be suppressed.

As described above, after fixing all the circuit boards 2, 2, . . . to the support member 6, the manufacturer places the reflection sheet 4 over the support member 6. Here, the manufacturer places the reflection sheet 4 such that the back surface thereof touches the front surface 2a of each of the circuit boards 2, 2, . . . , and that the head 31 of the rivet 3 which has already been attached to each of the threaded holes 22, 63 is arranged inside the threaded hole 42 having an inner diameter equal to or larger than the outer diameter of the head 31. Furthermore, the manufacturer aligns the positions of the threaded hole 42 having an inner diameter less than the outer diameter of the head portion 31 with the threaded holes 22, 63 to which no rivet 3 has been attached yet.

Subsequently, the manufacturer holds the head 31 of rivet 3 and, as shown in FIG. 33, puts the shaft portion 32 through the threaded holes 42, 22 and 63 in this order. Here, the open-close portion 52 is also put through the threaded holes 42, 22 and 63. In such a case also, the tubular member 5 may easily be positioned by the contact between the flange 51 and the circuit board 2.

The manufacturer pushes the head 31 toward the circuit board 2 side until it touches the front surface 4a of the reflection sheet 4 as indicated by the outlined arrow shown in FIG. 33. Here, the open-close portion 52 is opened, so that the reflection sheet 4, circuit board 2 and flat plate portion 61 are held between the head 31 and the open-close portion 52. As a result, the reflection sheet 4 is fixed to the circuit board 2 and flat plate portion 61.

The flange 51 is arranged inside the threaded hole 42 and covered by the head 31. Thus, the tubular member 5 is completely covered at the front surface 2a side of the circuit board 2.

Note that a columnar portion may be protruding from the top of the head 31 of rivet 3, for preventing the optical sheet 702 from warping by the columnar portion touching the back surface of the optical sheet 702. The columnar portion may preferably have a white color which is highly reflective.

In the case of the light source apparatus 1 as described above, the light generated by the light emitters 21, 21, . . . is directly reflected on the head 31 of rivet 3, the circuit board 2, the reflection sheet 4 or the like to enter the display portion 70.

Even if the light generated by the light emitters 21, 21, . . . comes into the gap between the rivet 3 and each of the reflection sheet 4, circuit board 2 and support member 6, the light can be prevented from passing through the threaded holes 42, 22, 63 and going into the back side of the support member 6. This is because the tubular member 5 does not reflect but absorbs the light entered the gap.

This can prevent the light from leaking to the outside of the display apparatus 7 through the heat exhaust openings 711, 711, . . . of the cabinet 71.

Thus, the light source apparatus 1 and also the display apparatus 7 can be improved in the quality.

Moreover, the rivet 3 can be handled in a manner similar to the conventional push rivet, preventing manufacturing step from increasing in the number and from being complicated, which may otherwise occur by using the rivet 3.

Furthermore, the tubular member 5 is not exposed to the front surface 2a side of the circuit board 2, hardly causing inconvenience of unnecessarily absorbing the light which is to enter the display unit 70.

As has been illustrated in the present embodiment, white (or black) is the most preferable color having high reflectance (or high absorbance). The color, however, may not be limited to white (or black) as long as it is the color which is easy to reflect light and is difficult to absorb or transmit light (or the color which is easy to absorb light and is difficult to reflect or transmit light, i.e. color with low reflectance).

Moreover, black paint, for example, can be applied to the back surface, i.e. the surface facing the circuit board 2, of the head 31 of the rivet 3. Furthermore, the portion of the circuit board 2 and/or the flat plate portion 61, which is covered by the head 31, can be painted with, for example, a black color.

Such examples can improve the effect of preventing the light from leaking, without inhibiting the reflection of light toward the display portion 70 side.

It is noted that the conventional push rivet may be configured such that the outer diameter of flange is larger than the outer diameter of the head to fit the head into a hole formed at the flange when the members are fixed together.

In order for such a push rivet to have an effect of preventing light from leaking, such as with the rivet 3 of the present embodiment, the pin body as well as the flange of tubular member may be made with white, while the open-close portion may be made with black. Alternatively, the tubular member as well as the head of pin body may be made with white while the shaft portion may be made with black. Such a tubular member or pin body may be manufactured by, for example, two-color molding.

(Embodiment 3-2)

Figure 34A:
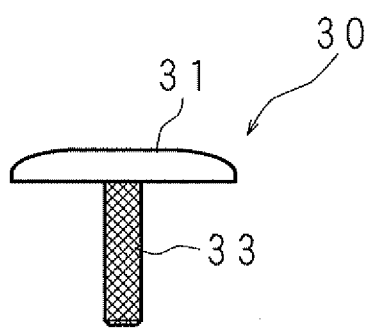
FIG. 34A is a plan view showing an appearance of the rivet included in the light source apparatus according to Embodiment 3-2 of the present invention.
Figure 34B:
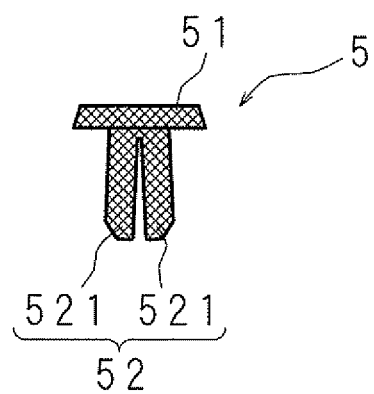
FIG. 34B is a plan view showing another appearance of the rivet in the light source apparatus according to Embodiment 3-2 of the present invention.

FIGS. 34a and 34b are Plan Views Showing an Appearance of the rivet 3 included in the light source apparatus 1 according to Embodiment 3-2 of the present invention. FIGS. 34A and 34B correspond to FIGS. 31A and 31B in Embodiment 3-1.

The light source apparatus 1 and the display apparatus 7 including the light source apparatus 1 in the present embodiment have similar configurations as those of the light source apparatus 1 and the display apparatus 7 in Embodiment 3-1. The difference between the present embodiment and Embodiment 3-1 will be described below, while the other components corresponding to Embodiment 3-1 are denoted by the same reference numbers and will not be described here in detail.

The rivet 3 in the present embodiment has a shape of a push rivet, including a pin body 30 as shown in FIG. 34A and a tubular member 5 as shown in FIG. 34B. In FIGS. 34A and 34B, the parts with black color are shown as the hatched areas.

The tubular member 5 has a configuration similar to that of the tubular member 5 in Embodiment 3-1.

As shown in FIG. 34A, the pin body 30 includes a head 31 with a white color with high reflectance and a shaft portion 33, which are formed integrally. The shaft portion 32 corresponds to the shaft portion 32 in Embodiment 3-1, except that it is black which has a high absorbance property.

Such a pin body 30 is manufactured by two-color molding the head 31 and shaft 33 using white synthetic resin and black synthetic resin.

It is noted that the manufacturer may prepare the pin body 30 in Embodiment 3-1 and apply black paint to the shaft portion 32 or attach a black sheet to the shaft portion 32, to manufacture the pin body 30 in the present embodiment.

In the case of the light source apparatus 1 as described above, an effect similar to that in Embodiment 3-1 can be attained. Moreover, the effect of preventing light from leaking is more improved than Embodiment 3-1. This is because both the shaft portion 33 and tubular member 5 do not reflect but absorb the light entered the gap between the rivet 3 and each of the reflection sheet 4, circuit board 2 and support member 6.

In order to give an effect of preventing light from leaking, as with the rivet 3 in the present embodiment, the conventional push rivet having an outer diameter of the flange larger than the outer diameter of the head is formed such that the head of the pin body and the flange of the tubular member may be made white while the shaft portion of the pin body and the open-close portion of the tubular member may be made black. Such pin body and tubular member may be manufactured by, for example, two-color molding.

(Embodiment 3-3)

FIG. 35 is a horizontal cross-section view showing a configuration of a portion in which the circuit board and the support member 6 of the light source apparatus according to Embodiment 3-3 of the present invention are fixed. FIG. 35 corresponds to FIG. 30 in Embodiment 3-1.

Figure 36A:
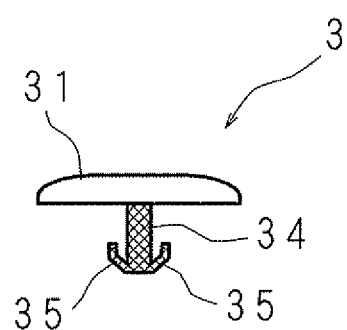
FIG. 36A is a plan view showing an appearance of the rivet included in the light source unit according to Embodiment 3-3 of the present invention.
Figure 36B:
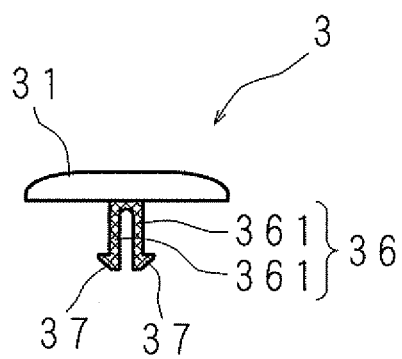
FIG. 36B is a plan view showing another appearance of the rivet included in the light source unit according to Embodiment 3-3 of the present invention.

FIGS. 36A and 36B are plan views each showing an appearance of the rivet included in the light source unit 1. In FIGS. 36A and 36B, the portion with a black color is indicated by the hatched area. The direction of rivet 3 in FIGS. 36A and 36B corresponds to the direction of rivet 3 in FIG. 35.

The light source apparatus 1 and the display apparatus 7 including the light source apparatus 1 according to the present embodiment have configurations similar to the light source apparatus 1 and display apparatus 7 in Embodiment 3-1. The difference between the present embodiment and Embodiment 3-1 will be described below, while the other parts corresponding to Embodiment 3-1 will be denoted by the same reference numbers and will not be described in detail.

As shown in FIG. 36A, the rivet 3 in the present embodiment includes, integrally, a head 31 having a white color which is a color with high reflectance, as well as a shaft portion 34 and protruding portions 35, having a black color which is a color with high absorbance. The shaft portion 34 corresponds to the shaft portion 32 in Embodiment 1.

Each of the protruding portions 35, 35 is formed in the shape of a claw and protrudes from the tip end of the shaft portion 34 toward the radial directions opposite to each other. The distance between the tip ends of the protruding portions 35, 35 is longer than the inner diameter of the threaded holes 22, 63 and is sufficiently shorter than the inner diameter of the threaded hole 42. Each protruding portion 35 has flexibility and can warp toward the side of shaft portion 34. The distance between the tip end of each protruding portion 35 and the back surface of head 31 is equal to the sum of each thickness of the reflection sheet 4, circuit board 2 and support member 6.

When inserted into the threaded holes 22, 63, the protrusion portions 35, 35 are pressed to the inner surfaces of the threaded holes 22, 63, and are so warped that the tip ends thereof approach each other. This allows the protrusion portions 35, 35 to pass through the treaded holes 22, 63.

The rivet 3 described above is manufactured by two-color molding the head 31 as well as the shaft portion 34 and protrusions 35, 35 using white synthetic resin and black synthetic resin.

When the light source apparatus 1 of the display apparatus 7 is manufactured, the manufacturer holds the head 31 of rivet 3 and puts the shaft portion 34 and protruding portions 35, 35 through the threaded holes 42, 22, 63 in this order until the head 31 touches the front surface 4a of reflection sheet 4. The protruding portions 35, 35 are warped and thus made smaller while passing through the threaded holes 22, 63, and are returned back to the original shape due to the elastic force of restoration after they have passed through the threaded hole 63. As a result, the protruding portions 35, 35 are hooked and stopped at the back surface of the flat plate portion 61. In other words, the protruding portions 35, 35 serve as stoppers in the present embodiment.

Here, the reflection sheet 4, circuit board 2 and flat plate portion 61 are held between the head 31 and the protruding portions 35, 35. This allows the reflection sheet 4, circuit board 2 and support member 6 to be fixed.

FIG. 36B shows an example of modification for the rivet 3 in the present embodiment.

The rivet 3 integrally includes a head 31 of white color which is a color with high reflectance as well as a shaft portion 36 and protruding portions 37, 37 of black color which is a color which high absorbance. Such a rivet 3 may be manufactured by two-color molding the head 31, the shaft portion 36 and the protruding portions 37, 37 using white and black synthetic resin.

The shaft portion 36 is formed of two flexible shafts 361, 361 that are arranged to depart from each other in the radial directions. The flexible shafts 361, 361 may warp toward the directions in which they approach each other.

The protruding portions 37, 37 are formed in the shape of claws, and protrude from the tip ends of the flexible shafts 361, 361 toward the radial directions opposite to each other. Each protruding portion 37 is provided with a taper which serves to gradually increase the amount of protrusion from the tip-end side to the base side. The distance between the protruding portions 37, 37 are longer than the inner diameter of the threaded holes 22, 63 and are sufficiently shorter than the inner diameter of the threaded hole 42. The distance between the tip end of the protruding portion 37 and the back surface of the head is equal to the sum of each thickness of the reflection sheet 4, circuit board 2 and support member 6.

When inserted into the threaded holes 22, 63, the protruding portions 37, 37 are pressed by the inner surfaces of the threaded holes 22, 63 and thus the flexible shafts 361, 361 warp such that the protruding portions 37, 37 approach each other. This allows the protruding portions 37, 37 to pass through the threaded holes 22, 63. Moreover, after the protruding portions 37, 37 have passed through the threaded holes 22, 63, the flexible shafts 361, 361 return to their original shapes due to the elastic force of restoration. As a result, the protruding portions 37, 37 are hooked and stopped at the back surface of the flat plate portion 61. In other words, the protruding portions 37, 37 serve as stoppers in the present embodiment.

The light source apparatus 1 as described above can attain the effect similar to that in Embodiment 3-1.

It should be noted that the protruding portions 35, 37 may not necessarily have a black color. The effect of preventing light from leaking, however, can further be improved if the protrusions 35, 37 are black compared to the case where the protrusions 35, 37 are white. Moreover, there is no positive reason for the protrusions 35, 37 to have a color different from that of the shaft portions 34, 36. The manufacturing procedure for the rivet 3 will rather be easy if the protruding portions 35, 37 have the same color as that of the shaft portions 34, 36.

Figure 37A:
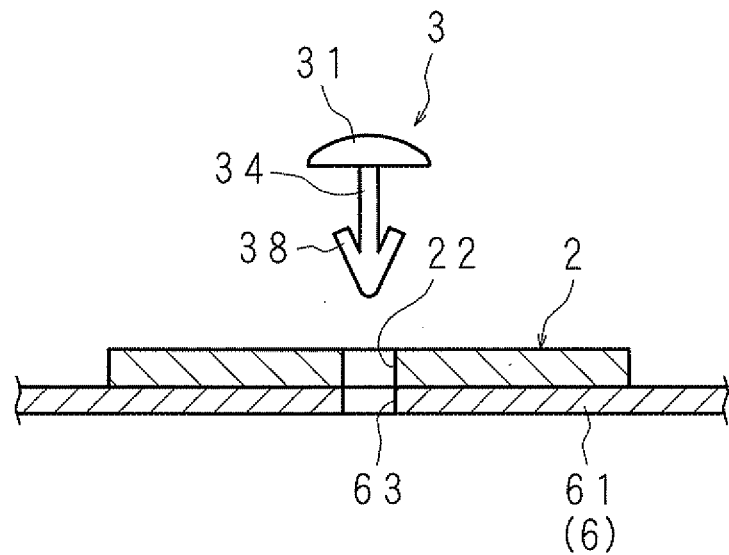
FIG. 37A is an enlarged cross-section view showing an example in which another rivet is utilized to fix the circuit board.
Figure 37B:
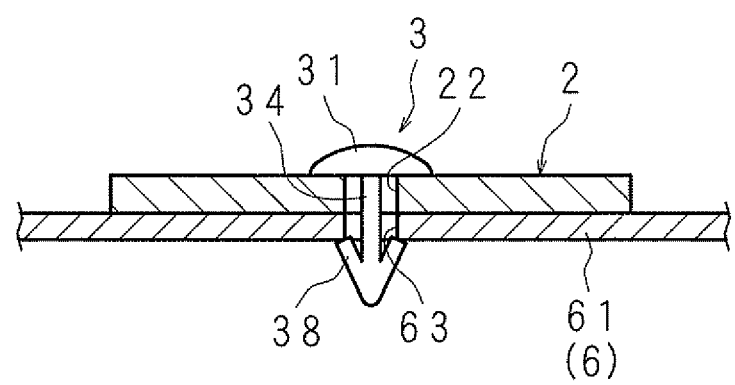
FIG. 37B is an enlarged cross-section view showing a condition in which another rivet has been utilized to fix the circuit board.
Figure 38A:
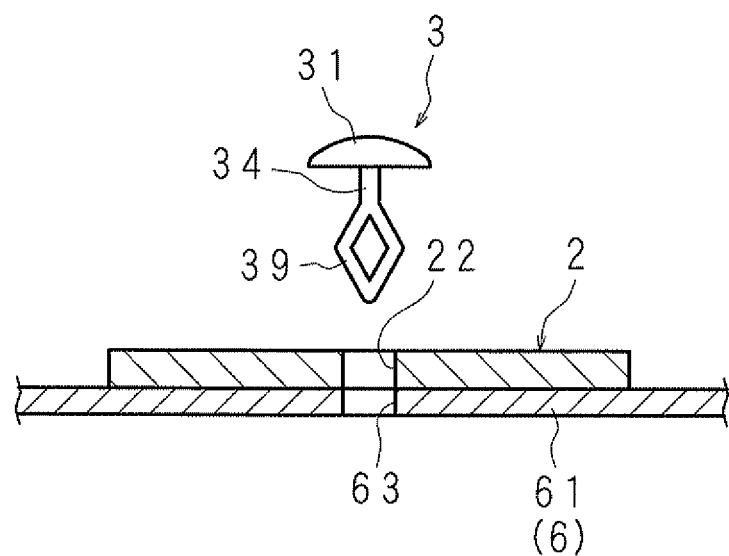
FIG. 38A is an enlarged cross-section view showing an example in which another rivet is utilized to fix the circuit board.
Figure 38B:
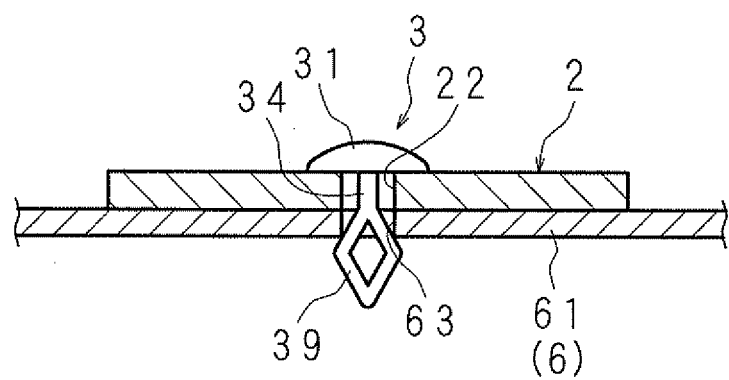
FIG. 38B is an enlarged cross-section view showing a condition in which another rivet has been utilized to fix the circuit board.

FIGS. 37A and 38A show examples of modifications for the rivet 3. FIGS. 37A and 38A are enlarged cross-section views each showing an example in which another rivet 30 is utilized to fix the circuit board 2. FIGS. 37B and 38B are enlarged cross-section views each showing a condition in which another rivet 30 has been utilized to fix the circuit board 2. The rivet 3 in FIG. 37A has a head 31 continuing to one end of a shaft portion 34 and a fall preventer (engagement portion) 38 with flexibility extending from the other end of shaft portion 34 to the head 31 side, which are formed integrally with a synthetic resin material. In addition, the head 31 is formed to have a color with high reflectance, whereas the shaft portion 34 and fall preventer 38 are formed to have a color with low reflectance.

While the rivet 3 is inserted into the threaded hole 22, 63, the fall preventer 38 warps toward the circumferential side of the shaft portion 34. When coming out of the threaded holes 22, 63, the fall preventer 38 is restored by the elastic force of restoration and is hooked and stopped at the edge of the threaded hole 62.

The rivet 3 in FIG. 38A includes a head 31 continuing to one end of the shaft portion 34 and a flexible fall preventer (engagement portion) 39 of a substantially-diamond shape that extends from the other end of shaft portion 34 while widening and further extends while narrowing toward the tapered end. The head 31, shaft portion 34 and fall preventer 39 are integrally formed with resin. Moreover, the head 31 is formed to have a color with high reflectance, while the shaft portion 34 and fall preventer 39 have a color with low reflectance.

While the rivet 3 is inserted into the threaded holes 22, 63, the fall preventer 39 is warped. The fall preventer 39 is then restored due to the elastic force of restoration as it comes out of the threaded holes 22, 63, and is stopped at the edge of the threaded hole 63.

It should be considered that Embodiment 3 disclosed here is in all aspects merely illustrative but not limitative. The scope of the present invention is defined not by the above descriptions but by claims and it is intended that all modifications in the meaning and scope equivalent to claims are included.

Furthermore, as long as the effect of the present invention is obtained, the rivet 3, light source apparatus 1 or display apparatus 7 may also include any other components not disclosed in the embodiments above.

(Embodiment 4)

Figure 39:
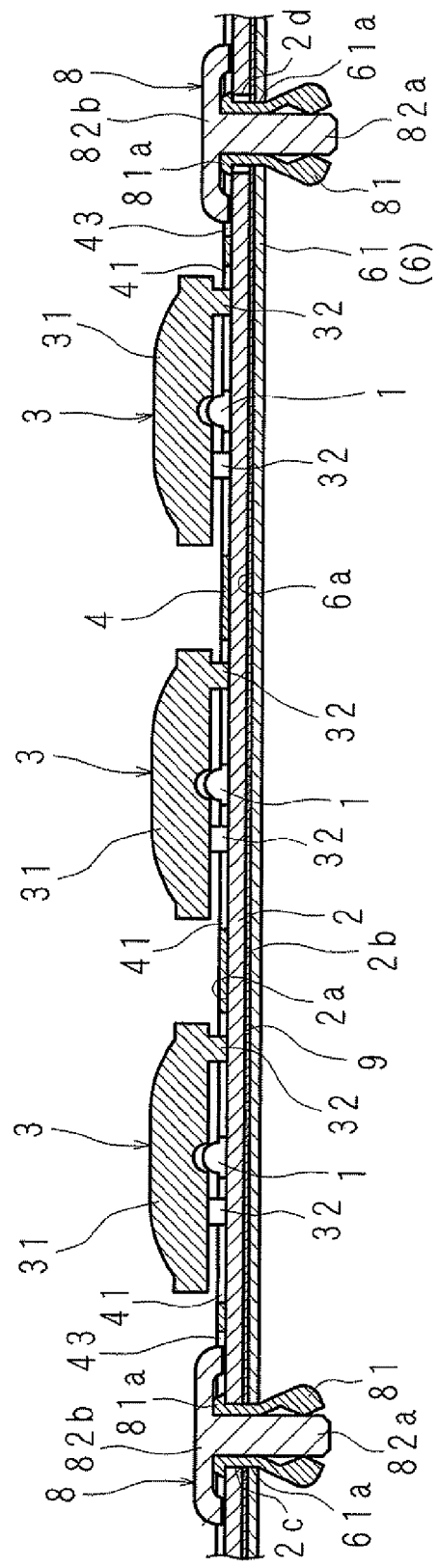
FIG. 39 is a cross-section view showing a configuration of a main part of the light source apparatus according to Embodiment 4.
Figure 40:
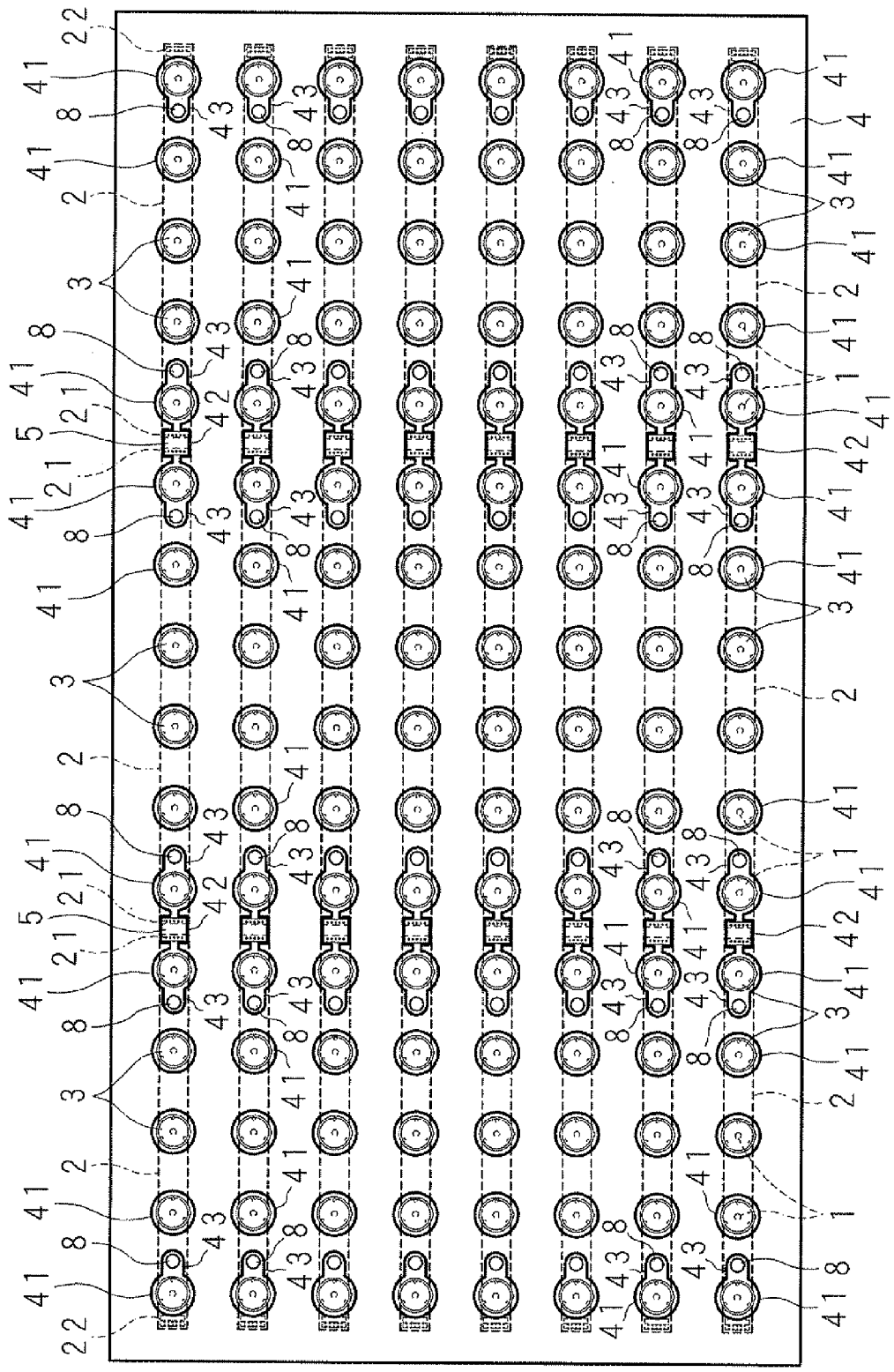
FIG. 40 is a plan view showing a portion of the light source apparatus according to Embodiment 4 of the present invention.
Figure 41:
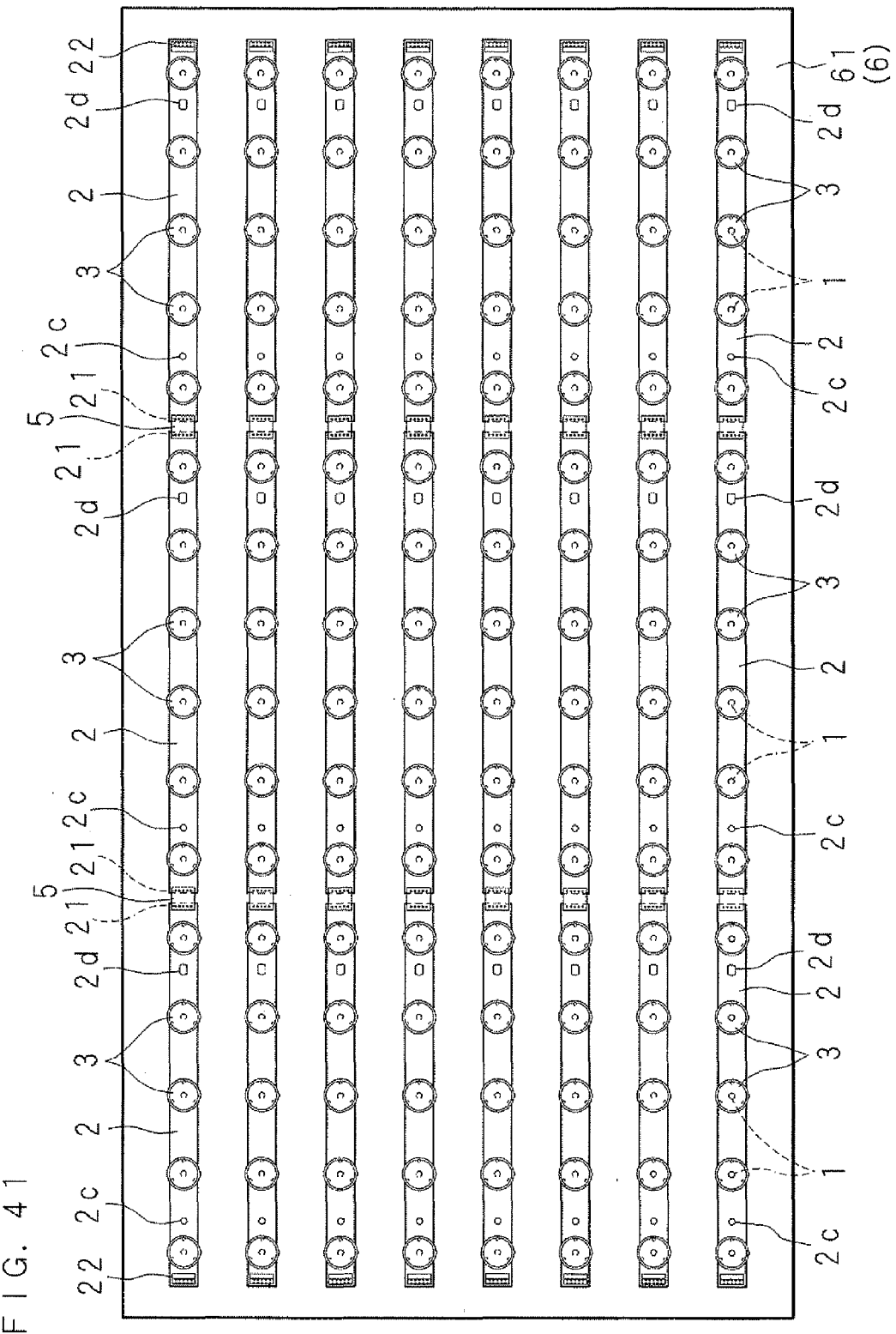
FIG. 41 is an exploded plan view showing a portion of the light source apparatus according to Embodiment 4 of the present invention.
Figure 42:
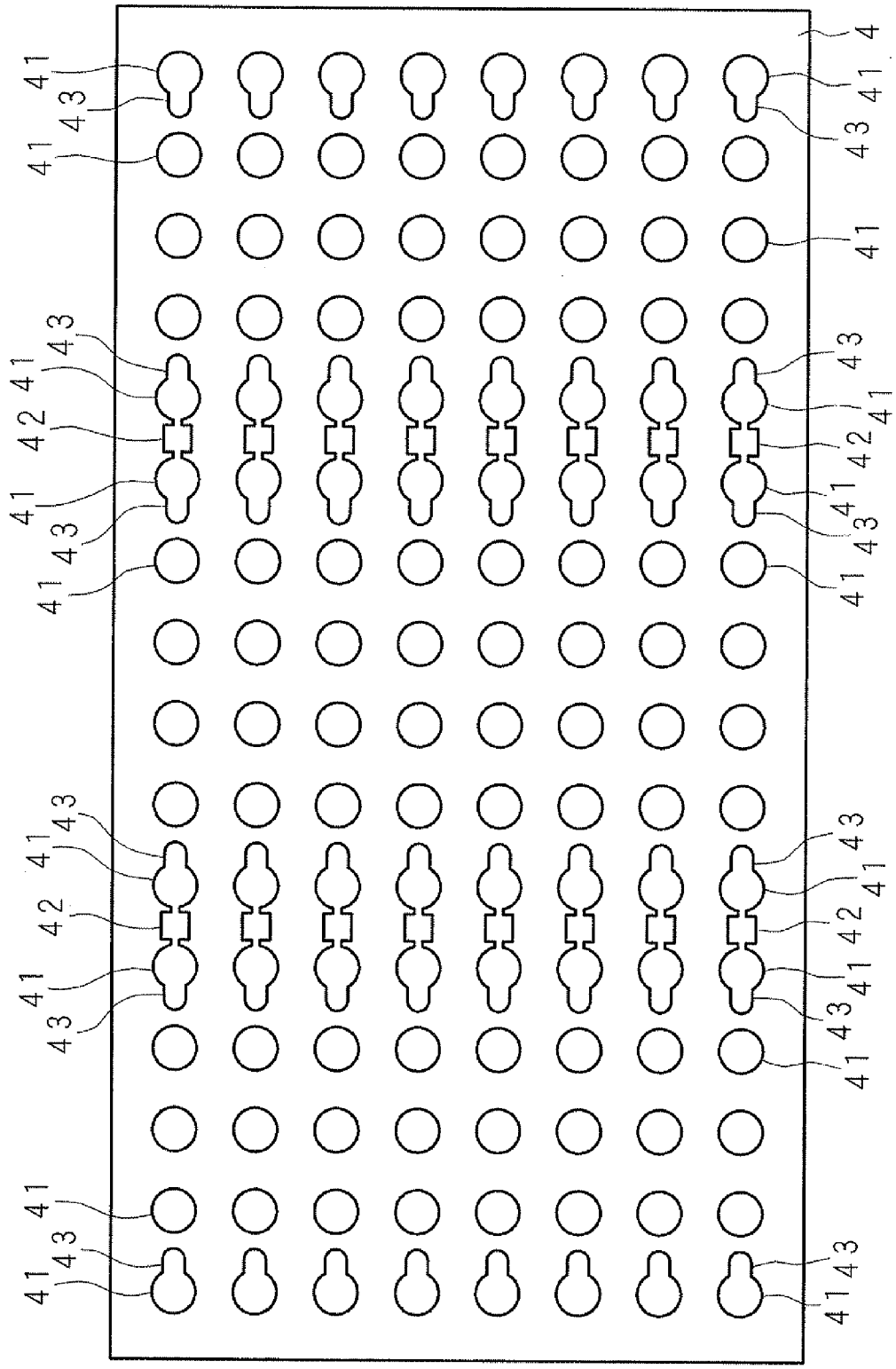
FIG. 42 is a plan view showing a partial member of the light source unit according to Embodiment 4 of the present invention.
Figure 43:
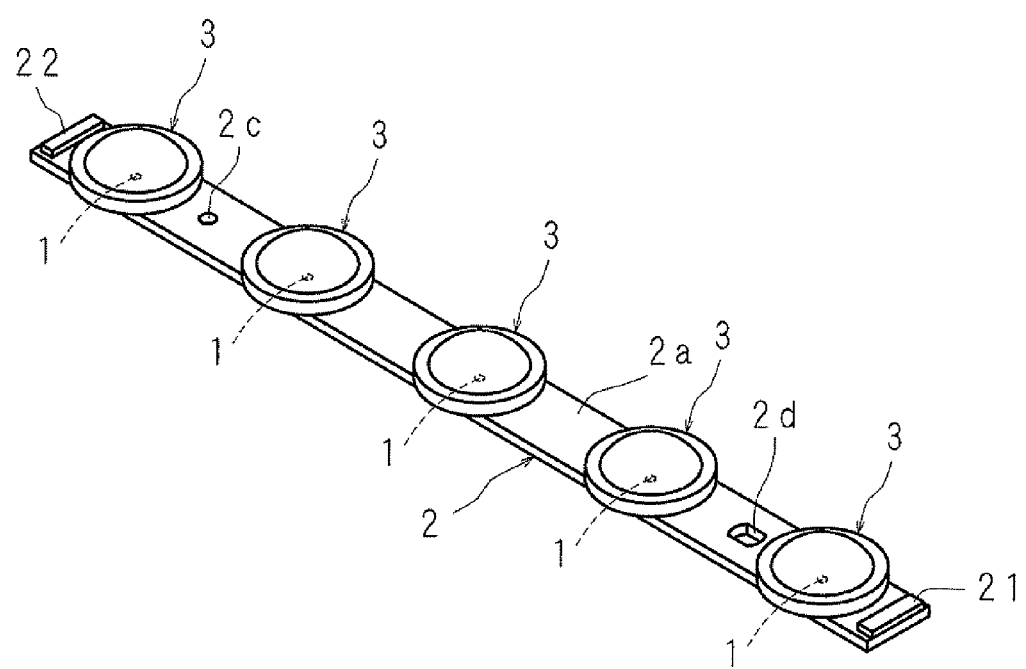
FIG. 43 is a perspective view showing a configuration of the LED board according to Embodiment 4.
Figure 44:
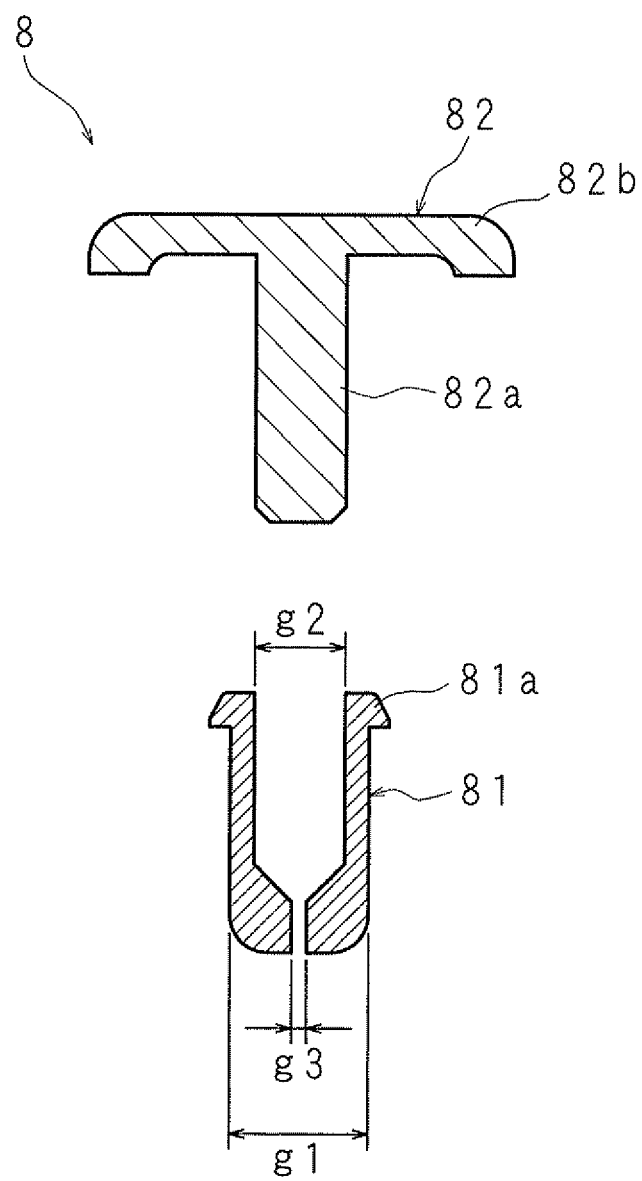
FIG. 44 is a cross-section view showing an example of a fixture according to Embodiment 4.

FIG. 39 is a cross-section view showing a configuration of a main part of the light source apparatus according to the present invention. FIG. 40 is a plan view showing a portion of the light source apparatus. FIG. 41 is an exploded plan view showing a portion of the light source apparatus. FIG. 42 is a plan view showing a partial member of the light source apparatus. FIG. 43 is a perspective view showing a configuration of a LED board. FIG. 44 is a cross-section view showing an example of a fixture.

The light source apparatus includes: plural LED boards 2 arranged in parallel with each other, on which plural LEDs 1 are mounted on one surface 2a; plural lens 3 attached to one surface 2a of the LED board 2, each of which is opposed to the top of each LED 1 and is made to radiate the light emitted by the LED 1; a reflection sheet 4 having a through hole 41 in which the lens 3 is arranged and which is mounted on one surface 2a of LED board 2 to reflect the light emitted by the LED 1; and a support member 6 positioned at the side of another surface 2b of the LED board 2 and supporting plural LED boards 2.

The LED board 2 is made of synthetic resin, has a circuit portion on one side 2a, and is formed in the shape of a rectangle with the length larger than the width (the shape of a strip). On one surface 2a of each LED board 2, plural LEDs 1 are mounted in a line, separated from each other at substantially equal intervals in the longitudinal direction. The LED board 2 is a single-sided board having a conductive portion only on one surface 2a. Plural rectangular LED boards 2 are arranged on one surface 6a of the support member 6 of a substantially rectangular shape with their longitudinal directions set in the same direction and are spaced apart from each other in the longitudinal and width directions.

On another surface 2b of the LED board 2, a carbon-containing sheet 9 (thermal conductor) is attached to the entire surface. The carbon-containing sheet 9 has a better thermal conductive property compared to the LED board 2. Thus, the thermal conductivity for the carbon-containing sheet 9 is larger than the thermal conductivity for the LED board 2. As the LED board, for example, Glass Composite Copper Clad Laminates of CEM-3 level manufactured by Panasonic Electric Works Co., Ltd. has thermal conductivity in the range between 0.4 and 1.0 W/mK and a thickness of 1.0 m or 1.6 mm. As an example of the carbon-containing sheet, for example, the graphite sheet with high thermal conductivity available from Otsuka Electronics, Co., Ltd. has thermal conductivity in the sheet direction is in the range between 150 and 400 W/mK, thermal conductivity in the thickness direction between 3.5 and 10 W/mK and the thickness between 0.05 and 0.51 mm. Acrylic adhesive is attached to one surface, while a polyester protective film is attached to the other surface.

FIG. 41 illustrates an example in which LED board 2 on which six LEDs 1 are mounted is arranged in the middle while LED boards 2 on which five LEDs 1 are mounted is arranged at both sides thereof, forming a group of three pieces of LED boards 2 connected in a line. Eight groups of LED boards 2 are then arranged in parallel with one another at intervals substantially the same as the intervals of LED diodes 1 mounted on the LED board 2 in the width direction. The LED boards 2 arranged in a direction perpendicular to the line of LED 2 arranged in a line have a substantially-equal size in the longitudinal direction. The LEDs 1 on all the LED boards 2 are arranged at substantially equal intervals in two dimension.

Connecting portions 21, 22 are provided at both ends of one surface 2a of the LED board 2 in the longitudinal direction. In the three LED boards 2 arranged in one line are connected at the connecting portions 21, 21 of the adjacent LED boards 2 by a connector 5. Moreover, as will be described later, the connecting portion 22 of the LED board 2 positioned at one end of a line is connected to a power circuit board by a connector, while the connecting portion 22 of the LED board 2 positioned at the other end of the line is connected to a control circuit board by a connector.

The lens 3 is arranged opposed to and apart from the top of the LED 1, and includes: a transparent portion 31 that is formed in a hemisphere shape and radiates the light generated by the LED 1 in all directions; and three positioning protrusions 32 protruding from a surface opposite to one surface 2a of the transparent portion 31 toward the LED board 2 and determining a position of lens 3 with respect to LED board 2, the tip end of the positioning protrusion 32 being attached to one surface 2a by adhesive. The transparent portion 31 is formed to be somewhat smaller than the through hole 41 of the reflection sheet 4.

The reflection sheet 4 has high reflectance and is formed by a single synthetic resin sheet having a substantially-rectangular shape, in which the through holes 41 arranged in a grid-like manner and each having a circular shape with a diameter somewhat larger than that of the transparent portion 31 are opened at portions where lens 3 are to be arranged, respectively, while a second through hole 42 having a substantially rectangular shape and allowing the connector 5 to pass through is opened at a portion corresponding to the connector 5.

At one end and the other end of the rectangular LED board 2 in the longitudinal direction, two threaded holes 2c, 2d are opened for inserting the rivet 8 (holding means) for supporting the LED board 2 on the support member 6. The threaded holes 2c, 2d are positioned between adjacent two lines of lenses 3 among plural lenses 3 arranged along the width direction of the LED board 2. One threaded hole 2c of the two threaded holes 2c, 2d has a size smaller in the longitudinal direction of board than the size of the other threaded hole 2d. More specifically, one threaded hole 2c is a circular hole, whereas the other threaded hole 2d has an oval shape elongated in the longitudinal direction of board. Each LED board 2 is so arranged that the threaded hole 2c with a smaller size is adjacent to the threaded hole 2d with a larger size at the end portions where the LED boards 2 arranged in one line are connected with each other.

The support member 6 is formed with a metal plate, and has a planar plate portion 61 of approximately rectangle and a frame portion 62 continuing to the periphery of the plate portion 61. While the carbon-containing sheet 9 on another surface 2b side of the LED board 2 is in contact with one surface 6a of plate portion 61, plural LED boards 2 are arranged in the longitudinal and width directions and are kept and supported. At the plate portion 61 of support member 6, a through hole 61a is provided corresponding to the position of each of the threaded holes 2c, 2d on the LED board 2.

The rivet 8 has an outer diameter g1 that can pass through the threaded holes 2c, 2d and through hole 61a, is provided with a flange 81a at one end, which cannot pass through the threaded holes 2c, 2d and through hole 61a, and includes: a tubular member 81 having an inner diameter g2 at one end larger than an inner diameter g3 at the other end; and a shaft member 82 which can be inserted from one end of the tubular member 81 and which has a shaft 82a with a diameter larger than the inner diameter g3 at the other end and a head 82b that cannot pass through the threaded holes 2c, 2d and through hole 61a. The tubular member 81 and shaft member 82 are formed with a synthetic resin material. Moreover, a slit (not shown) is provided along the radial direction at the other end of the tubular member 81.

On the reflection sheet 4, a third through hole 43 of the shape of a long hole combined into the through hole 41 is opened at the portion where the rivet 8 is arranged. The third through hole 43 has a diameter larger than the diameter of head 82b of shaft member 82 so as to allow the rivet 8 to pass through.

It will be described now for a procedure in that the three LED boards 3 connected in a line are supported by the support member 6 using the rivet 8. First, threaded holes 2c, 2d of the LED board 2 are aligned with each through hole 61 on the support member 6 and the carbon-containing sheet 9 is made in contact with the support member 6. Thereafter, the tubular member 81 is inserted through the small threaded hole 2c and through hole 61a from the side of one surface 2a of each LED board 2, making the flange portion 81a in contact with one surface 2a of the LED board 2. Next, as the shaft portion 82a of shaft member 82 is inserted into the tubular member 81 until the head 82b touches the flange portion 81a of the tubular member 81, the tip end of the tubular member 81 is pushed outward by the shaft portion 82a of the shaft member 82. The tip end of the tubular member 81, which has been pushed outward, presses inward and holds the shaft portion 82a of the shaft member 82. Since the expended tip end of tubular member 81 cannot pass through the through hole 61a of support member 6, each LED board 2 is fixed to the support member 6 with the rivet 8.

After attaching the rivet 8 to the small threaded hole 2c as described above, the rivet 8 is also attached to the larger threaded hole 2d, allowing each LED board 2 to be fixed to the support member 6 with the rivet 8. Accordingly, the carbon-containing sheet 9 on the other side of each LED board 2 becomes in contact with the plate portion 61 of support member 6 at its entire surface.

After the rivets 8 are attached to all the threaded holes 2c, 2d on the LED board 2, the reflection sheet 4 is mounted on the LED board 2 while the lens 3 is inserted through the through hole 41, the connector 5 through the second through hole 42 and each rivet 8 through the third through hole 43.

Figure 45:
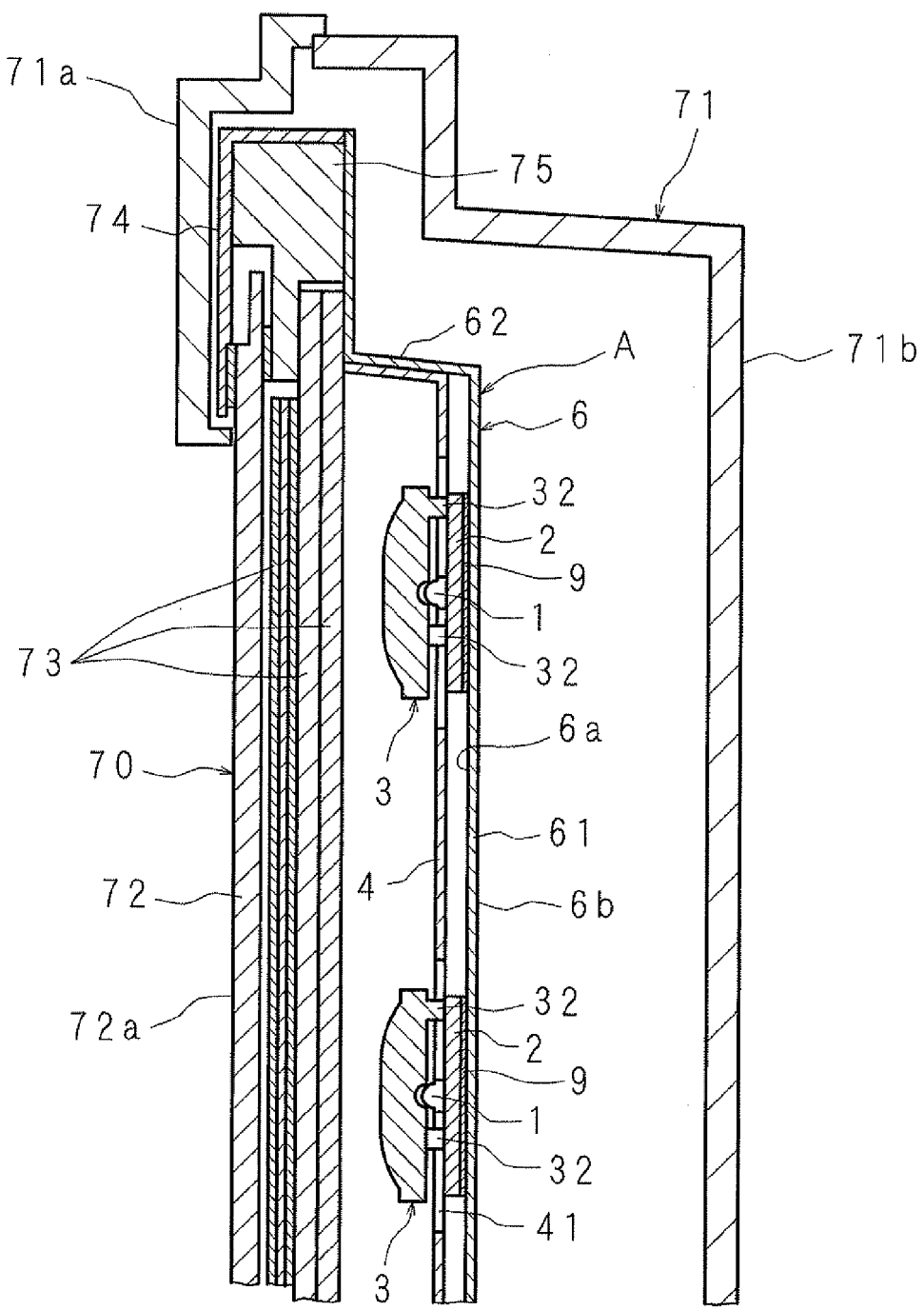
FIG. 45 is a cross-section view showing a display apparatus included in the light source apparatus according to Embodiment 4 of the present invention.

FIG. 45 is a cross-section view showing a display apparatus included in the light source apparatus according to the present invention. The display apparatus includes a display unit 70 of a substantially rectangular parallelepiped having a display surface 72a on the front side, a light source apparatus A arranged at the back side of the display unit 70, and a cabinet 71 that covers the circumferential portion of the display unit 70 and the back side of the light source apparatus A.

The display unit 70 includes a display panel 72 having the display surface 72a and an optical sheet 73 arranged at the back side of the display panel 72. The circumferential portion of the display panel 72 is sandwiched from front and back between the front support frame 74 and the back support frame 75 to configure a panel module, the back support frame being attached to the circumferential portion of the support member 6.

The optical sheet 73 is a laminated body consisting of a relatively-thick diffusion plate that radiates the light emitted by the LED 1 serving as a light source and relatively-thin synthetic resin sheets such as a reflective polarizer plate, a prism sheet, a diffusion sheet and the like. The circumferential portion of optical sheet 73 is held between the frame portion 62 of support member 6 and the back support frame 75.

The cabinet 71 includes a cabinet front division 71a covering up the front side of the circumference of display unit 70 and a cabinet back division 71b that is formed in a basin shape and covers up the circumference and the back side of the light source it apparatus A. The cabinet 71 is fixed by a male screw to the frame portion 62 of the support member 6.

Though not shown, a power circuit board that is connected to a connecting electrode 22 of the LED board 2 with a connector and supplies voltage to a driver is attached to one side in the longitudinal direction on another surface 6b of the plate portion 61, while a control circuit board that is connected to the connecting electrode 22 of the LED board 2 with a connecter and controls the driver is attached to the other side in the longitudinal direction on another surface 6b of the plate portion 61. Moreover, at the middle portion in the longitudinal direction on another surface 6a of the plate portion 61, plural circuit boards such as a power circuit board that supplies voltage to the display unit, a terminal circuit board that processes an image displayed on the display surface of the display unit, a control circuit board controlling the display unit and the like.

Figure 46:
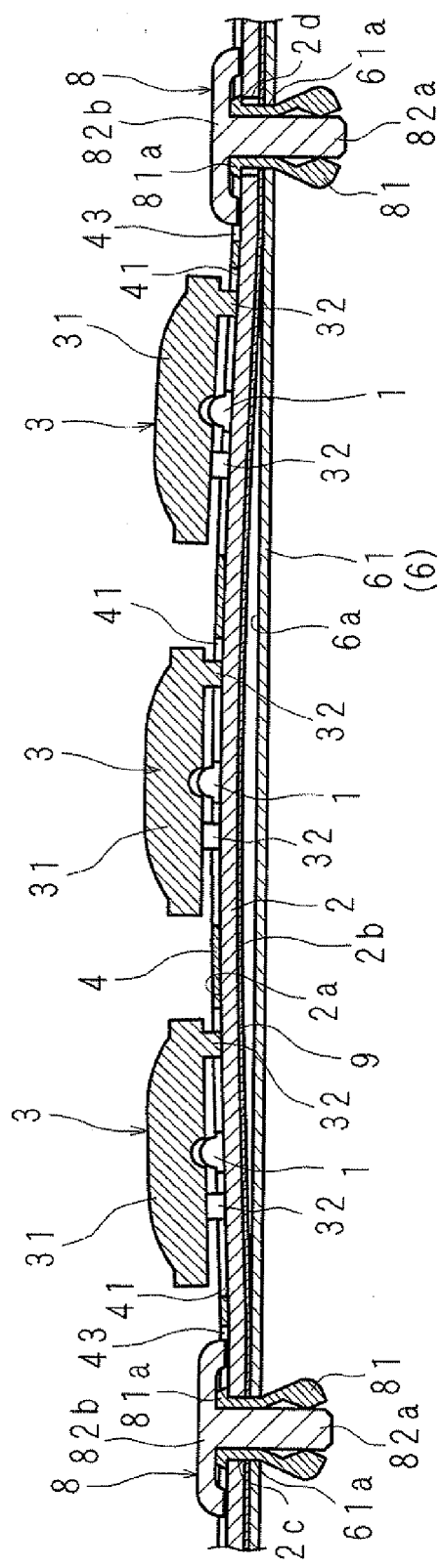
FIG. 46 is a cross-section view showing an operating condition of the light source apparatus according to Embodiment 4 of the present invention.

It will be described next for the case where the temperature of the LED board 2 is raised due to the heat emitted by the LED 1. FIG. 46 is a cross-section view showing an operating condition of the light source apparatus according to the present invention. While heat expansion of the LED board 2 is small, the heat emitted by the LED 1 and transferred to the carbon-containing sheet 9 through the LED board 2 is transferred toward the sheet surface on the carbon-containing sheet 9, and is further transferred from the front surface of the carbon-containing sheet 9 to the metal plate portion 61 of the support member 6 which is in contact with the carbon-containing sheet 9 (as shown in FIG. 39). Here, the LED board 2 is attached to the carbon-containing sheet 9 but only partially fixed to the support member 6 with the rivet 8. As time passes and heat expansion of LED board 2 is increased, on the LED board 2 which has a larger rate of thermal expansion than that of support member 6, the carbon-containing sheet 9 is in contact with the plate portion 61 of support member 6 around the portion at which each rivet 8 is attached but is lifted up and becomes not in contact with the plate portion 61 at portions between rivets 8. Thermal conduction from the carbon-containing sheet 9 to the plated portion 61 of support member 6 is blocked at the lifted portion. The carbon-containing sheet 9, however, holds the state where it is attached to the LED board 2, so that the heat emitted by the LED 1 is reliably transferred from the LED board 2 to the carbon-containing sheet 9. The heat of the carbon-containing sheet 9 at the portion lifted up from the plate portion 61 is then transferred in the direction of the sheet surface of the carbon-containing sheet 9 and is surely transferred to and is radiated from the plate portion 61 of support member 6 which is in contact with the carbon-containing sheet 9 at the attaching portion of rivet 8. Because of the carbon-containing sheet 9, the heat transfer in the direction along the sheet surface is extremely smooth and the transferred heat is highly effectively diffused. Moreover, with the thermal conductor other than carbon-containing sheet 9, the heat emitted by each LED 1 is uniformly diffused if the LED board 2 and the thermal conductor are fixed together, suppressing deterioration in performance which may otherwise be caused by the temperature raised for only a part of LED 1. It is noted that the LED board 2 and the thermal conductor may be fixed together by adhering them with, for example, a double-faced tape or an adhesive, or by evaporation coating. In other words, it is allowable as long as the LED board 2 and the thermal conductor are held together without departing from each other.

Though, in the embodiment described above, the carbon-containing sheet 9 is attached to another surface 2b of the LED board 2, it is also possible to apply a carbon-containing coating layer 9 which has excellent thermal conductivity as with the carbon-containing sheet 9. As an example of the carbon-containing coating, the thermally-conductive coating manufactured by UNITIKA Ltd. is water-based coating mainly formed with carbon filler and thermoset binder resin. Screen printing is employed to apply such coating on the back side of a single-sided copper print board used for the LED board until the thickness between approximately 70 and 170 μm is obtained, to let the coating cured by laminating press to form a layer.

Though, in the embodiment described above, two threaded holes 2c, 2d through which rivets 8 pass are arranged at both ends in the longitudinal direction of the rectangular LED board 2, threaded holes may also be provided at plural portions including both ends and portions inner than the both ends in the longitudinal direction of LED board 2.

Though, in the embodiment described above, the fixture is configured by the rivet 8 consisting of two members, i.e. the tubular member 81 and shaft member 82, the fixture may be formed by a rivet consisting of a single member or, alternatively, be formed by a screw, a bolt/nut or the like instead of rivet.

Though, in the embodiment described above, the light source apparatus according to the present invention is applied to the illumination for the display panel in the liquid-crystal display apparatus, it may also be applied to a display panel in another light-emitting display apparatus instead of the liquid-crystal display apparatus.

Though Embodiments 2 to 4 as described above employ an LED board of a strip shape in which plural LEDs are arranged in a line, an LED board of a rectangular shape in which plural LEDs are arranged in plural lines may also be employed. The manner of the LED board is not specifically limited.

Moreover, Embodiments 2 to 4 may be combined with any one of Embodiments 1-1 to 1-10.

The embodiments of the present invention comprises the configuration described below.

According to the present invention, a display apparatus including a LED board on which LED emitting light to a display panel is mounted on one surface and a heat radiation plate which is in contact with another surface of the LED board includes: a board hole provided on the LED board; a through hole provided at a position corresponding to the board hole on the heat radiation plate; and a rivet which is inserted through the through hole and board hole to fix the LED board to the heat radiation plate.

In such a configuration, the rivet is inserted into the board hole on the LED board and the through hole on the heat radiation plate to fix the LED board to the head radiation plate. Local tightening force acts on the LED board when a screw is used, while the force acting on the LED board is distributed by a large-diameter head of the rivet. This prevents the LED board from warping, increasing the contact area between the LED board and radiation plate compared to the case with a screw.

In the present invention, a thermally conductive member for radiating heat is provided on another surface of the LED board.

In this configuration, the head generated at the LED board through the thermally conductive member for radiating heat, e.g. a pattern made of a metal film, is efficiently transferred to the heat radiation plate.

In the present invention, plural through holes and board holes described earlier are arranged on the heat radiation plate and LED board, respectively, at equal intervals.

In this configuration, rivets are inserted into the plural through holes and board holes arranged at equal intervals for the LED board to be evenly in contact with the heat radiation plate.

In the display apparatus according to the present invention, the LED board has a shape of a strip, plural LED boards are arranged in parallel with one another such that their ends in the longitudinal direction are opposed to one another, a connector for electrically connecting both ends of the LED boards is provided, and the board hole is a long hole extending in the longitudinal direction of the LED board.

According to the present invention, the LED board is fixed to the heat radiation plate while the positioning of LED board in the longitudinal direction is performed in consideration of the connection between the connectors on the LED board and dimensional error of the LED board.

In the display apparatus according to the present invention, the rivet includes a stopper of an annular shape and stopping the circumference at the edge portions of the through hole or board hole, plural elastic portions arranged along the circumferential direction of the stopper and extending from the inner circumference of the stopper in the axial direction, a contact portion extending from the protruding end of each of the elastic portions to the inside of the stopper in the radial direction, and an insertion shaft inserted into the stopper from the side opposite to the elastic portion and touching the contact portion.

According to the present invention, the elastic portion is inserted into the board hole and through hole while the stopper is stopped at, for example, the edge of the board hole, and the insertion shaft is inserted into the stopper to be in contact with the contact portion. Here, the elastic portion is curved outward in the radial direction due to elastic deformation and the curved elastic portion touches the edge of the through hole, allowing the LED board and heat radiation plate to be held between the stopper and the elastic portion.

In the display apparatus according to the present invention, the rivet is formed with carbon or metal.

According to the present invention, the rivet is formed with carbon and metal, allowing the heat generated by the LED board to be efficiently transferred through the rivet to the heat radiation plate.

The rivet including a head having a color with high reflectance and a shaft portion protruding from the head, to fix members at which the threaded holes receiving the shaft portion are formed respectively, includes the stopper arranged at the side closer to the shaft side than the head, at least a part of the stopper and shaft portion having a color with low reflectance.

For the rivet, the stopper has a size in the direction crossing its axial direction is not more than the size in the direction of the head crossing the axial direction of the shaft. The rivet is a tubular member with a low-reflective color, having the shaft portion inserted from one end thereof and an open-close portion that is opened and closed in a direction crossing the axial direction along with the relative movement in the axial direction of the inserted shaft portion, to fix the members with each other by holding them between the head and the opened open-closed portion.

The rivet is provided with the shaft portion that has a color with low reflectance.

In the rivet, the stopper is a protruding portion that protrudes from the tip end of the shaft portion toward the direction crossing the axial direction of the shaft. The rivet is formed to fix the members with each other by holding them between the protruding portion and the head. At least the shaft portion has a color with low reflectance.

In the rivet, the head and shaft portion are formed with synthetic resin, and is formed by two-color molding such that the head has a color with high reflectance whereas the shaft portion has a color with low reflectance.

In the light source apparatus including a circuit board on which a threaded hole through which the shaft portion of rivet passes and on which a light emitting portion is mounted, and a support member on which a threaded hole through which the shaft portion passes and supporting the circuit board, the circuit board is fixed to the support member using the rivet such that the head of the rivet of the present invention is arranged at the side of the circuit board.

The display apparatus comprises: a display unit having a display surface on one side; and a light source apparatus of the present invention arranged at another side of the display unit.

In the configuration including the rivet, the rivet provided with the head, the shaft portion protruding from the head and the stopper has a color with high reflectance and a color with low reflectance. The color with high reflectance corresponds to a color which is easy to reflect light and is difficult to absorb and transmit light, and may be white, for example. The color with low reflectance corresponds to a color which is easy to absorb light and is difficult to reflect and transmit light, i.e. color with high absorbance, and may be black, for example. The portion having the color with low reflectance is hereinafter referred to as a high absorbing portion.

More specifically, the head of rivet has a color with high reflectance. At least a part of the shaft portion and stopper is a high absorbing portion.

The light source apparatus includes a circuit board on which a light emitting portion is mounted and a support member of the circuit board, the circuit board being fixed to the support member using a rivet.

The circuit board and support member are, respectively, provided with a threaded hole through which the shaft portion of rivet is inserted. Moreover, the rivet fixes the circuit board to the support member while the head thereof arranged at the circuit board side. The stopper of rivet is hooked and stopped at the circuit board and/or support member.

The light source apparatus as described above is included in the display apparatus together with the display portion having the display surface at one side and emits the light from the other side of the display surface.

While the head of rivet is arranged at the side of the circuit board, the head is easy to reflect light emitted by the light emitting portion to the side of the display portion, since it has a color with high reflectance.

The high absorbing portion, on the other hand, may be arranged between the head and circuit board, arranged inside the threaded hole or arranged at the support member. Thus, the high absorbing portion does not interfere with the reflection of light emitted by the light emitting portion toward the side of display portion. In other words, the rivet has, at least, a function similar to that of the conventional rivet.

Even if the light emitted by the light emitting portion enters the gap between the rivet and each of the circuit board and the support member, the light can be prevented from passing through the threaded hole and entering the back side of the support member. This is because the light entered the gap is absorbed at the high absorbing portion.

Moreover, the rivet further includes a tubular member. Such a rivet may be, for example, a push rivet.

The tubular member has a size in the direction crossing its axial direction not more than the size of the head in the direction crossing the axial direction of the shaft portion. More specifically, if, for example, the tubular member has a cylindrical shape while the shaft portion has a columnar shape, the size of the tubular member in the radial direction is not more than the size of the head in the radial direction of the shaft portion.

The direction crossing the axial direction is hereinafter referred to as the radial direction, regardless the shapes of the tubular member and shaft portion.

The shaft portion is inserted from one end of the tubular member. Here, the tubular member is arranged at the side closer to the shaft portion than the head.

Furthermore, the tubular member has an open-close portion at the other end thereof. The open-close portion is opened and closed in the radial direction along with the relative movement in the axial direction of the shaft portion inserted from one end of the tubular member.

The members (more specifically, the circuit board and support member) are fixed together by being held between the head and the opened open-close portion. The tubular member has a color with low reflectance.

Even if the light emitted by the light emitting portion comes into a gap between the rivet and each of the circuit board and support member, the light can be prevented from passing through the threaded hole and entering the back side of the support member. This is because the light entered the gap is absorbed at the tubular portion.

It is noted that the tubular member may have only one color with low reflectance. Thus, the tubular member can be manufactured more easily and at lower cost compared to the tubular member having two or more colors.

Moreover, the head of rivet has a color with high reflectance, whereas each of the shaft portion and tubular member has a color with low reflectance.

Even if the light emitted by the light emitting portion comes into the gap between the rivet and each of the circuit board and support member, the light can further be prevented from passing through the threaded hole and entering the back side of the support member, compared to the rivet with the head and shaft portion of a high-reflective color and with the tubular member of a low-reflective color. This is because the light entered the gap can be absorbed at both the tubular member and shaft portion.

Moreover, for the rivet, the head has a color with high reflectance while at least the shaft portion has a color with low reflectance. The stopper is a protruding portion that protrudes from the tip end of the shaft portion in the radial direction.

The members (more specifically, the circuit board and support member) are fixed by being held between the head and protruding portion.

Even if the light emitted by the light emitting portion enters the gap between the rivet and each of the circuit board and support member, the light is prevented from passing through the threaded hole and entering the back surface of the support member. This is because the light entered the gap can be absorbed at least at the shaft portion.

Furthermore, for the rivet, the head has a color with high reflectance whereas the shaft portion has a color with low reflectance. The head and shaft portion may be made with synthetic resin and formed by two-color molding.

To form the head and the shaft portion with different colors, i.e. a color with high reflectance and a color with low reflectance, it is easiest and most reliable to manufacture the head and shaft portion by two-color molding using synthetic resin of a high-reflective color and that of a low-reflective color.

If a method other than two-color molding is used, for example, synthetic resin of a high-reflective color may be used to integrally mold the head and shaft portion while coating of a low-reflective color may be applied or a sheet of a low-reflective color may be attached to the surface of the shaft portion. This, however, leads to a troublesome manufacturing process. Moreover, it is possible that a part of the head may be painted with high-reflective color by mistake or the sheet of low-reflective color may be partially striped from the shaft portion.

Alternatively, the head may be molded using synthetic resin with high-reflective color while the shaft portion may be molded using synthetic resin with low-reflective color, and then the head and shaft portion may be jointed using, for example, adhesive. However, such a manufacturing process may be troublesome. Moreover, the joint portion between the head and shaft portion may easily be broken due to concentration of stress.

In the light source apparatus including a circuit board on which a light-emitting devices are mounted on one surface and a support member being in contact with another surface of the circuit board to support the circuit board, a thermal conductor having better thermal conductivity compared to the circuit board is attached to another surface of the circuit board, and the circuit board is fixed to the supporting member at a position where the thermal conductor comes in contact with the support member.

According to the present invention, the heat generated by light emission from the light emitting device mounted on one surface of the circuit board is transferred to the thermal conductor fixed to another surface of the circuit board, and is further transferred to the portion at which the thermal conductor touches the support member which is in contact with another side of the circuit board to support the circuit board. Since the thermal conductor has better thermal conductivity than the circuit board, the heat transferred to the thermal conductor is quickly transferred to the entire thermal conductor. Moreover, even if the circuit board is warped with respect to the support member due to rise in temperature, the path of heat conduction from the thermal conductor to the support member is secured, because the circuit board is fixed to the support member at the position where the thermal conductor touches the support member. As a result, the heat generated by light emission from the light emitting device can preferably be radiated.

In the light source apparatus, the circuit board has a rectangular shape and includes a plurality of the light emitting devices arranged in parallel with each other in the longitudinal direction and threaded holes through which a fixture for fixing the circuit board to the support member at plural positions in the longitudinal direction, the fixture is inserted through the insertion hole from the side of one surface and held by the support member.

According to the present invention, plural fixtures are inserted through threaded holes at plural positions in the longitudinal direction of the circuit board from one surface of the rectangular circuit board on which a plurality of light emitting devices are arranged in the longitudinal direction of the circuit board, and are held by the support member positioned at another side of the circuit board. In such a case, even if the rectangular circuit board is warped in the longitudinal direction due to rise in temperature, the thermal conductor is in contact with the support member at plural positions fixed to the support body, allowing the heat generated by light emission from the light emitting device to be efficiently diffused.

In the light source apparatus, the thermal conductor is a carbon-containing sheet.

According to the present invention, the thermal conductor is formed by attaching the carbon-containing sheet to another surface of the circuit board.

In the light source apparatus, the thermal conductor is a layer of carbon-containing coating.

According to the present invention, the layer of carbon-containing coating is applied to another surface of the circuit board to form the heat conductor.

The display apparatus comprises a display unit having a display surface on one side and the light source apparatus arranged at another side of the display portion.

According to the present invention, the light emitted by the light emitting device mounted on the light source apparatus arranged at another side of the display unit having the display surface on one side enters the display portion to illuminate the display portion.

Explanation of Item Numbers (Embodiment 1-1 to 1-10)
 1 LED
 2 LED board
 6 support member
 61 plate portion (support plate)
 10 light source unit
 20 stopper (support means)
 20h, 20e fall preventer
 20g, 20d, 20b, 20k press contact piece (engagement portion)
 20j spring portion
 23 stop slit (opening)
 30 thermal conductor
 63 stop slit (opening)
 64 concave portion
 66 antislip concave portion (antislip)
 72 display panel
 8 convex fall preventer (support means)
 9 axial fall preventer (support means)
 91 flexible column
 91a small diameter head portion
 91b flexible portion
 92 pin
 92a large diameter head portion
 A light source apparatus
(Embodiment 2)
 1 display panel
 7 radiator plate
 7a through hole
 8 LED board
 8a pattern
 8b board hole
 9 LED
 20 rivet (support means)
 21 insertion rivet (pin)
 21a head portion (large diameter head portion)
 21b insertion axis
 22 support rivet (flexible column)
 22a stopper (small diameter head portion)
 22b elastic portion
 22c contact portion
(Embodiment 3-1 to 3-3)
 1 light source unit
 2 circuit board (member)
 21 light emitter
 22 threaded hole
 3 rivet
 31 head portion
 32, 33, 34, 36 axial portion
 35, 37 protruding portion (locking portion)
 5 columnar member (locking portion)
 52 open-close portion
 6 assist member (member)
 63 threaded hole
 7 display apparatus
 7a display surface
 70 display unit
(Embodiment 4)
 1 LED (light emitting element)
 2 LED board (circuit board)
 2a one surface
 2b another surface
 2c threaded hole
 2d threaded hole
 6 assist member
 8 rivet (fixture)
 9 carbon-containing sheet (thermal conductor)
 70 display unit
 72a display surface
 A light source apparatus

The invention claimed is:
1. A light source apparatus, comprising:
a light source unit in which plural light sources are aligned on one surface of a board;
a support plate that supports the light source unit; and
a support means for supporting the light source unit that is slidable along one surface of the support plate, wherein
the support plate comprises an opening,
the light source unit comprises a stopper that is stopped by the opening, and
the light source unit is slidable along an aligned direction of the light sources, wherein
the support means comprises:
openings that are formed at the board and the support plate, respectively; and
an axial fall preventer that is inserted into the openings, and
the axial fall preventer makes the light source unit become movable in a direction along said one surface of the support plate and prevents the light source unit from falling out, and wherein
the axial fall preventer comprises:
a flexible column that has a small diameter head portion at one side of the flexible column, and a flexible por- tion at other side of the flexible column which can be distorted in a radial direction; and a pin that has a large diameter head portion opposed in a longitudinal direction to the small diameter head portion at one end of the pin, and makes the flexible portion be distorted when inserted into the flexible column.

2. A light source apparatus according to claim 1, wherein a thermal conductor is fixed between the board and the support plate.

3. A light source apparatus according to claim 2, wherein the thermal conductor is fixed to another surface of the board, and the light source unit is supported at a position where the thermal conductor is in contact with the support plate.

4. A light source apparatus according to claim 1, wherein the stopper protrudes from another surface of the board of the light source unit, the stopper is formed in a hook shape, and the stopper comprises a press contact piece that applies contact force, in a direction toward said another surface of the board, on a circumference of the opening of the support plate.

5. A light source apparatus according to claim 4, wherein an antislip is provided on the circumference of the opening, which prevents the press contact piece from being slipped.

6. A light source apparatus according to claim 1, wherein the stopper comprises two press contact pieces that apply contact force, in a direction leaving two press contact pieces away from each other, on the circumference of the opening of the support plate, the two press contact pieces protrude from said another surface of the board of the light source unit, and the two press contact pieces are opposed to each other.

7. A light source apparatus according to claim 6, wherein one or both of the two press contact pieces comprises a fall preventer at its own end which prevents from falling out from the opening of the support plate.

8. A light source apparatus according to claim 1, wherein the stopper is capable of elastic deformation, and the stopper conducts heat generated by the light source unit to the support plate.

9. A light source apparatus according to claim 4, further comprising:

a spring that is arranged between the press contact piece and the board and biases the press contact piece toward the board.

10. A light source apparatus according to claim 1, further comprising:

a concave portion provided with the opening, wherein the concave portion is arranged on said one surface of the support plate.

11. A light source apparatus according to claim 1, wherein the light source unit covers the opening of the support plate.

12. An image display apparatus, comprising:

a light source apparatus having:

a light source unit in which plural light sources are aligned on one surface of a board;

a support plate that supports the light source unit; and a support means for supporting the light source unit that is slidable along one surface of the support plate; and a display panel that utilizes light generated by the light source apparatus to display an image, wherein the support means comprises:

openings that are formed at the board and the support plate, respectively; and an axial fall preventer that is inserted into the openings, and the axial fall preventer makes the light source unit become movable in a direction along said one surface of the support plate and prevents the light source unit from falling out, and wherein the axial fall preventer comprises:

a flexible column that has a small diameter head portion at one side of the flexible column, and a flexible portion at other side of the flexible column which can be distorted in a radial direction; and a pin that has a large diameter head portion opposed in a longitudinal direction to the small diameter head portion at one end of the pin, and makes the flexible portion be distorted when inserted into the flexible column.

13. A television receiving apparatus, comprising:

a receiving means for receiving a television broadcasting signal:

a light source apparatus having:

a light source unit in which plural light sources are aligned on one surface of a board;

a support plate that supports the light source unit; and a support means for supporting the light source unit that is slidable along one surface of the support plate; and a display panel that utilizes light generated by the light source apparatus to display an image based on the television broadcasting signal received by the receiving means, wherein the support means comprises:

openings that are formed at the board and the support plate, respectively; and an axial fall preventer that is inserted into the openings, and the axial fall preventer makes the light source unit become movable in a direction along said one surface of the support plate and prevents the light source unit from falling out, and wherein the axial fall preventer comprises:

a flexible column that has a small diameter head portion at one side of the flexible column, and a flexible portion at other side of the flexible column which can be distorted in a radial direction; and a pin that has a large diameter head portion opposed in a longitudinal direction to the small diameter head portion at one end of the pin, and makes the flexible portion be distorted when inserted into the flexible column.

14. A light source apparatus, comprising:

a light source unit in which plural light sources are aligned on one surface of a board;

a support plate that supports the light source unit; and a support means for supporting the light source unit that is slidable along one surface of the support plate, wherein the support plate comprises an opening, the light source unit comprises a stopper that is stopped by the opening, and the light source unit is slidable along an aligned direction of the light sources, and wherein a thermal conductor is fixed between the board and the support plate.

15. A light source apparatus according to claim 14, wherein the thermal conductor is fixed to another surface of the board, and the light source unit is supported at a position where the thermal conductor is in contact with the support plate.

16. A light source apparatus, comprising:
a light source unit in which plural light sources are aligned on one surface of a board;
a support plate that supports the light source unit; and
a support means for supporting the light source unit that is slidable along one surface of the support plate, wherein
the support plate comprises an opening,
the light source unit comprises a stopper that is stopped by the opening, and
the light source unit is slidable along an aligned direction of the light sources, wherein
the stopper protrudes from another surface of the board of the light source unit,
the stopper is formed in a hook shape, and
the stopper comprises a press contact piece that applies contact force, in a direction toward said another surface of the board, on a circumference of the opening of the support plate, and wherein,
an antislip is provided on the circumference of the opening, which prevents the press contact piece from being slipped.

17. A light source apparatus, comprising:
a light source unit in which plural light sources are aligned on one surface of a board;
a support plate that supports the light source unit; and
a support means for supporting the light source unit that is slidable along one surface of the support plate, wherein
the support plate comprises an opening,
the light source unit comprises a stopper that is stopped by the opening, and
the light source unit is slidable along an aligned direction of the light sources, wherein
the stopper comprises two press contact pieces that apply contact force, in a direction leaving two press contact pieces away from each other, on the circumference of the opening of the support plate,
the two press contact pieces protrude from said another surface of the board of the light source unit, and
the two press contact pieces are opposed to each other.

18. A light source apparatus according to claim 17, wherein
one or both of the two press contact pieces comprises a fall preventer at its own end which prevents from falling out from the opening of the support plate.

19. A light source apparatus, comprising:
a light source unit in which plural light sources are aligned on one surface of a board;
a support plate that supports the light source unit; and
a support means for supporting the light source unit that is slidable along one surface of the support plate, wherein
the support plate comprises an opening,
the light source unit comprises a stopper that is stopped by the opening, and
the light source unit is slidable along an aligned direction of the light sources, wherein
the stopper is capable of elastic deformation, and
the stopper conducts heat generated by the light source unit to the support plate.

* * * * *